(12) United States Patent
Takahashi et al.

(10) Patent No.: US 9,445,092 B2
(45) Date of Patent: Sep. 13, 2016

(54) IMAGE PROCESSING APPARATUS, IMAGE PROCESSING METHOD, AND PROGRAM

(75) Inventors: Yoshitomo Takahashi, Kanagawa (JP); Shinobu Hattori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 388 days.

(21) Appl. No.: 14/004,285

(22) PCT Filed: Mar. 19, 2012

(86) PCT No.: PCT/JP2012/056975
§ 371 (c)(1),
(2), (4) Date: Sep. 10, 2013

(87) PCT Pub. No.: WO2012/128242
PCT Pub. Date: Sep. 27, 2012

(65) Prior Publication Data
US 2014/0002603 A1   Jan. 2, 2014

(30) Foreign Application Priority Data
Mar. 18, 2011   (JP) ................................ 2011-061794

(51) Int. Cl.
*H04N 15/00* (2006.01)
*H04N 13/00* (2006.01)
(Continued)

(52) U.S. Cl.
CPC ........... *H04N 19/00769* (2013.01); *G06T 9/00* (2013.01); *H04N 13/0007* (2013.01); *H04N 13/0048* (2013.01); *H04N 19/52* (2014.11); *H04N 19/597* (2014.11)

(58) Field of Classification Search
None
See application file for complete search history.

(56) References Cited

U.S. PATENT DOCUMENTS

2006/0072790 A1   4/2006   Wittebrood et al.
2007/0065025 A1*  3/2007   Paniconi ............... G06T 7/0081
                                                                382/236

(Continued)

FOREIGN PATENT DOCUMENTS

JP   2004-227231   8/2004
JP   2006-513661   4/2006

(Continued)

OTHER PUBLICATIONS

International Search Report issued Jun. 26, 2012 in Application No. PCT/JP2012/056975.

(Continued)

*Primary Examiner* — Frederick Bailey
*Assistant Examiner* — Talha M Nawaz
(74) *Attorney, Agent, or Firm* — Chip Law Group

(57) ABSTRACT

The present technique relates to an image processing apparatus, an image processing method, and a program capable of obtaining a vector with a high degree of prediction accuracy as a prediction vector. A prediction vector generation unit generates a prediction vector of a deviation vector representing deviation of a target block, which is a processing target in a depth image having depth information about parallax as a pixel value for each pixel of a color image, with respect to another picture different from a picture of the target block. The prediction vector generation unit generates the prediction vector in accordance with a vector prediction method which is different depending on whether the target block is an occlusion block including an occlusion portion that does not include any corresponding point in another picture. The present invention can be applied to, for example, a case of generating a prediction vector of a parallax vector used to generate a prediction image for encoding and decoding of a depth image about parallax.

13 Claims, 45 Drawing Sheets

(51) Int. Cl.
*H04N 19/597* (2014.01)
*G06T 9/00* (2006.01)
*H04N 19/52* (2014.01)

(56) References Cited

U.S. PATENT DOCUMENTS

| | | | | |
|---|---|---|---|---|
| 2009/0010323 | A1* | 1/2009 | Su | H04N 19/00769 375/240.01 |
| 2010/0034260 | A1* | 2/2010 | Shimizu | H04N 19/597 375/240.12 |
| 2010/0128792 | A1 | 5/2010 | Saito et al. | |
| 2011/0211638 | A1* | 9/2011 | Sohn | H04N 19/597 375/240.16 |
| 2011/0255796 | A1* | 10/2011 | Nakamura | H04N 19/597 382/232 |
| 2012/0314027 | A1* | 12/2012 | Tian | H04N 7/181 348/43 |
| 2013/0259131 | A1* | 10/2013 | Kondo | H04N 19/52 375/240.16 |
| 2013/0335527 | A1* | 12/2013 | Takahashi | H04N 19/597 348/43 |
| 2014/0198847 | A1* | 7/2014 | Takahashi | H04N 13/0048 375/240.12 |
| 2014/0321546 | A1* | 10/2014 | Sakurai | H04N 13/0048 375/240.16 |

FOREIGN PATENT DOCUMENTS

| | | |
|---|---|---|
| JP | 2010-154490 | 7/2010 |
| JP | 2010-157826 | 7/2010 |

OTHER PUBLICATIONS

"Draft Call for Proposal on 3D Video Coding Technology", Video and Requirement, International Organisation for Standardisation, ISO/IEC JTC1/SC29/WG11, Coding of Moving Pictures and Audio, Oct. 2010, 18 pages.

Takanori Senoh, et al., "Tashiten Eizo no Shisa Hosho Yosoku no Kento", The Journal of the Institute of Image Electronics Engineers of Japan, vol. 35, No. 5, Sep. 25, 2006, pp. 488-496 (With English Translation entitled "A Study on Disparity Compensated Prediction for Multi-view Video").

* cited by examiner

FIG. 38

| | C | Descriptor |
|---|---|---|
| mb_pred( mb_type ) { | | |
|   if( MbPartPredMode( mb_type, 0 ) == Intra_4x4 \|\| | | |
|     MbPartPredMode( mb_type, 0 ) == Intra_8x8 \|\| | | |
|     MbPartPredMode( mb_type, 0 ) == Intra_16x16 { | | |
|   if( MbPartPredMode( mb_type, 0 ) == Intra_4x4 ) | | |
|     for( luma4x4BlkIdx=0; luma4x4BlkIdx<16; luma4x4BlkIdx++ ) { | | |
|       prev_intra4x4_pred_mode_flag[ luma4x4BlkIdx ] | 2 | u(1) \| ae(v) |
|       if( !prev_intra4x4_pred_mode_flag[ luma4x4BlkIdx ] ) | | |
|         rem_intra4x4_pred_mode[ luma4x4BlkIdx ] | 2 | u(3) \| ae(v) |
|     } | | |
|   if( MbPartPredMode( mb_type, 0 ) == Intra_8x8 ) | | |
|     for( luma8x8BlkIdx=0; luma8x8BlkIdx<4; luma8x8BlkIdx++ ) { | | |
|       prev_intra8x8_pred_mode_flag[ luma8x8BlkIdx ] | 2 | u(1) \| ae(v) |
|       if( !prev_intra8x8_pred_mode_flag[ luma8x8BlkIdx ] ) | | |
|         rem_intra8x8_pred_mode[ luma8x8BlkIdx ] | 2 | u(3) \| ae(v) |
|     } | | |
|   if( ChromaArrayType == 1 \|\| ChromaArrayType == 2 ) | | |
|     intra_chroma_pred_mode | 2 | ue(v) \| ae(v) |
|   } else if( MbPartPredMode( mb_type, 0 ) != Direct ) { | | |
|     for( mbPartIdx = 0; mbPartIdx < NumMbPart( mb_type ); mbPartIdx++) | | |
|       if( ( num_ref_idx_l0_active_minus1 > 0 \|\| | | |
|         mb_field_decoding_flag != field_pic_flag ) && | | |
|         MbPartPredMode( mb_type, mbPartIdx ) != Pred_L1 ) | | |
|         ref_idx_l0[ mbPartIdx ] | 2 | te(v) \| ae(v) |
|     for( mbPartIdx = 0; mbPartIdx < NumMbPart( mb_type ); mbPartIdx++) | | |
|       if( ( num_ref_idx_l1_active_minus1 > 0 \|\| | | |
|         mb_field_decoding_flag != field_pic_flag ) && | | |
|         MbPartPredMode( mb_type, mbPartIdx ) != Pred_L0 ) | | |
|         ref_idx_l1[ mbPartIdx ] | 2 | te(v) \| ae(v) |
|     for( mbPartIdx = 0; mbPartIdx < NumMbPart( mb_type ); mbPartIdx++) | | |
|       if( MbPartPredMode( mb_type, mbPartIdx ) != Pred_L1 ) | | |
|         for( compIdx = 0; compIdx < 2; compIdx++ ) | | |
|           mvd_l0[ mbPartIdx ][ 0 ][ compIdx ] | 2 | se(v) \| ae(v) |
|     for( mbPartIdx = 0; mbPartIdx < NumMbPart( mb_type ); mbPartIdx++) | | |
|       if( MbPartPredMode( mb_type, mbPartIdx ) != Pred_L0 ) | | |
|         for( compIdx = 0; compIdx < 2; compIdx++ ) | | |
|           mvd_l1[ mbPartIdx ][ 0 ][ compIdx ] | 2 | se(v) \| ae(v) |
| } | | |

INFORMATION ABOUT PREDICTOR FLAG mv_pred_mode_l0
mv_pred_mode_l1

FIG. 39

IMAGE PROCESSING APPARATUS, IMAGE PROCESSING METHOD, AND PROGRAM

TECHNICAL FIELD

The present technique relates to an image processing apparatus, an image processing method, and a program, and relates to, for example, an image processing apparatus, an image processing method, and a program capable of obtaining a vector with a high degree of prediction accuracy as a prediction vector such as a parallax vector representing parallax of an image of a certain viewpoint with respect to an image of another viewpoint.

BACKGROUND ART

An example of encoding method for encoding images of multiple viewpoints such as 3D (Dimension) images includes MVC (Multiview Video Coding) method and the like which is extension of AVC (Advanced Video Coding) (H.264/AVC) method.

In the MVC method, an image which is to be encoded is a color image having a value corresponding to light from a subject as a pixel value, and each of the color images of multiple viewpoints is encoded, as necessary, by looking referring to not only the color image of the view point in question but also color images of the other viewpoints.

More specifically, in the MVC method, one of color images of multiple viewpoints is adopted as a Base View image, and a color image of another viewpoint is adopted as a Dependent View image.

The color image of the Base View is encoded by referring to only the Base View image, and a color image of a Dependent View is encoded by referring to not only the image of the Dependent View in question but also images of other views as necessary.

More specifically, for the color image of the Dependent View, parallax prediction for generating a prediction image is performed as necessary by referring to a color image of another view, and the color image of the Dependent View is encoded using the prediction image.

In this case, suppose that a viewpoint #1 is Base View, and another viewpoint #2 is Dependent View.

In the MVC method, when parallax prediction for the color image of the viewpoint #2 is done by referring to the color image of the viewpoint #1, and encoding (prediction encoding) is done using a prediction image obtained from the parallax prediction, a parallax vector representing parallax of a target block which is a macro block of which horizontal and vertical sizes are, e.g., 16 by 16 pixels in an encoding target of the color image of the viewpoint #2 with respect to the color image of the viewpoint #1 is detected.

Further, in the MVC method, a prediction vector obtained by predicting the parallax vector of the target block is derived, and a residual vector which is difference between the parallax vector and the prediction vector is encoded.

In the MVC method, the amount of codes of the residual vector tends to increase as the residual vector is larger, and therefore, when the magnitude of the residual vector is small, i.e., when the prediction accuracy of the prediction vector is high (the prediction vector is more similar to the parallax vector), the encoding efficiency can be improved.

By the way, in recent years, for example, specification such as MPEG3DV method is being defined as an encoding method that employs, as images of multiple viewpoints, not only each image of each viewpoint but also a parallax information image having, as pixel values, parallax information about parallax for each pixel of the color image of each viewpoint and encodes the color image of each viewpoint and the parallax information image of each viewpoint.

In MPEG3DV method, each of the color image of each viewpoint and the parallax information image of each viewpoint is, in principle, encoded like the MVC method.

In the MVC method, for a color image, the prediction vector (of the parallax vector) of the target block is derived from the parallax vectors of the blocks around the target block, but likewise, a method has been suggested to derive the prediction vector of the parallax vector for the parallax information image (for example, see Non-Patent Document 1).

CITATION LIST

Non-Patent Document

Non-Patent Document 1: "Draft Call for Proposals on 3D Video Coding Technology", INTERNATIONAL ORGANISATION FOR STANDARDISATION, ORGANISATION INTERNATIONALE DE NORMALISATION, ISO/IEC JTC1/SC29/WG11, CODING OF MOVING PICTURES AND AUDIO, ISO/IEC JTC1/SC29/WG11, MPEG2010/N11679, Guangzhou, China, October 2010

SUMMARY OF THE INVENTION

Problems to be Solved by the Invention

By the way, the parallax information image of the viewpoint #2 which is the Dependent View may include occlusion portion which is a portion having no corresponding point in the parallax information image of the viewpoint #1 which is the Base View due to the effect of parallax.

In the MVC method, in the occlusion portion, a prediction vector of a low degree of prediction accuracy may be derived.

The present technique is made in view of such circumstances, and is to allow deriving a vector with a high degree of prediction accuracy as a prediction vector.

Solutions to Problems

An image processing apparatus or program according to an aspect of the present technique is an image processing apparatus or a program for causing a computer to function as an image processing apparatus including a prediction vector generation unit for generating a prediction vector of a deviation vector representing deviation of a target block, which is a processing target in a depth image having depth information about parallax as a pixel value for each pixel of a color image, with respect to another picture different from a picture of the target block, in accordance with a vector prediction method which is different depending on whether the target block is an occlusion block including an occlusion portion that does not include any corresponding point in another picture.

An image processing method according to an aspect of the present technique is an image processing method including a step for generating a prediction vector of a deviation vector representing deviation of a target block, which is a processing target in a depth image having depth information about parallax as a pixel value for each pixel of a color image, with respect to another picture different from a picture of the target block, in accordance with a vector prediction method which is different depending on whether the target block is an occlusion block including an occlusion portion that does not include any corresponding point in another picture.

According to an aspect of the present technique, the prediction vector of the deviation vector representing deviation of the target block, which is the processing target in the depth image having depth information about parallax as the pixel value for each pixel of the color image, with respect to another picture different from the picture of the target block is generated in accordance with the vector prediction method which is different depending on whether the target block is the occlusion block including an occlusion portion that does not include any corresponding point in the another picture.

The image processing apparatus may be an independent apparatus or may be an internal block constituting an apparatus.

The program can be provided by transmitting the program via a transmission medium or recording the program to a recording medium.

Effects of the Invention

According to the present technique, a prediction vector with a high degree of prediction accuracy can be obtained.

BRIEF DESCRIPTION OF DRAWINGS

FIG. 38 is a figure illustrating an example of a predictor flag that can be included in header information.

FIG. 39 is a figure illustrating an example of a predictor flag that can be included in header information.

MODE FOR CARRYING OUT THE INVENTION

[Explanation about Depth Image (Parallax Information Image) in this Specification]

Figure 41:
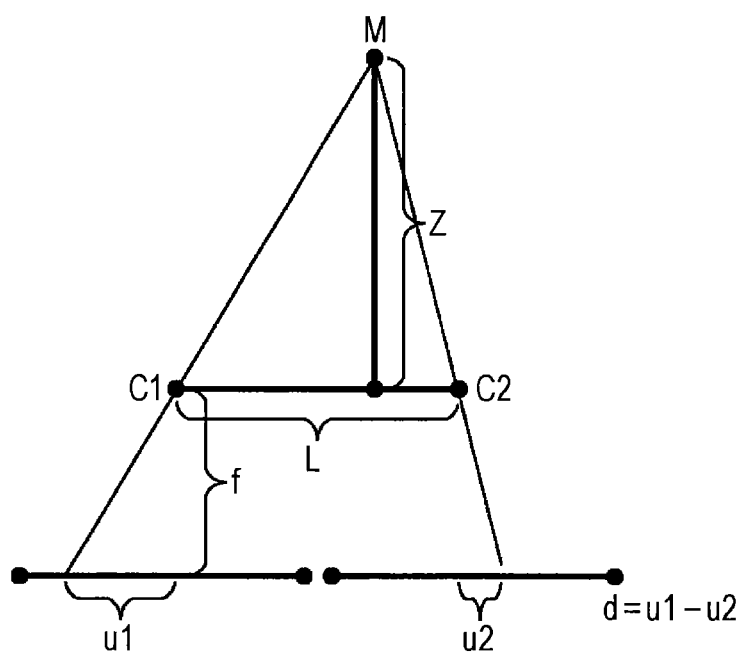
FIG. 41 is a figure explaining parallax and depth.

FIG. 41 is a figure explaining parallax and depth.

As illustrated in FIG. 41, when a color image of a subject M is captured by a camera c1 provided at a position C1 and a camera c2 provided at a position C2, a depth Z of the subject M which is a distance in a depth direction from the camera c1 (camera c2) is defined by the following expression (a).

$$Z = (L/d) \times f \qquad (a)$$

It should be noted that L denotes a distance between the position C1 and the position C2 in a horizontal direction (hereinafter referred to as inter-camera distance). d denotes a value obtained by subtracting a distance u2 of the position of the subject M on the color image captured by the camera c2 in the horizontal direction from the center of the color image from a distance u1 of the position of the subject M on the color image captured by the camera c1 in the horizontal direction from the center of the color image. More specifically, d denotes parallax. Further, f denotes the focal distance of the camera c1. In the expression (a), the focal distances of the camera c1 and the camera c2 are the same.

As shown in the expression (a), the parallax d and the depth Z can be converted uniquely. Therefore, in this specification, the image representing the parallax d of the color images of two viewpoints taken by the camera c1 and the camera c2 and the image representing the depth Z are collectively referred to as a depth image (parallax information image).

It should be noted that the depth image (parallax information image) may be an image representing the parallax d or the depth Z, and the pixel value of the depth image (parallax information image) may not be the parallax d or depth Z itself. For example, a value obtained by normalizing the parallax d or a value obtained by normalizing a reciprocal number 1/Z of the depth Z may be employed.

A value I obtained by normalizing the parallax d with 8 bits (0 to 255) can be obtained from the following expression (b). The number of normalization bits of the parallax d is not limited to eight bits. It may be other bit numbers such as 10 bits and 12 bits.

[Numerical expression 4]

$$I = \frac{255 \times (d - D_{min})}{D_{max} - D_{min}} \qquad (b)$$

In the expression (b), $D_{max}$ is the maximum value of the parallax d, $D_{min}$ is the minimum value of the parallax d. The maximum value $D_{max}$ and the minimum value $D_{min}$ may be set in unit of screen, or may be set in units of multiple screens.

A value y obtained by normalizing the reciprocal number 1/Z of the depth Z with 8 bits (0 to 255) can be obtained from the following expression (c). The number of normalization bits of the reciprocal number 1/Z of the depth Z is not limited to 8 bits. It may be other bit numbers such as 10 bits and 12 bits.

[Numerical expression 5]

$$y = 255 \times \frac{\frac{1}{Z} - \frac{1}{Z_{far}}}{\frac{1}{Z_{near}} - \frac{1}{Z_{far}}} \qquad (c)$$

In the expression (c), $Z_{far}$ denotes the maximum value of the depth Z, and $Z_{near}$ denotes the minimum value of the depth Z. The maximum value $Z_{far}$ and the minimum value $Z_{near}$ may be set in unit of screen, or may be set in units of multiple screens.

As described above, in this specification, since the parallax d and the depth Z can be converted uniquely, the image in which the value I obtained by normalizing the parallax d is the pixel value and the image in which the value y obtained by normalizing the reciprocal number 1/Z of the depth Z is the pixel value are collectively referred to as the depth image (parallax information image). In this case, the color format of the depth image (parallax information image) is either YUV420 or YUV400, but may be other color formats.

When, instead of the pixel value of the depth image (parallax information image), information itself of the value I or the value y is considered, then the value I or the value y is treated as the depth information (parallax information). Further, what is obtained by mapping the value I or the value y will be referred to as a depth map (parallax map).

Hereinafter, an embodiment of the present technique will be explained with reference to drawings, but before the explanation about the embodiment, a method according to MVC method for obtaining a prediction vector of a parallax vector in a parallax information image in encoding and decoding for color images of multiple viewpoints and parallax information images (depth images) will be explained as a preparatory step.

[Generation of Prediction Vector According to MVC Method]

Figure 1:
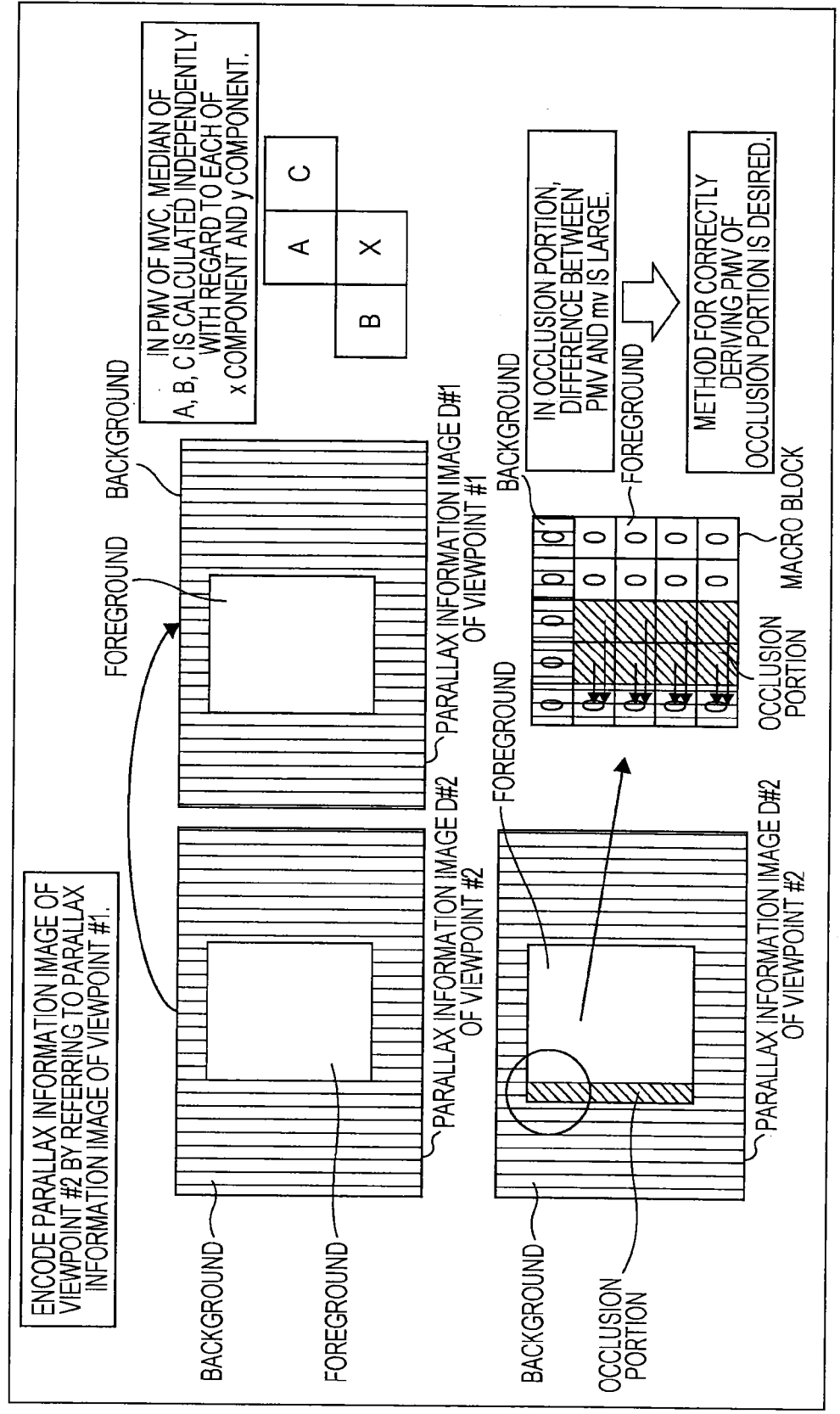
FIG. 1 is a diagram for explaining a method for deriving a prediction vector of a parallax vector of a parallax information image in accordance with MVC method.

FIG. 1 is a diagram for explaining a method for deriving a prediction vector of a parallax vector of a parallax information image in accordance with MVC method.

As explained above, Non-Patent Document 1 describes deriving a prediction vector of a parallax vector of a parallax information image according to the MVC method.

Now, suppose that there are images of multiple viewpoints, i.e., a color image C#1 of a viewpoint #1 and a color image C#2 of a viewpoint #2 which is different from the viewpoint #1 which are color images of two viewpoints, and a parallax information image D#1 of a viewpoint #1 and a parallax information image D#2 of a viewpoint #2 which are parallax information images of two viewpoints.

It should be noted that a parallax information image D#i (in this case, i=1, 2) is an image having, as a pixel value, parallax information (depth information) about parallax of each pixel of the color image C#i.

In this case, the prediction vector of the parallax vector is derived which is used in parallax prediction for generating a prediction image of the parallax information image D#2 of the viewpoint #2 using, as a reference picture, (the picture of) the parallax information image D#1 of the viewpoint #1 among the parallax information image D#1 of the viewpoint #1 and the parallax information image D#2 of the viewpoint #2.

Now, suppose that a block (macro block) X having the t-th picture which is the t-th (time t) picture from the head in the parallax information image D#2 of the viewpoint #2 is a target block of encoding (or decoding) target.

In this case, the picture having the target block of the parallax information image D#2, i.e., the picture of encoding target, is also referred to as a target picture.

In the MVC method, the prediction vector (of the parallax vector) of the target block X of the parallax information image D#2 is derived from the parallax vector of the already encoded (decoded) block (in the order of raster scan) among the blocks around the target block X (which may be hereinafter referred to as surrounding blocks).

More specifically, in the MVC method, as illustrated in FIG. 1, the prediction vector is derived according to vector prediction method (which may be hereinafter referred to as median prediction method or median predictor) for deriving, as the prediction vector of the target block X, the median (central value) of the parallax vectors of a surrounding block A adjacent to the upper side of the target block X, a surrounding block B adjacent to the left side of the target block X, and a surrounding block C adjacent to the upper right side of the target block X.

In the median prediction method, the calculation of the median serving as the prediction vector of the target block X is done independently with regard to each of x component and y component.

Now, as illustrated in FIG. 1, suppose that (parallax information of) background and (the parallax information of) rectangular foreground serving as an object existing at the side closer to the viewer with respect to the background appear in the parallax information images D#1 and D#2.

In this case, in order to simplify the explanation, the color images C#1 and C#2 are color images obtained using two cameras provided in the same horizontal plane by causing the two cameras to capture images in a direction perpendicular to a straight line connecting the positions of the two cameras.

Further, the color image C#1 of the viewpoint #1 is a color image obtained by causing one of the two cameras at the right side to capture the subject (image-capturing direction), and the color image C#2 of the viewpoint #2 is a color image obtained by causing one of the two cameras at the left side to capture the subject.

In this case, if the foreground appears substantially in the center of the parallax information image D#2 of the viewpoint #2, the foreground appears somewhat at the left side with respect to the center in the parallax information image D#1 of the viewpoint #1 due to the effect of parallax as illustrated in FIG. 1.

Therefore, in the parallax information image D#1 of the viewpoint #1, a portion of the background appearing at the left side of the foreground in the parallax information image D#2 of the viewpoint #2 is covered with the foreground, and cannot be seen.

As a result, in the parallax information image D#2 of the viewpoint #2, a portion of the background (shaded portion in FIG. 1) appearing at the left side of the foreground appearing in the parallax information image D#2 is an occlusion portion which does not have any corresponding point in the parallax information image D#1 of the viewpoint #1.

In this case, in the parallax information image D#2, blocks including the occlusion portion (macro block) are also referred to as occlusion blocks, and blocks other than the occlusion blocks are referred to as non-occlusion blocks.

As described above, when the color image C#1 of the viewpoint #1 is a color image captured with the right camera of the two cameras, and the color image C#2 of the viewpoint #2 is a color image captured with the left camera of the two cameras, and more specifically, when the viewpoint #1 is at the right side, and the viewpoint #2 is at the left side, a portion of the background adjacent to the left side of the foreground is an occlusion portion in the parallax information image D#2 of the viewpoint #2. Therefore, the left side of the occlusion portion is the background, and the right side thereof is the foreground.

In the parallax information image, pixel values are parallax information, and therefore, the pixel values of the foreground are substantially the same values as long as there is no large depression/projection in the depth direction in the foreground. Likewise, the pixel values of the background are substantially the same values. In general, in the foreground and the background, the positions in the depth direction are relatively different (the foreground is closer to the viewer, and the background is at the deeper side), and therefore, the pixel values are relatively different.

As described above, in the parallax information image, the pixel values of the foreground are substantially the same values, and the pixel values of the background are also substantially the same values.

Therefore, when (the picture of) the parallax information image D#1 is used as a reference picture, and the parallax vector serving as a deviation vector representing deviation of the block of the parallax information image D#2 with respect to the parallax information image D#1 which is the reference picture is detected by ME (Motion Estimation), then, in most cases, the parallax vector becomes (substantially) zero vector as illustrated in FIG. 1.

However, in the occlusion block of the parallax information image D#2, the background appearing in the occlusion block does not appear at the same position as the occlusion block in the parallax image information D#1 which is the reference picture (because the foreground appears there), and therefore, the parallax vector does not become zero vector.

More specifically, as illustrated in FIG. 1, in the occlusion block of the parallax information image D#2, a vector indicating a background, in the parallax image information D#1, appearing at the outside at the left of the occlusion corresponding portion which is at the same position as the occlusion portion is detected as a parallax vector from the occlusion block.

Therefore, when the occlusion block of the parallax information image D#2 is a target block, then, as illustrated in FIG. 1, the parallax vector of the target block X may match the parallax vector of the surrounding block A adjacent to the upper side thereof, but it is greatly different from (has smaller degree of correlation to) the parallax vectors of the surrounding block B adjacent to the left side thereof and the surrounding block C adjacent to the upper right side thereof.

As described above, in the MVC method, the median of the parallax vector of the surrounding block around the target block is derived as the prediction vector of (the parallax vector of) the target block, and therefore, when the parallax vectors of the surrounding block B adjacent to the left side of the occlusion block and the surrounding block C adjacent to the upper right side of the occlusion block is greatly different from the parallax vector of the occlusion block, then a vector greatly different from the parallax vector in question is derived as the prediction vector of the parallax vector of the occlusion block.

When the prediction vector of the parallax vector of the occlusion block is greatly different from the parallax vector in question, and more specifically, when the prediction accuracy of the prediction vector is low, then, the residual vector which is difference between the parallax vector and the prediction vector is large, and therefore, in the MVC method, the amount of codes of the residual vector increases, which degrades the encoding efficiency.

Accordingly, in particular, for the occlusion portion, it is desired to employ a vector prediction method different from the MVC method so as to generate a prediction vector with a high degree of prediction accuracy.

In the present technique, a proximity prediction method for generating, as the prediction vector of the target block, a vector from the target block of the second parallax information image D#2 of the viewpoint #2 to a proximity portion adjacent to the outside of the occlusion corresponding portion at the same position as the occlusion portion in the picture of the first parallax information image D#1 of the viewpoint #1 is employed as the vector prediction method of the occlusion portion (occlusion block).

[Overview of the Present Technique]

Figure 2:
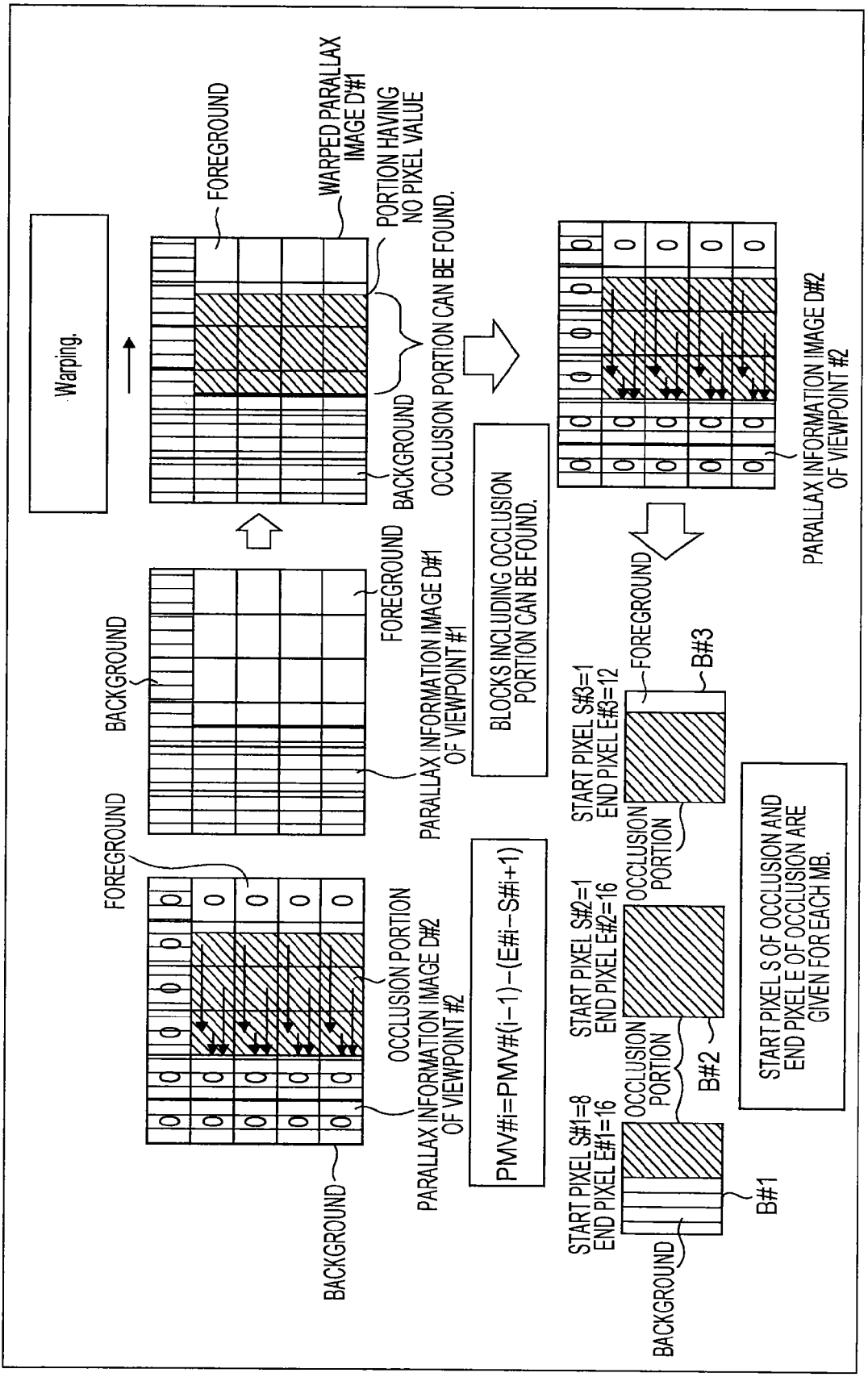
FIG. 2 is a figure for explaining overview of the present technique.

FIG. 2 is a figure for explaining overview of the present technique.

FIG. 2 is like FIG. 1, and the viewpoint #1 is at the right side, and the viewpoint #2 is at the left side, and in the parallax information image D#2 of the viewpoint #2, a background portion adjacent to the left side of the foreground is the occlusion portion. Therefore, the left side of the occlusion portion is the background, and the right side thereof is the foreground.

With the present technique, when the parallax vector of the target block of processing target in the parallax information image D#2 of the viewpoint #2 is generated using, as the reference picture, (the picture of) the parallax information image D#1 of the viewpoint #1 which is a picture different from the target picture, then the prediction vector of (the parallax vector of) the target block is generated according to a different vector prediction method in accordance with whether the target block is an occlusion block including an occlusion portion having no corresponding point in the parallax information image D#1 of the viewpoint #1 serving as the reference picture.

Accordingly, with the present technique, the occlusion portion of the parallax information image D#2 of the viewpoint #2 is detected.

The detection of the occlusion portion is done using a warped parallax information image D'#1 obtained by converting the parallax information image D#1 into an image obtained at the viewpoint #2 which is obtained by warping the parallax information image D#1 of the viewpoint #1 which is the reference picture.

More specifically, in the warping process of the parallax information image D#1 of the viewpoint #1, for example, each pixel (value) of the parallax information image D#1 is moved by an amount corresponding to the parallax between the viewpoints #1 and #2 at each pixel, so that the warped parallax information image (warped depth image) D'#1 is generated.

Therefore, in the warped parallax information image D'#1, a portion that appears in the parallax information image D#2 but that does not appear in the parallax information image D#1 has no pixel value, i.e., is in a so-called vacant state as illustrated in FIG. 2.

Therefore, a portion having no pixel value in the warped parallax information image D'#1 (which may be hereinafter referred to as pixel value-absent portion) is detected, and a portion at the same position as the pixel value-absent portion in the parallax information image D#2 is detected, so that the occlusion portion can be detected.

With the present technique, when the target block is an occlusion block including the occlusion portion, the prediction vector of the target block is generated in accordance with the proximity prediction method in which a vector from the target block to a proximity portion adjacent to the background at the outside of the occlusion corresponding portion at the same position as the occlusion portion in the first parallax information image D#1 of the viewpoint #1 which is the reference picture is generated as the prediction vector of the target block.

Therefore, with the present technique, for example, by scanning, in the horizontal direction (in which parallax exists), blocks that could be processing target in the target picture of the parallax information image D#2, a start pixel S where the occlusion portion starts and an end pixel E where the occlusion portion ends are detected in the blocks.

In FIG. 2, three blocks (macro block) B#1, B#2, and B#3 which are arranged in the horizontal direction (direction from left to right) (x direction) in the target picture of the parallax information image D#2 are occlusion blocks including the occlusion portions.

Further, for each of the blocks B#1 to B#3, the start pixel S and the end pixel E of the occlusion portion are detected.

In FIG. 2, the start pixel S#1 of the occlusion portion of the block B#1 is the 8-th pixel (from the left of the block) and the end pixel E#1 thereof is the 16-th pixel. In the block B#2, the start pixel S#2 is the 1-st pixel, and the end pixel E#2 thereof is the 16-th pixel. In the block B#3, the start pixel S#3 is the 1-st pixel, and the end pixel E#3 thereof is the 12-th pixel.

In the proximity prediction method, in the block B#i which is the occlusion block (in this case, i=1, 2, 3), for example, (the x component of) the prediction vector PMV#i of the block B#i is derived according to the expression (1).

$$PMV\#i=PMV\#(i-1)-(E\#i-S\#i+1) \quad (1)$$

In this case, according to the expression (1), the prediction vector PMV#i of the target block B#i is derived by subtracting the number of pixels E#i−S#i+1 from the start pixel S#i to the end pixel E#i of the occlusion block from the prediction vector PMV# (i−1) of the occlusion block B# (i−1) adjacent to the left side of the target block B#i.

In the expression (1), when the block B# (i−1) adjacent to the left side of the target block B#i is not the occlusion block, the prediction vector PMV# (i−1) of the block B# (i−1) is zero vector as far as the calculation of the expression (1) is concerned.

In this case, in order to simplify the explanation, it is assumed that the viewpoints #1 and #2 exist in the same plane, and therefore, the y component of the prediction vector PMV#i of the expression (1) is zero, and the expression (1) represents the x component of the prediction vector PMV#i.

According to the expression (1), a vector from the target block B#i to a background which is a proximity portion in contact with the outside of the left border of the occlusion corresponding portion of the parallax information image D#1 is generated as the prediction vector PMV#i of the target block B#i.

Figure 3:
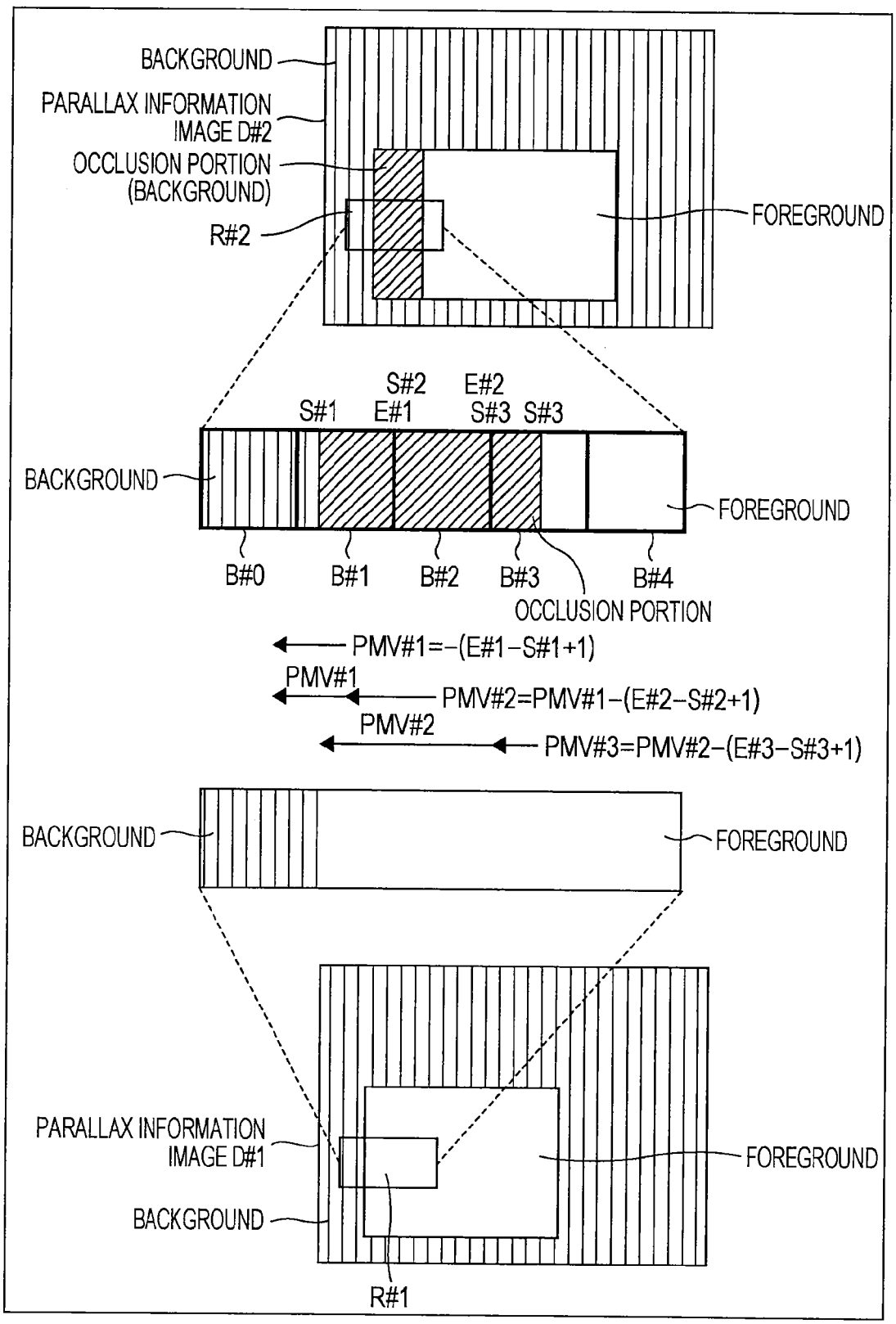
FIG. 3 is a figure for explaining generation method of a prediction vector of a target block in accordance with proximity prediction method.

FIG. 3 is a figure for explaining generation method of a prediction vector of a target block in accordance with proximity prediction method.

In FIG. 3, the viewpoint #1 is at the right side, and the viewpoint #2 is at the left side as explained in FIG. 2, and FIG. 3 shows a generation method of the prediction vector of the occlusion block according to the proximity prediction method when the portion of the background in contact with the left side of the foreground is the occlusion portion in the parallax information image D#2 of the viewpoint #2, and more specifically, when the left side of the occlusion portion is the background and the right side thereof is the foreground.

In this case, in FIG. 3, an area R#2 which is a part including the occlusion portion of the parallax information image D#2 is enlarged, and an area R#1 at the same position as the area R#2 in the parallax information image D#1 is enlarged and shown.

In FIG. 3, in the target picture of the parallax information image D#2, any given three blocks B#1, B#2, and B#3 arranged in the horizontal direction are occlusion blocks including occlusion portions, and the start pixel and the end pixel of the block B#i are denoted as S#i and E#i, respectively.

When the viewpoint #1 is at the right side and the viewpoint #2 is at the left side and the portion of the background in contact with the left side of the foreground in the parallax information image D#2 of the viewpoint #2 is the occlusion portion, then, as explained in FIG. 2, in the proximity prediction method, the prediction vector PMV#i of the block B#i which is the occlusion block is derived in the order of raster scan which is the order of encoding (the order of decoding) according to the expression (1).

In this case, according to the expression (1), the prediction vector PMV#1 of the block B#1 is represented by an expression PMV#1=−(E#1−S#1+1), the prediction vector PMV#2 of the block B#2 is represented by an expression PMV#2=PMV#1−(E#2−S#2+1), and the prediction vector PMV#3 of the block B#3 is represented by an expression PMV#3=PMV#2−(E#3−S#3+1), respectively.

Each of the prediction vectors PMV#i of the blocks B#i which are occlusion blocks is a vector from the target block B#i to the portion of the background which is the proximity portion in contact with the outside of the left border of the occlusion corresponding portion of the parallax information image D#1, i.e., the portion of the background in contact with the left side of the foreground in the parallax information image D#1.

Figure 4:
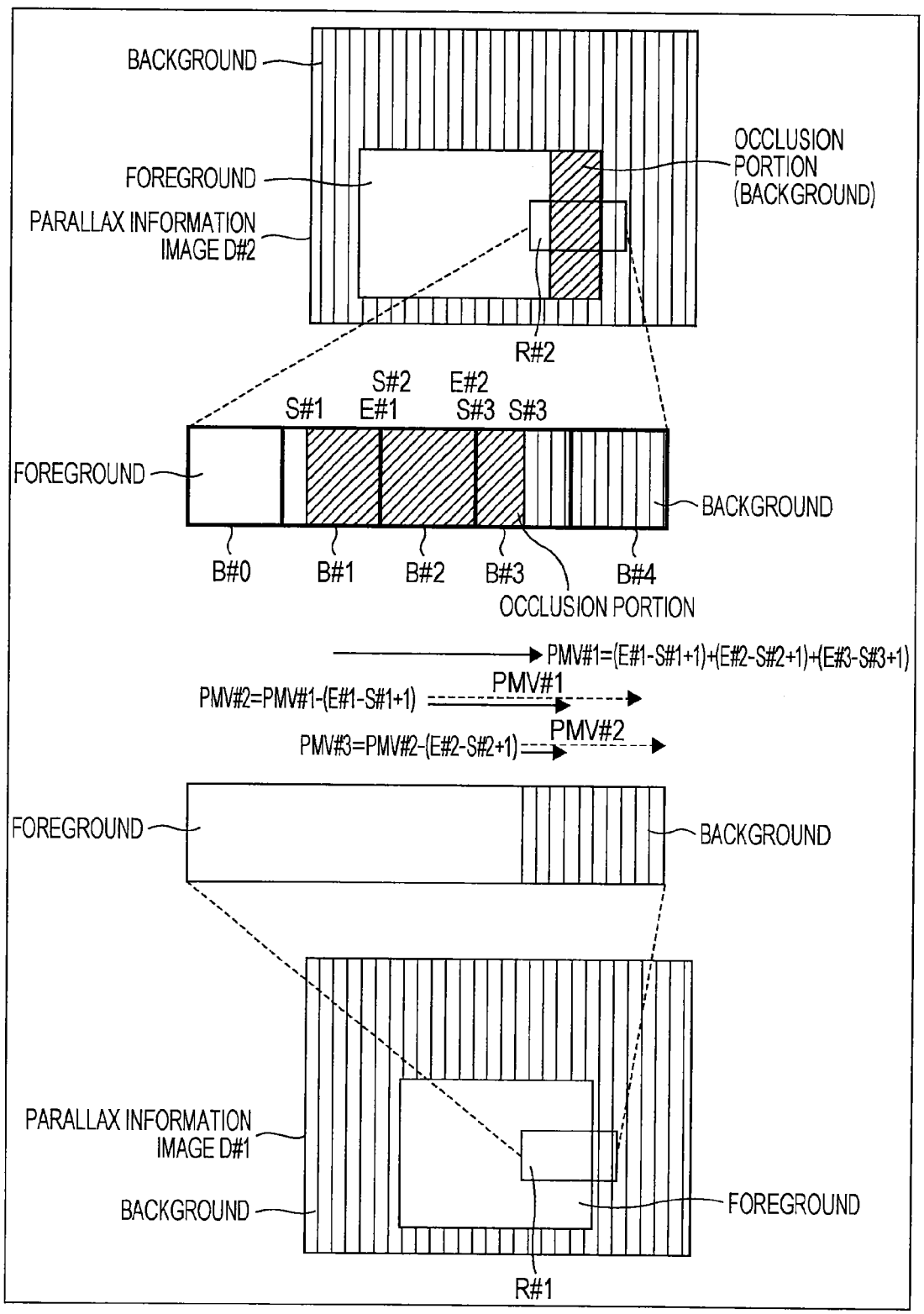
FIG. 4 is a figure for explaining generation method of a prediction vector of a target block in accordance with proximity prediction method.

FIG. 4 is a figure for explaining generation method of a prediction vector of a target block in accordance with proximity prediction method.

In FIG. 4, the positions of the viewpoints #1 and #2 are opposite to those in FIGS. 2 and 3 in the horizontal direction.

More specifically, in FIG. 4, the viewpoint #1 is at the left side, and the viewpoint #2 is at the right side, and as a result, FIG. 4 shows a generation method of the prediction vector of the occlusion block according to the proximity prediction method when the portion of the background in contact with the right side of the foreground is the occlusion portion in the parallax information image D#2 of the viewpoint #2, and more specifically, when the right side of the occlusion portion is the background and the left side thereof is the foreground.

Like FIG. 3, in FIG. 4, an area R#2 which is a part including the occlusion portion of the parallax information image D#2 is enlarged, and an area R#1 at the same position as the area R#2 in the parallax information image D#1 is enlarged and shown.

Like FIG. 3, in FIG. 4, in the target picture of the parallax information image D#2, any given three blocks B#1, B#2, and B#3 arranged in the horizontal direction are occlusion blocks including occlusion portions, and the start pixel and the end pixel of the block B#i are denoted as S#i and E#i, respectively.

When the viewpoint #1 is at the left side and the viewpoint #2 is at the right side and the portion of the background in contact with the right side of the foreground in the parallax information image D#2 of the viewpoint #2 is the occlusion portion, then, in the proximity prediction method, the prediction vector PMV#i of the block B#i (in this case, i=1, 2, 3) which is the occlusion block is derived according to the expression (2), for example.

$$PMV\#i = PMV\#(i-1) - (E\#(i-1) - S\#(i-1) + 1) \quad (2)$$

In this case, according to the expression (2), the prediction vector PMV#i of the target block B#i is derived by subtracting the number of pixels E# (i−1)−S# (i−1)+1 from the start pixel S# (i−1) to the end pixel E# (i−1) of the occlusion block from the prediction vector PMV# (i−1) of the occlusion block B# (i−1) adjacent to the left side of the target block B#i.

In the expression (2), when the block B# (i−1) adjacent to the left side of the target block B#i is not the occlusion block, then, the prediction vector PMV# (i−1) of the block B# (i−1) is a summation $\Sigma$ (E#i−S#i+1) of the number of pixels from the start pixel S#i to the end pixel E#i of the occlusion block B#i arranged continuously in the horizontal direction with the target block being the front, as far as the calculation of the expression (2) is concerned. When the number of occlusion blocks B#i arranged continuously in the horizontal direction with the target block being the front is N blocks, and the start pixel and the end pixel of the i-th occlusion block B#i from the front in the N occlusion blocks are denoted as S#i and E#i, respectively, then, $\Sigma$ of the summation $\Sigma$ (E#i−S#i+1) means a summation where i is changed to an integer value from 1 to N.

In this case, in order to simplify the explanation, it is considered that the viewpoints #1 and #2 exist on the same plane, and therefore, like the expression (1), the y component of the prediction vector PMV#i of the expression (2) is zero, and the expression (2) represents the x component of the prediction vector PMV#i.

According to the expression (2), the vector from the target block B#i to the background which is the proximity portion in contact with the outside of the right border of the occlusion corresponding portion of the parallax information image D#1 is generated as the prediction vector PMV#i of the target block B#i.

In the proximity prediction method, according to the expression (2), the prediction vector PMV#i of the block B#i which is the occlusion block is derived in the order of raster scan which is the order of encoding (the order of decoding).

In this case, according to the expression (2), the prediction vector PMV#1 of the block B#1 is represented by an expression PMV#1=(E#1−S#1+1)+(E#2−S#2+1)+(E#3−S#3+1), the prediction vector PMV#2 of the block B#2 is represented by an expression PMV#2=PMV#1−(E#1−S#1+1), and the prediction vector PMV#3 of the block B#3 is represented by an expression PMV#3=PMV#2−(E#2−S#2+1), respectively.

Each of the prediction vectors PMV#i of the blocks B#i which are occlusion blocks is a vector from the target block B#i to the portion of the background which is the proximity portion in contact with the outside of the right border of the occlusion corresponding portion of the parallax information image D#1, i.e., the portion of the background in contact with the right side of the foreground in the parallax information image D#1.

As explained in FIG. 1, in the occlusion block of the parallax information image D#2, a vector indicating a background, in the parallax image information D#1, appearing at the outside of the occlusion corresponding portion which is at the same position as the occlusion portion is detected as a parallax vector from the occlusion block.

On the other hand, in the proximity prediction method, as explained in FIGS. 2 to 4, a vector from the target block B#i to a background which is a proximity portion in contact with the outside of the border of the occlusion corresponding portion of the parallax information image D#1 is generated as the prediction vector PMV#i of the target block B#1.

Therefore, according to the proximity prediction method, the vector with a high degree of prediction accuracy can be obtained as the prediction vector of the occlusion block, and more specifically, the vector similar to the parallax vector can be obtained as the prediction vector of the occlusion block, and as a result, the residual vector becomes less, which can improve the encoding efficiency.

In the proximity prediction method, the prediction vector with a high degree of prediction accuracy is obtained on the basis of the assumption that the pixel value of the occlusion portion of the parallax information image D#2 (parallax information) is substantially the same value as the pixel value of the background (parallax information) in contact with the occlusion corresponding portion that is at the same position as the occlusion portion in the parallax information image D#1 which is the reference picture, but this assumption is generally satisfied in many cases with regard to the parallax information image.

[Embodiment of Multi-Viewpoint Image Encoder to which the Present Technique is Applied]

Figure 5:
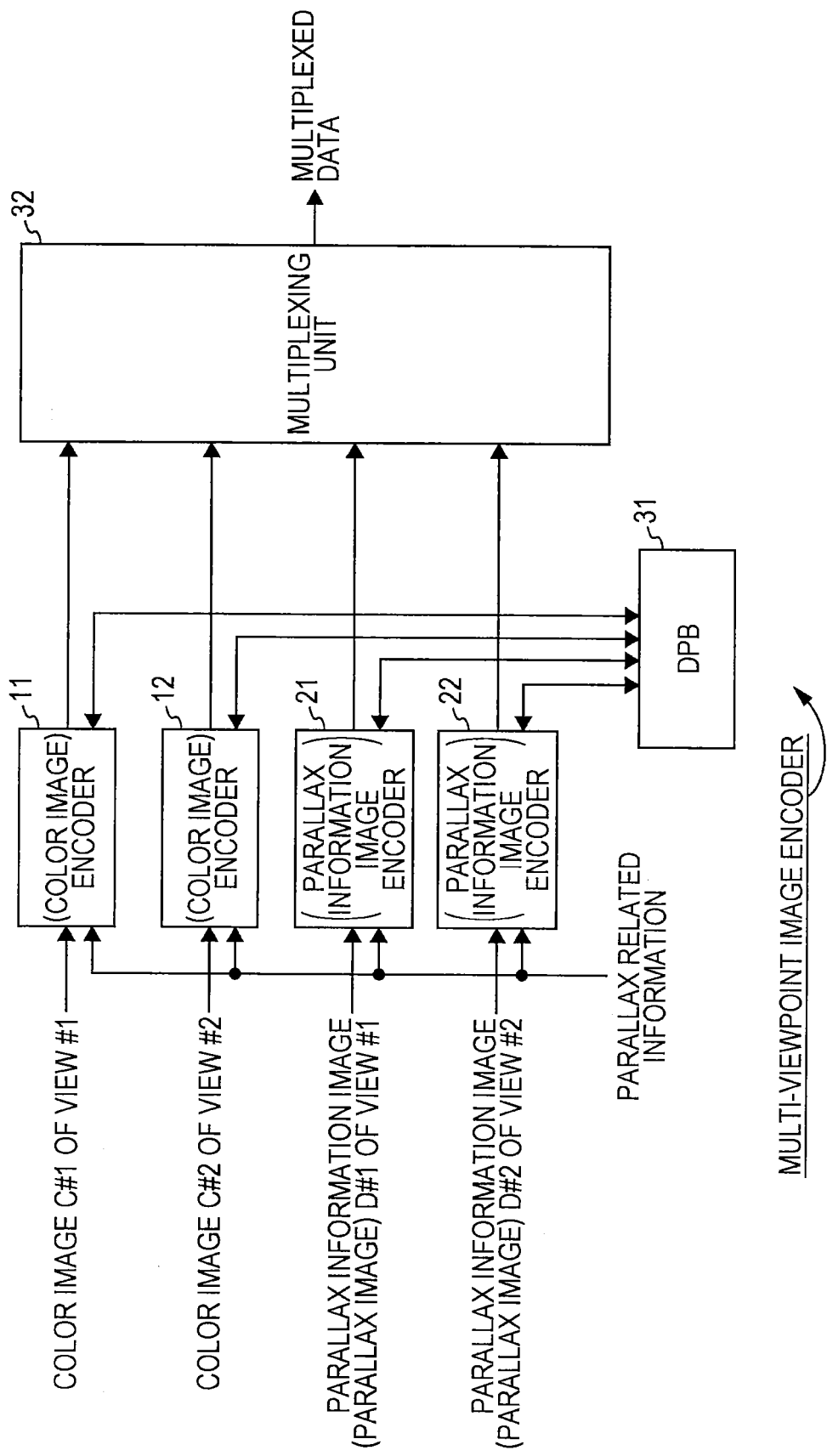
FIG. 5 is a block diagram illustrating a configuration example of an embodiment of a multi-viewpoint image encoder to which the present technique is applied.

FIG. 5 is a block diagram illustrating a configuration example of an embodiment of a multi-viewpoint image encoder to which the present technique is applied.

The multi-viewpoint image encoder in FIG. 5 is, for example, an encoder for encoding images of multiple viewpoints using the MVC method. In the explanation below, the same processing as the MVC method will be omitted as necessary.

The multi-viewpoint image encoder is not limited to the encoder using the MVC method.

In the explanation below, a color image C#1 of a viewpoint #1 and a color image C#2 of a viewpoint #2 which are color images of the two viewpoints #1 and #2 serving as the images of the multiple viewpoints, and a parallax information image D#1 of the viewpoint #1 and a parallax information image D#2 of the viewpoint #2 which are parallax information images of the two viewpoints #1 and #2 are employed.

Further, for example, the color image C#1 and the parallax information image D#1 of the viewpoint #1 are adopted as Base View images, and the remaining color image C#2 and the parallax information image D#2 of the viewpoint #2 are treated as Dependent View images.

It should be noted that color images and parallax information images of three or more viewpoints may be used as images of multiple viewpoints, and a color image and a parallax information image of any given viewpoint among the color images and the parallax information images of three or more viewpoints may be adopted as Base View images, and the color image and the parallax information image of the remaining viewpoint may be treated as a Dependent View image.

In FIG. 5, the multi-viewpoint image encoder includes encoders 11, 12, 21, 22, a DPB 31 and a multiplexing unit 32.

The encoder 11 receives the color image C#1 of the view #1 and parallax related information (depth related information).

In this case, the parallax related information is meta data of the parallax information, and the details thereof will be explained later.

The encoder 11 encodes the color image C#1 of the viewpoint (view) #1 using the parallax related information as necessary, and provides the multiplexing unit 32 with encoded data of the color image C#1 of the viewpoint #1 obtained as the result.

The encoder 12 receives the color image C#2 of the viewpoint #2 and the parallax related information.

The encoder 12 encodes the color image C#2 of the viewpoint #2 using the parallax related information as necessary, and provides the multiplexing unit 32 with encoded data of the color image C#2 of the viewpoint #2 obtained as the result.

The encoder 21 receives the color image C#1 of the viewpoint D#1 and the parallax related information.

The encoder 21 encodes the parallax information image D#1 of the viewpoint #1 using the parallax related information as necessary, and provides the multiplexing unit 32 with encoded data of the parallax information image D#1 of the viewpoint #1 obtained as the result.

The encoder 22 receives the parallax information image D#2 of the viewpoint #2 and the parallax related information.

The encoder 22 encodes the parallax information image D#2 of the viewpoint #2 using the parallax related information as necessary, and provides the multiplexing unit 32 with encoded data of the parallax information image D#2 of the viewpoint #2 obtained as the result.

The DPB 31 temporarily stores, as (the candidates of) the reference picture referred to when generating a prediction image, images (decoded images) which are obtained by causing each of the encoders 11, 12, 21 and 22 to encode the image of the encoding target and locally decoding the images.

More specifically, each of the encoders 11, 12, 21 and 22 performs prediction encoding on the image of the encoding target. For this reason, each of the encoders 11, 12, 21 and 22 encodes the image of the encoding target and thereafter performs local decoding, thus obtaining a decoded image, in order to generate the prediction image used for the prediction encoding.

The DPB 31 is what is called a shared buffer which temporarily stores the decoded image obtained by each of the encoders 11, 12, 21 and 22, and each of the encoders 11, 12, 21 and 22 selects a reference picture which is referred to when encoding the image of the encoding target from among the decoded images stored in the DPB 31. Each of the encoders 11, 12, 21 and 22 uses the reference picture to generate the prediction image, and uses the prediction image to encode the image (perform prediction encoding).

The DPB 31 is shared by the encoders 11, 12, 21 and 22, and therefore, each of the encoders 11, 12, 21 and 22 can refer to not only the decoded image obtained by itself but also decoded images obtained by other encoders.

The multiplexing unit 32 multiplexes the encoded data given by the encoders 11, 12, 21 and 22, and outputs the multiplexed data obtained as the result.

The multiplexed data which are output by the multiplexing unit 32 are recorded to a recording medium, not shown, or transmitted via a transmission medium, not shown.

[Multi-Viewpoint Image Generation Device]

Figure 6:
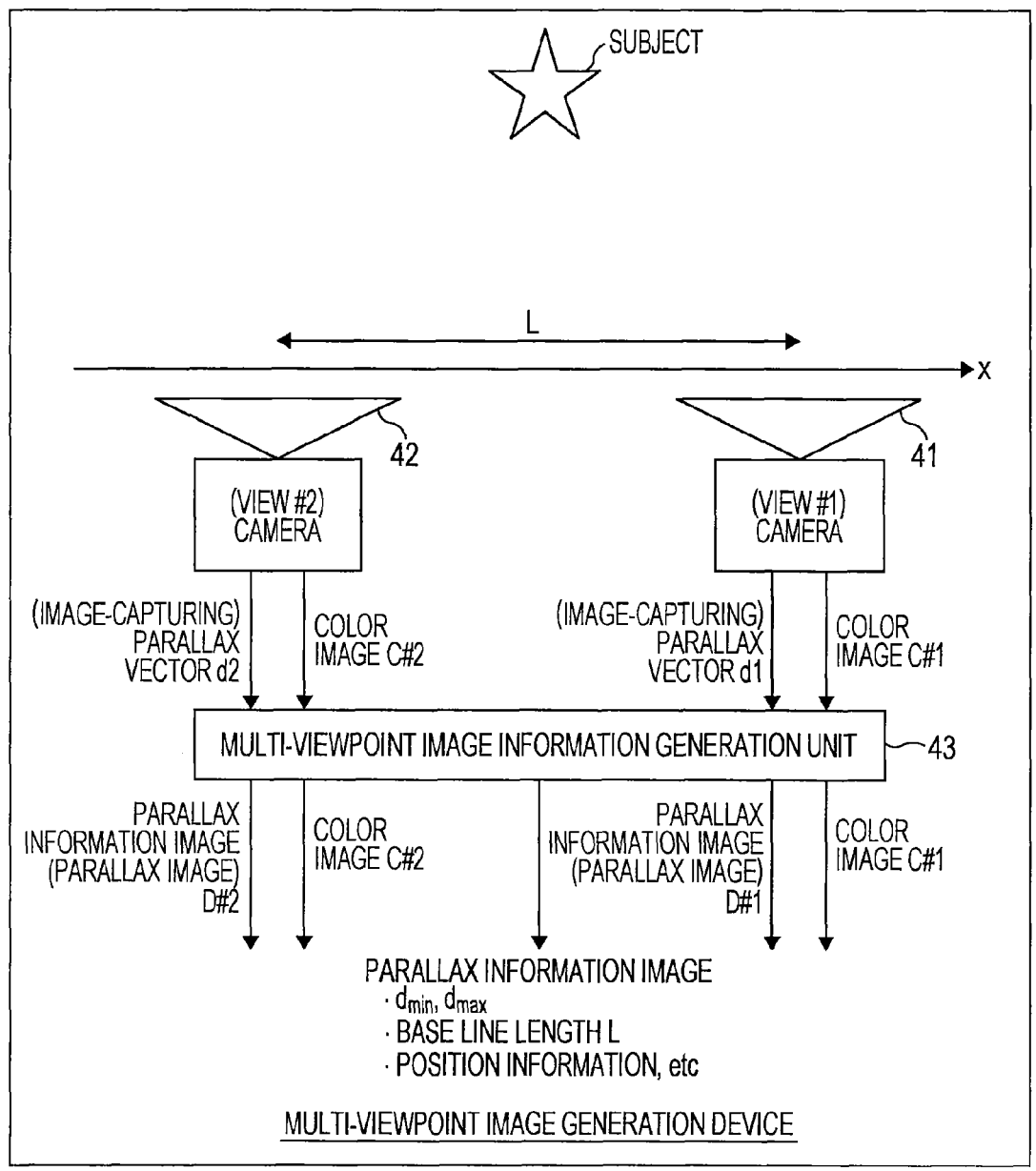
FIG. 6 is a block diagram illustrating a configuration example of a multi-viewpoint image generation device generating images of multiple viewpoints which are target of encoding by the multi-viewpoint image encoder.

FIG. 6 is a block diagram illustrating a configuration example of a multi-viewpoint image generation device generating images of multiple viewpoints which are target of encoding by the multi-viewpoint image encoder in FIG. 5.

In the multi-viewpoint image generation device, in order to capture images of, e.g., two viewpoints, serving as the multiple viewpoints, the two cameras 41 and 42 are provided at positions so that color images of different viewpoints can be captured.

In this case, in the present embodiment, in order to simplify the explanation, the cameras 41 and 42 are provided at different positions on a straight line on any given horizontal plane in such a manner that the optical axes thereof are in a direction perpendicular to the straight line.

In FIG. 6, the camera 41 is provided (toward the subject) (in the image-capturing direction) at the right side with respect to the camera 42, and therefore, the camera 42 is provided at the left side of the camera 41.

The camera 41 captures the subject at the position where the camera 41 is provided, and outputs a color image C#1 which is a motion picture.

Further, the camera 41 adopts the position of the camera 42, which is another any given camera, as the viewpoint of the reference, and outputs a parallax vector d1 representing parallax of each pixel in the color image C#1 with respect to the viewpoint of the reference.

The camera 42 captures the subject at the position where the camera 42 is provided, and outputs a color image C#2 which is a motion picture.

Further, the camera 42 adopts the position of the camera 41, which is another any given camera, as the viewpoint of reference, and outputs a parallax vector d2 representing parallax of each pixel in the color image C#2 with respect to the viewpoint of the reference.

In this case, where two-dimensional plane in which the horizontal direction of the color image is defined as x axis and the vertical direction is defined as y axis will be referred to as a color image plane, the cameras 41 and 42 are arranged on a straight line on a plane perpendicular to the color image plane (horizontal plane). Therefore, the parallax vectors d1 and d2 are vectors of which y component is 0 and of which x component is a value corresponding to, e.g., positional relationship of the cameras 41 and 42 in the horizontal direction.

Hereinafter, the parallax vectors d1 and d2 which are output by the cameras 41 and 42 will be referred to as image-capturing parallax vectors d1 and d2 in order to be distinguished from a parallax vector representing parallax obtained by ME explained later.

The color image C#1 and the image-capturing parallax vector d1 given by the camera 41, and the color image C#2 and image-capturing parallax vector d2 given by the camera 42 are provided to a multi-viewpoint image information generation unit 43.

The multi-viewpoint image information generation unit 43 outputs the color image C#1 given by the cameras 41 and 42 as it is.

In addition, the multi-viewpoint image information generation unit 43 derives the parallax information about the parallax of each pixel of the color image #1 from the image-capturing parallax vector d1 given by the camera 41, and generates and outputs a parallax information image D#1 having the parallax information as pixel values.

Further, the multi-viewpoint image information generation unit 43 derives the parallax information about the parallax of each pixel of the color image #2 from the image-capturing parallax vector d2 given by the camera 42, and generates and outputs a parallax information image D#2 having the parallax information as pixel values.

In this case, as described above, examples of parallax information (depth information) include a parallax value (value I) which is a value corresponding to image-capturing parallax vector and a depth value (value y) obtained by normalizing a depth Z representing the distance (depth) to the subject.

Now, suppose that, for example, the pixel value of the parallax information image (depth image) is an integer value from 0 to 255 expressed as eight bits. Further, (x component of) the image-capturing parallax vector (parallax) is denoted as d, and the maximum value and the minimum value of (x component of) the image-capturing parallax vector (parallax) (for example, in a picture or a motion picture serving as a piece of content) are denoted as dmax (Dmax) and dmin (Dmin), respectively.

In this case, as described above, the parallax value ν (value I) is obtained according to the expression 3 using, for example, (x component of) the image-capturing parallax vector (parallax) d and the maximum value dmax (Dmax) and the minimum value drain (Dmin) thereof.

$$\nu = 255 \times (d - d\text{min}) / (d\text{max} - d\text{min}) \qquad (3)$$

It should be noted that the parallax value ν of the expression (3) can be converted into (x component) of the image-capturing parallax vector d according to the expression (4).

$$d = \nu \times (d\text{max} - d\text{min}) / 255 + d\text{min} \qquad (4)$$

The depth Z denotes the distance between the straight line where the cameras 41 and 42 are provided and the subject.

For the camera 41 (the same can also be applied to the camera 42), where a base line length which is the distance between the camera 41 and the camera 42 arranged on the same straight line (the distance from the viewpoint of the reference) is denoted as L, and the focal length of the camera 41 is denoted as f, then the depth Z can be obtained according to the expression (5) using (x component of) the image-capturing parallax vector d (d1).

$$Z = (L/d) \times f \qquad (5)$$

The parallax value ν (value I) and the depth Z which are parallax information (depth information) can be converted to each other according to the expression (3) to the expression (5), and are therefore equivalent information.

In this case, in the explanation below, the parallax information image (depth image) having the parallax value ν (value I) as the pixel value will be referred to as a parallax image, and the image having the depth value (value y) as a pixel value will be referred to as a depth image.

In the explanation below, for example, the parallax image among the parallax image and the depth image is used as the parallax information image (depth image), but alternatively, the depth image can also be used as the parallax information image (depth image).

The multi-viewpoint image information generation unit 43 outputs not only the above color images #1 and #2 and the parallax images D#1 and #2 but also the parallax related information.

More specifically, the multi-viewpoint image information generation unit 43 receives, from the outside, the base line length L which is the distance between the cameras 41 and 42 (the distance between each of the cameras 41 and 42 and the viewpoint of the reference), the focal length f, and the position information representing the positional relationship of the cameras 41 and 42.

In this case, the position information indicates, for example, whether the cameras 41 and 42 are arranged at the left side or the right side with respect to the cameras 42 and 41 serving as the viewpoint of the reference. In FIG. 6, the position information indicates that the camera 41 is at the right side of the camera 42 (the camera 42 is at the left side of the camera 41). In this case, with the position information, it is possible to recognize that the viewpoint #1 is at the right side and the viewpoint #2 is at the left side.

The multi-viewpoint image information generation unit 43 detects the maximum value dmax and the minimum value dmin of (x component of) the image-capturing parallax vector d, for each of the image-capturing parallax vector d1 given by the camera 41 and the image-capturing parallax vector d2 given by the camera 41.

Then, the multi-viewpoint image information generation unit 43 outputs, as the parallax related information, the maximum value dmax and the minimum value dmin of the image-capturing parallax vector d, the base line length L, the focal length f, and the position information.

The color images C#1 and C#2, the parallax images D#1 and D#2, and the parallax related information which are output by the multi-viewpoint image information generation unit 43 are provided to the multi-viewpoint image encoder of FIG. 5.

In this case, in order to simplify the explanation, the cameras 41 and 42 are arranged on a straight line on the same plane perpendicular to the color image plane and the image-capturing parallax vector d (d1 and d2) are vectors of which y component is zero, but the cameras 41 and 42 may also be arranged on different planes perpendicular to the color image plane. In this case, it is a vector in which both of x component and y component of the image-capturing parallax vector d are values other than zero.

[Overview of MVC Method]

Figure 7:
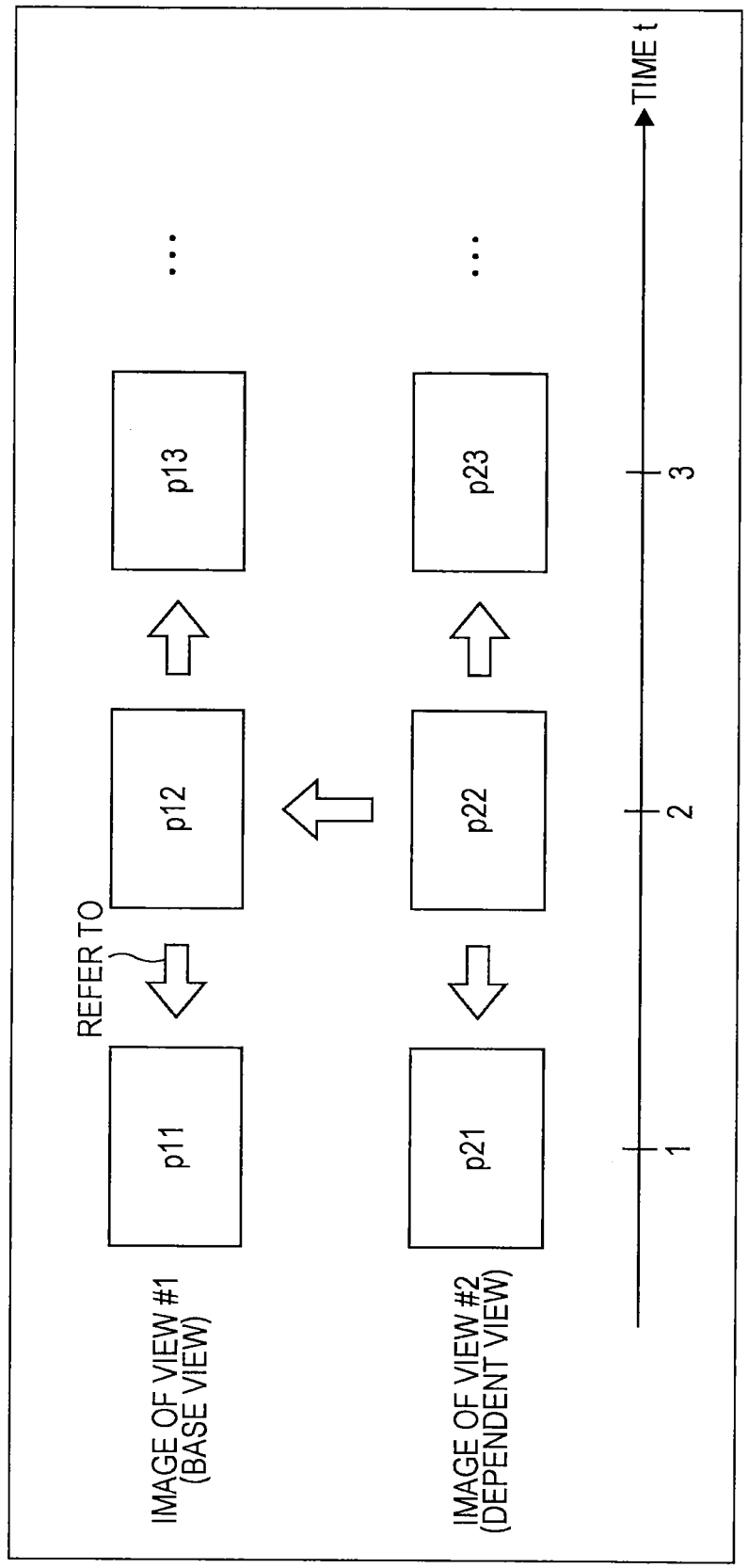
FIG. 7 is a figure for explaining a picture which is referred to when generating a prediction image in prediction encoding according to the MVC method.

FIG. 7 is a figure for explaining a picture which is referred to when generating a prediction image in prediction encoding according to the MVC method.

Now, suppose that pictures of the image of the viewpoint #1 which is the Base View image are denoted as p11, p12, p13, . . . in the order of (display) time, and pictures of the image of the viewpoint #2 which is the Dependent View image are denoted as p21, p22, p23, . . . , in the order of time.

For example, the picture p12 which is the Base View picture is prediction-encoded by referring to, as necessary, for example, the pictures p11 and p13 which are the Base View pictures thereof.

More specifically, prediction (prediction image generation) of the Base View picture p12 can be done by referring to only the pictures p11 and p13 which are pictures of other times of the Base View.

For example, the picture p22 which is the Dependent View picture is prediction-encoded by referring to, as necessary, for example, the pictures p21 and p23 which are the Dependent View pictures thereof and further the Base View picture p12 of another view.

More specifically, prediction of the Dependent View picture p22 can be done by referring to not only the pictures p21 and p23 which are pictures of other times of the Dependent View but also the Base View picture p12 which is a picture of another view.

In this case, the prediction that is done by referring to the picture of the same view as the picture of the encoding target is also referred to as time prediction, and the prediction that is done by referring to the picture of a view different from the picture of the encoding target is also referred to as parallax prediction.

As described above, in the MVC method, only the time prediction can be done for the Base View picture, and the time prediction and the parallax prediction can be done for the Dependent View picture.

In the MVC method, the picture of which view is different from the picture of the encoding target and which is referred to in the parallax prediction must be the picture of the same time as the picture of the encoding target.

The encoders 11, 12, 21 and 22 constituting the multi-viewpoint image encoder of FIG. 5 performs prediction (prediction image generation) according to the MVC method.

Figure 8:
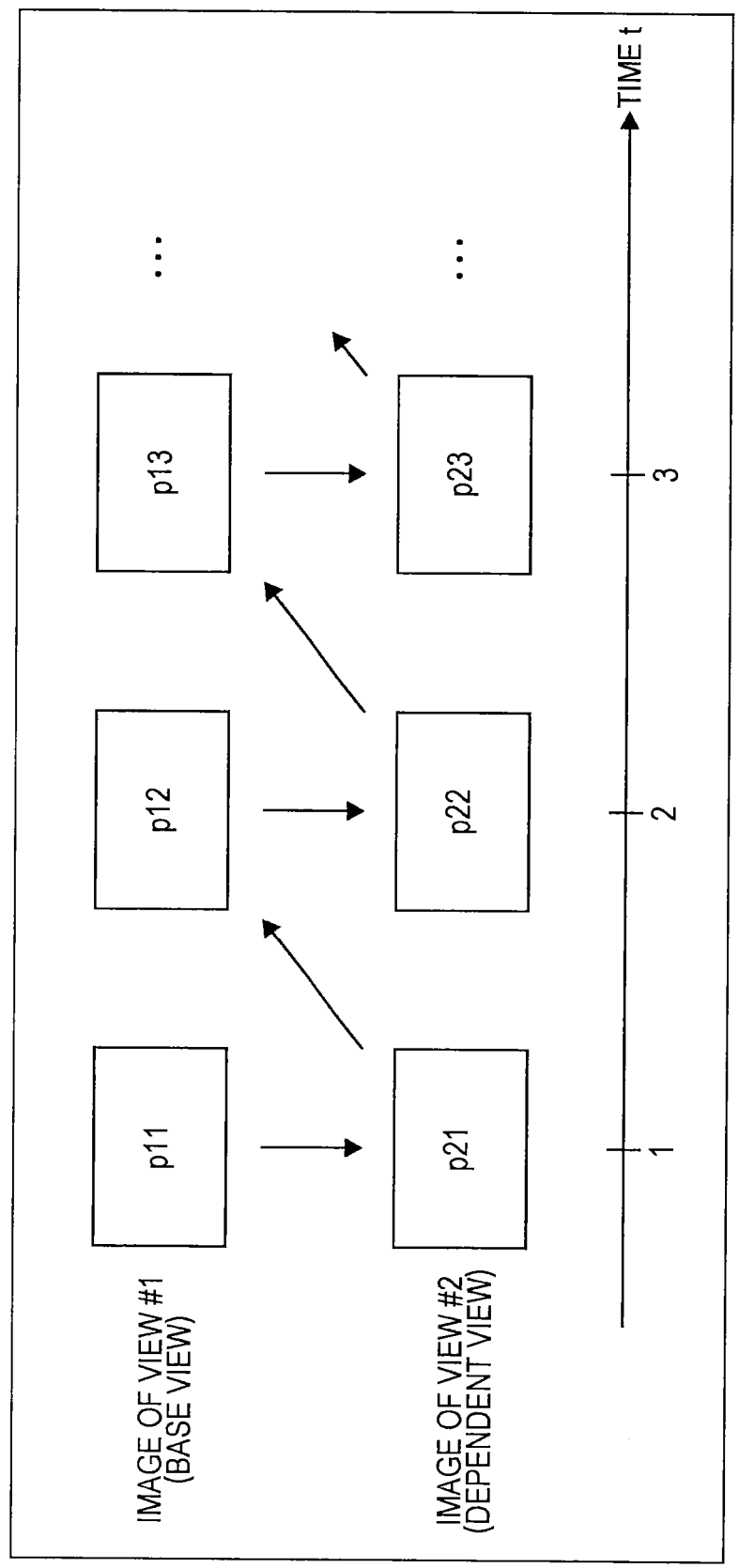
FIG. 8 is a figure for explaining the order of encoding (and decoding) of pictures according to the MVC method.

FIG. 8 is a figure for explaining the order of encoding (and decoding) of pictures according to the MVC method.

Like FIG. 7, suppose that pictures of the image of the viewpoint #1 which is the Base View image are denoted as p11, p12, p13, . . . in the order of (display) time, and pictures of the image of the viewpoint #2 which is the Dependent View image are denoted as p21, p22, p23, . . . , in the order of time.

Now, suppose that, in order to simplify the explanation, when the picture of each view is encoded in the order of time, first, the picture p11 of which time t is 1 which is the first in the Base View is encoded and thereafter the picture p21 of the same time, i.e., of which time t is 1 in the Dependent View is encoded.

When (all) the pictures which are of the same time, i.e., time=1, of the Dependent View have been encoded, the picture p12 which is a subsequent time, i.e., time=2, of the Base View is encoded, and thereafter, the picture p22 which is the same time, i.e., time=2, of the Dependent View is encoded.

In the following explanation, the pictures of the Base View and the pictures of the Dependent View are encoded in the same order.

The encoders 11, 12, 21 and 22 constituting the multi-viewpoint image encoder of FIG. 5 encode pictures according to the order of the MVC method.

[Configuration Example of Encoder 11]

Figure 9:
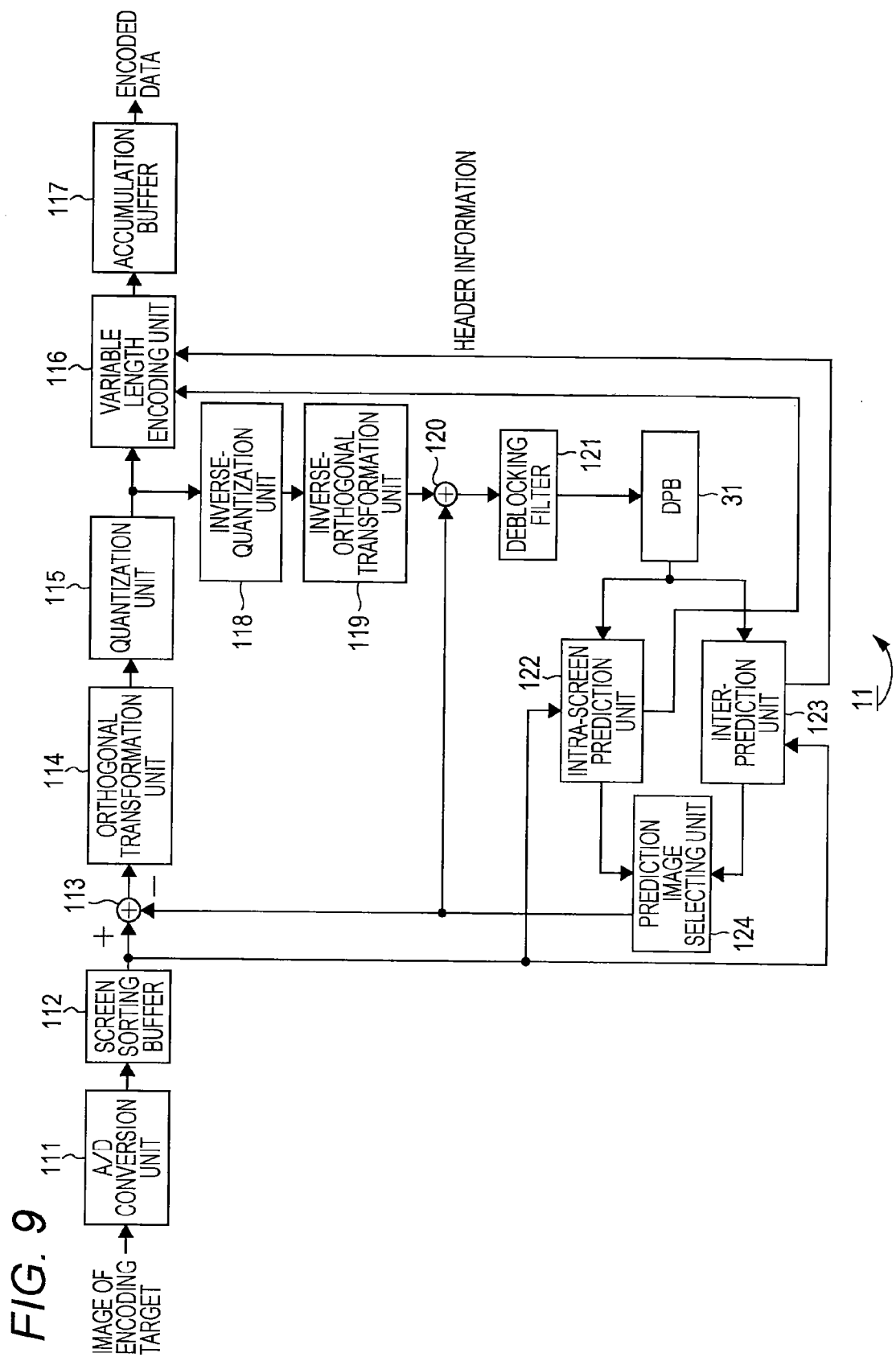
FIG. 9 is a block diagram illustrating a configuration example of an encoder 11.

FIG. 9 is a block diagram illustrating a configuration example of an encoder 11 of FIG. 5.

The encoders 12 and 21 of FIG. 5 are also configured in the same manner as the encoder 11, and, for example, encode pictures in accordance with the MVC method.

In FIG. 9, the encoder 11 includes an A/D (Analog/Digital) conversion unit 111, a screen sorting buffer 112, a calculation unit 113, an orthogonal transformation unit 114, a quantization unit 115, a variable length encoding unit 116, an accumulation buffer 117, an inverse-quantization unit 118, an inverse-orthogonal transformation unit 119, a calculation unit 120, a deblocking filter 121, an intra-screen prediction unit 122, an inter-prediction unit 123, and a prediction image selecting unit 124.

The A/D conversion unit 111 successively receives, in the order of display, pictures of the color image C#1 of the viewpoint #1 which is the image of the encoding target (motion picture).

When the received pictures are an analog signal, the A/D conversion unit 111 performs A/D conversion on the analog signal, and provides it to the screen sorting buffer 112.

The screen sorting buffer 112 temporarily stores pictures given by the A/D conversion unit 111, and reads the pictures in accordance with the structure of GOP (Group of Pictures) determined in advance, thus performs sorting for sorting the order of pictures from the order of display into the order of encoding (the order of decoding).

The pictures read from the screen sorting buffer 112 are provided to the calculation unit 113, the intra-screen prediction unit 122, and the inter-prediction unit 123.

The calculation unit 113 receives pictures from the screen sorting buffer 112, and in addition, receives prediction images generated by the intra-screen prediction unit 122 or the inter-prediction unit 123 from the prediction image selecting unit 124.

The calculation unit 113 adopts a picture read from the screen sorting buffer 112 as a target picture of encoding target, and further, adopts a macro block constituting the target picture as a target block of encoding target in order.

Then, as necessary, the calculation unit 113 calculates a subtracted value obtained by subtracting pixel values of the prediction image provided by the prediction image selecting unit 124 from pixel values of the target block, and provides them to the orthogonal transformation unit 114.

The orthogonal transformation unit 114 applies orthogonal transformation such as discrete cosine transform and Karhunen-Loeve conversion on (pixel values or residual obtained by subtracting the prediction image of) the target block given by the calculation unit 113, and provides the transformation coefficient obtained as the result to the quantization unit 115.

The quantization unit 115 quantizes the transformation coefficients provided from the orthogonal transformation unit 114, and provides the quantization values obtained as the result to the variable length encoding unit 116.

The variable length encoding unit 116 applies lossless encoding such as variable length encoding (for example, CAVLC (Context-Adaptive Variable Length Coding) and the like) and arithmetic encoding (for example, CABAC (Context-Adaptive Binary Arithmetic Coding) and the like) on the quantization values given by the quantization unit 115, and provides the encoded data obtained as the result to the accumulation buffer 117.

The variable length encoding unit 116 receives the quantization values given by the quantization unit 115 and also receives header information included in the header of the encoded data from the intra-screen prediction unit 122 and the inter-prediction unit 123.

The variable length encoding unit 116 encodes the header information given by the intra-screen prediction unit 122 and the inter-prediction unit 123, and puts it into the encoded data.

The accumulation buffer 117 temporarily stores the encoded data given by the variable length encoding unit 116, and outputs the data with a predetermined data rate.

The encoded data which are output from the accumulation buffer 117 are provided to the multiplexing unit 32 (FIG. 5).

The quantization values obtained by the quantization unit 115 are provided not only to the variable length encoding unit 116 but also to the inverse-quantization unit 118. The inverse-quantization unit 118, inverse-orthogonal transformation unit 119, and calculation unit 120 perform local decoding.

More specifically, the inverse-quantization unit 118 dequantizes the quantization values given by the quantization unit 115 into transformation coefficients, and provides them to the inverse-orthogonal transformation unit 119.

The inverse-orthogonal transformation unit 119 performs inverse-orthogonal transformation on the transformation coefficients given by the inverse-quantization unit 118, and provides them to the calculation unit 120.

As necessary, the calculation unit 120 adds pixel values of the prediction image provided by the prediction image selecting unit 124 to the data provided by the inverse-orthogonal transformation unit 119, thereby obtaining the decoded image obtained by decoding (locally decoding) the target block and providing it to the deblocking filter 121.

The deblocking filter 121 filters the decoded image provided by the calculation unit 120, removes (reduces) block noise in the decoded image, and provides it to the DPB 31 (FIG. 5).

In this case, the DPB 31 stores the decoded image provided by the deblocking filter 121, i.e., the pictures of the color image C#1 which are encoded by the encoder 11 and locally decoded, as (a candidate) of reference picture which is referred to when generating the prediction image used for prediction encoding performed later in terms of time (encoding in which the calculation unit 113 performs subtraction of the prediction image).

As explained in FIG. 5, the DPB 31 is shared by the encoders 11, 12, 21 and 22, and therefore, the DPB 31 stores not only the pictures of the color image C#1 encoded by the encoder 11 and locally decoded but also the pictures of the color image C#2 encoded by the encoder 12 and locally decoded, the pictures of the parallax image D#1 encoded by the encoder 21 and locally decoded, and the pictures of the parallax image D#2 encoded by the encoder 22 and locally decoded.

It should be noted that local decoding with the inverse-quantization unit 118, the inverse-orthogonal transformation unit 119, and the calculation unit 120 is done for, e.g., the I picture, P picture, and Bs picture which are reference-enabled pictures that can be reference pictures, and the DPB 31 stores the decoded images of the I picture, P picture, and Bs picture.

When the target picture is I picture, P picture, or B picture (including Bs picture) that can be subjected to intra-prediction (intra-screen prediction), the intra-screen prediction unit 122 reads a portion of the target picture that is already locally decoded (decoded image) from the DPB 31. Then, the intra-screen prediction unit 122 adopts a portion of the decoded image of the target picture that is read from the DPB 31 as the prediction image of the target block of the target picture provided from the screen sorting buffer 112.

Further, the intra-screen prediction unit 122 derives the encoding cost required to encode the target block using the prediction image, i.e., the encoding cost required to encode residual and the like of the target block with respect to the prediction image, and provides it as well as the prediction image to the prediction image selecting unit 124.

When the target picture is P picture or B picture (including Bs picture) that can be subjected to inter-prediction, the inter-prediction unit 123 reads, as the reference pictures, one or more pictures encoded and locally decoded before the target picture from the DPB 31.

The inter-prediction unit 123 also detects, with ME using the reference picture and the target block of the target picture given by the screen sorting buffer 112, a deviation vector representing deviation (parallax, movement) of the target block and the corresponding block corresponding to the target block in the reference picture (for example, block where, e.g., SAD (Sum of Absolute Differences) with respect to the target block is the minimum).

In this case, when the reference picture is a picture of the same view (viewpoint) as the target picture, then the deviation vector detected with the ME using the target block and the reference picture is a motion vector representing motion (deviation in terms of time) between the target block and the reference picture.

In this case, when the reference picture is a picture of a view different from the target picture, then the deviation vector detected with the ME using the target block and the reference picture is a parallax vector representing parallax (deviation in terms of space) between the target block and the reference picture.

As described above, the parallax vector derived with the ME is also called calculation parallax vector so that it is distinguished from the image-capturing parallax vector explained in FIG. 6.

In the present embodiment, in order to simplify the explanation, the image-capturing parallax vector is a vector of which y component is zero, but the calculation parallax vector detected with the ME represents the deviation (positional relationship) between the target block and the block serving as an area of the reference picture where the SAD and the like with the target block is the minimum (corresponding block), and therefore, the y component is not necessarily zero.

The inter-prediction unit 123 performs deviation compensation of the reference picture given by the DPB 31 (motion compensation for compensating deviation for motion or parallax compensation for compensating deviation for parallax) in accordance with the deviation vector of the target block, thus generating the prediction image.

More specifically, inter-prediction unit 123 obtains, as the prediction image, the corresponding block which is the block (area) at the position moved (deviated) in accordance with the deviation vector of the target block from the position of the target block in the reference picture.

Further, the inter-prediction unit 123 derives the encoding cost required to encode the target block using the prediction image for each inter-prediction mode which is different with regard to the reference picture used for generation of the prediction image, the macro block-type explained later, and the like.

Then, the inter-prediction unit 123 adopts the inter-prediction mode of which encoding cost is the minimum as the optimum inter-prediction mode which is the most suitable inter-prediction mode, and provides the prediction image selecting unit 124 with the encoding cost and the prediction image obtained with the optimum inter-prediction mode.

The prediction image selecting unit 124 selects one of the prediction images given by the intra-screen prediction unit 122 and inter-prediction unit 123 of which encoding cost is smaller, and provides it to the calculation units 113 and 120.

In this case, intra-screen prediction unit 122 provides information about the intra-prediction to the variable length encoding unit 116 as header information, and the inter-prediction unit 123 provides information about the inter-prediction (information about deviation vector, reference index assigned for the reference picture, and the like) to the variable length encoding unit 116 as header information.

The variable length encoding unit 116 selects the header information with which a prediction image of which encoding cost is smaller is generated, from among the header information given by the intra-screen prediction unit 122 and inter-prediction unit 123, and puts it in the header of the encoded data.

[Macro Block-Type]

Figure 10:
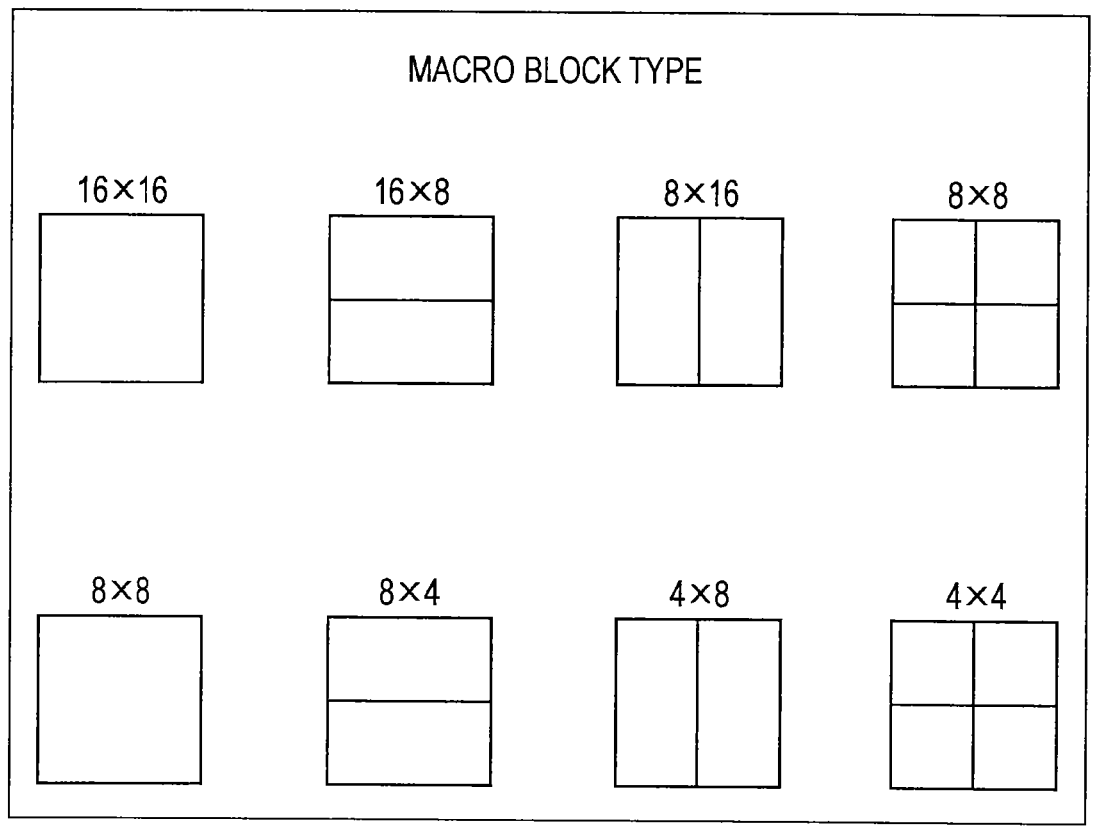
FIG. 10 is a figure for explaining a macro block-type according to the MVC (AVC) method.

FIG. 10 is a figure for explaining a macro block-type according to the MVC (AVC) method.

A macro block is a block horizontal and vertical sizes are, e.g., 16 by 16 pixels, but in the MVC method, ME (and prediction image generation) can be done for each partition upon dividing the macro block into partition.

More specifically, in the MVC method, the macro block may be divided into partitions having any one of 16×16 pixels, 16×8 pixels, 8×16 pixels, or 8×8 pixels, and the ME may be done for each partition, and the deviation vector (motion vector, or calculation parallax vector) can be detected.

In the MVC method, the partition having 8×8 pixels may be further divided into sub-partitions having any one of 8×8 pixels, 8×4 pixels, 4×8 pixels, or 4×4 pixels, and the ME may be performed for each sub-partition, whereby the deviation vector (motion vector or calculation parallax vector) can be detected.

The macro block-type indicates what kind of partitions (and further sub-partitions) the macro block is divided into.

In the inter-prediction of the inter-prediction unit 123 (FIG. 9), the encoding cost of each macro block-type is calculated as the encoding cost of each inter-prediction mode, and the inter-prediction mode (macro block-type) of which encoding cost is the minimum is selected as the optimum inter-prediction mode.

[Prediction Vector (PMV (Predicted Motion Vector))]

Figure 11:
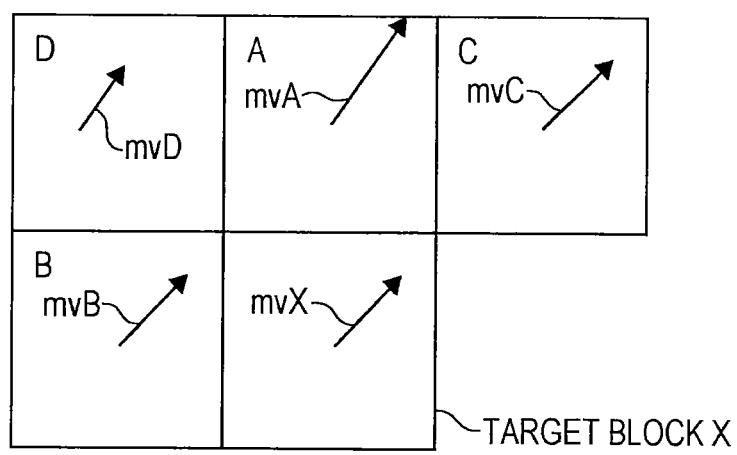
FIG. 11 is a figure for explaining a prediction vector according to the MVC (AVC) method.

FIG. 11 is a figure for explaining a prediction vector (PMV) according to the MVC (AVC) method.

In the inter-prediction of the inter-prediction unit 123 (FIG. 9), the deviation vector of the target block (motion vector or calculation parallax vector) is detected with the ME, and using the deviation vector, the prediction image is generated.

The deviation vector is required by the decoder to decode an image, and therefore, it is necessary to encode information about the deviation vector and put it into the encoded data, but if the deviation vector is encoded as it is, the amount of codes of the deviation vector increases, which may reduce the encoding efficiency.

More specifically, in the MVC method, as illustrated in FIG. 10, the macro block is divided into partitions having 8×8 pixels, and further, each of the partitions having 8×8 pixels may be divided into sub-partitions having 4×4 pixels. In this case, one macro block is ultimately divided into 4×4 sub-partitions, and therefore, one macro block may produce 16 (=4×4) deviation vectors, and if the deviation vectors are encoded as they are, the amount of codes of the deviation vectors may increase, which may reduce the encoding efficiency.

For this reason, in the MVC (AVC) method, vector prediction is performed to predict the deviation vector, and the residual of the deviation vector with respect to the prediction vector obtained as the result of the vector prediction is encoded.

More specifically, suppose that any given macro block X is a target block of encoding target. In order to simplify the explanation, the target block X is divided into a partition having 16×16 pixels (target block X is made into partition as it is).

As illustrated in FIG. 11, a prediction vector PMVX of a deviation vector mvX of the target block X is calculated according to the expression (6) using a deviation vector mvA of a macro block A adjacent to the upper side of the target block X, a deviation vector mvB of a macro block B adjacent to the left side of the target block X, and a deviation vector mvC of a macro block C adjacent to the upper right side of the target block X among the macro blocks already encoded (in the order of raster scan) when the target block X is encoded.

$$PMVX = med(mvA, mvB, mvC) \qquad (6)$$

In this case, in the expression (6), med ( ) represents a median (central value) of the value in the parenthesis.

When the target block X is, e.g., a macro block at the right end of the picture, the deviation vector mvC of the macro block C cannot be used (unavailable), and in such case, instead of the deviation vector mvC, a deviation vector mvD of a macro block D adjacent to the upper left side of the target block X is used to calculate the prediction vector PMVX.

The calculation of the prediction vector PMVX according to the expression (6) is done independently for each of x component and y component.

The inter-prediction unit 123 (FIG. 9) puts, as information about the deviation vector of the target block X, a difference mvX−PMV between the deviation vector mvX of the target block X and the prediction vector PMVX into the header information.

FIGS. 12A to 12C are figures for further explaining a prediction vector according to the MVC (AVC) method.

The generation method of the prediction vector of the MVC method is difference according to a reference index assigned to a reference picture used for generation of a prediction image of a block (macro block) around the target block (which may be hereinafter referred to as prediction reference index).

In this case, the reference picture of the MVC (AVC) method and the reference index will be explained.

In the AVC method, when a prediction image is generated, multiple pictures can be adopted as reference pictures.

Then, with the codec of the AVC method, the reference picture is stored to a buffer called DPB after decoding (local decoding).

In the DPB, a picture referred to for a short time is marked as a short time reference picture (used for short-term reference), a picture referred to for a long time is marked as a long time reference picture (used for long-term reference), and a picture not referred to is marked as a non-reference picture (unused for reference), respectively.

Management methods with which the DPB is managed include two types, i.e., sliding window memory management method (sliding window process) and adaptive memory management method (adaptive memory control process).

In the sliding window memory management method, the DPB is managed according to FIFO (First In First Out) method, and the pictures stored in the DPB are opened in the ascending order of frame_num (caused to be non-reference pictures).

More specifically, in the sliding window memory management method, I (Intra) picture, P (Predictive) picture, and Bs picture which is reference-enabled B (Bi-directional Predictive) picture are stored as short time reference pictures in the DPB.

Then, after as many reference pictures as reference pictures (reference pictures that can be reference pictures) that can be stored in the DPB are stored, the earliest (oldest) short time reference picture among the short time reference pictures stored in the DPB is opened.

It should be noted that when the DPB stores a long time reference picture, the long time reference picture stored in the DPB is not affected by the sliding window memory management method. More specifically, in the sliding window memory management method, those of the reference pictures that are managed by the FIFO method are only the short time reference pictures.

In the adaptive memory management method, a command called MMCO (Memory management control operation) is used to manage pictures stored in the DPB.

According to the MMCO command, with the reference picture stored in the DPB being the target, a short time reference picture is set as a non-reference picture, and a long-term frame index which is a reference index for managing a long time reference picture is assigned to a short time reference picture, whereby, e.g., a short time reference picture can be set as a long time reference picture, the maximum value of the long-term frame index can be set, and all the reference pictures can be set as non-reference pictures.

In the AVC method, motion compensation is performed on reference pictures stored in the DPB, whereby the inter-prediction for generating the prediction image is done, and for the inter-prediction of B picture (including Bs picture), as many as two reference pictures can be used. The inter-predictions using the two reference pictures are called L0 (List 0) prediction and L1 (List 1) prediction, respectively.

For B picture (including Bs picture), L0 prediction or L1 prediction, or both of L0 prediction and L1 prediction are used as inter-prediction. For P picture, only L0 prediction is used as inter-prediction.

In the inter-prediction, the reference picture referred to for generation of the prediction image is managed by a reference list (Reference Picture List).

In the reference list, a reference index which is an index for designating the reference picture referred to for generation of the prediction image (Reference Index) is assigned to the reference picture stored in the DPB.

As described above, when the target picture is P picture, only the L0 prediction is used for the inter-prediction of P picture, and accordingly the reference index is assigned only for the L0 prediction.

As described above, when the target picture is B picture (including Bs picture), both of the L0 prediction and L1 prediction may be used for the inter-prediction of B picture, and accordingly the reference index is assigned for both of the L0 prediction and the L1 prediction.

In this case, the reference index for the L0 prediction is also referred to as L0 index, and the reference index for the L1 prediction is also referred to as L1 index.

When the target picture is P picture, the reference index is assigned in the default mode of the AVC method (default value): a reference index (L0 index) having a smaller value is assigned to a reference picture stored in the DPB that is located later in the order of decoding.

The reference index is an integer value of zero or more, and the minimum value thereof is zero. Therefore, when the target picture is P picture, zero is assigned, as the L0 index, to the reference picture decoded immediately before the target picture.

When the target picture is B picture (including Bs picture), the reference index (L0 index and L1 index) is assigned to the reference picture stored in the DPB in the order of POC (Picture Order Count), i.e., the order of display, in the default mode of the AVC.

More specifically, for the L0 prediction, the L0 index is assigned to the reference picture before the target picture in terms of time in the order of display in such a manner that the closer the reference picture is to the target picture, the smaller L0 index is assigned thereto, and thereafter, the L0 index is assigned to the reference picture after the target picture in terms of time in the order of display in such a manner that the closer the reference picture is to the target picture, the smaller L0 index is assigned thereto.

For the L1 prediction, the L1 index is assigned to the reference picture after target picture in terms of time in the order of display in such a manner that the closer the reference picture is to the target picture, the smaller L1 index is assigned thereto, and thereafter, the L0 index is assigned to the reference picture before target picture in terms of time in the order of display in such a manner that the closer the reference picture is to the target picture, the smaller L1 index is assigned thereto.

In the default mode of the AVC method explained above, the reference index (L0 index and L1 index) is assigned such that the short time reference picture is adopted as target. The reference index is assigned to the long time reference picture, after the reference index is assigned to the short time reference picture.

Therefore, in the default of the AVC, a reference index of a value larger than the short time reference picture is assigned to the long time reference picture.

In the AVC method, the reference index is assigned according to the default method as described above. Alternatively, any given assigning process may be done using a command called Reference Picture List Reordering (which may be hereinafter referred to as RPLR Command).

When, after the reference index is assigned using the RPLR command, there is a reference picture to which no reference index is assigned, then a reference index is assigned to the reference picture in accordance with the default method.

In the MVC (AVC) method, the prediction vector PMVX of the deviation vector mvX of the target block X is derived according to different method depending on the prediction reference index of each of the macro block A adjacent to the upper side of the target block X, the macro block B adjacent to the left side thereto, and the macro block C adjacent to the upper right side thereto as illustrated in FIGS. 12A to 12C (the reference index assigned to the reference picture used for generation of the prediction image of each of the macro blocks A, B and C).

More specifically, now suppose that prediction reference index ref_idx of the target block X is, for example, zero.

More specifically, as illustrated in FIG. 12A, when the three macro blocks A to C adjacent to the target block X include one macro block of which prediction reference index ref_idx is zero which is the same as the target block X, the deviation vector of the macro block (macro block of which prediction reference index ref_idx is zero) is adopted as the prediction vector PMVX of the deviation vector mvX of the target block X.

In this case, in FIG. 12A, only the macro block A of the three macro blocks A to C adjacent to the target block X is the macro block of which prediction reference index ref_idx is zero 0, and therefore, the deviation vector mvA of the macro block A is adopted as the prediction vector PMVX of (the deviation vector mvX of) the target block X.

As illustrated in FIG. 12B, when the three macro blocks A to C adjacent to the target block X include two or more macro blocks of which prediction reference index ref_idx is zero which is the same as the target block X, the median of the deviation vectors of two or more macro blocks of which prediction reference index ref_idx is zero is adopted as the prediction vector PMVX of the target block X.

In this case, in FIG. 12B, all of the three macro blocks A to C adjacent to the target block X are macro blocks of which prediction reference index ref_idx is zero, and therefore, the median med of the deviation vector mvA of the macro block A, the deviation vector mvB of the macro block B, and the deviation vector mvC of the macro block C (mvA, mvB, mvC) is adopted as the prediction vector PMVX of the target block X.

As illustrated in FIG. 12C, when the three macro blocks A to C adjacent to the target block X include no macro block of which prediction reference index ref_idx is zero which is the same as the target block X, zero vector is adopted as the prediction vector PMVX of the target block X.

In this case, in FIG. 12C, the three macro blocks A to C adjacent to the target block X include no macro block of which prediction reference index ref_idx is zero, zero vector is adopted as the prediction vector PMVX of the target block X.

In the MVC method, when the target block is encoded using the reference picture to which reference index rev_idx having a value of zero is assigned, the target block may be made into a skip macro block.

For the skip macro block, neither the residual (residual of the target block and the prediction image) nor information about the deviation vector is encoded. Then, the decoder side adopts the prediction vector as the deviation vector of the skip macro block as it is, and a copy of a block (corresponding block) at a position deviated by the deviation vector from the position of the skip macro block in the reference picture is adopted as the decoding result of the skip macro block.

Whether the target block is made into skip macro block or not is decided (determined) on the basis of, e.g., the amount of codes of encoded data and the encoding cost of the target block although this depends on the specification of the encoder.

[Configuration Example of Encoder 22]

Figure 13:
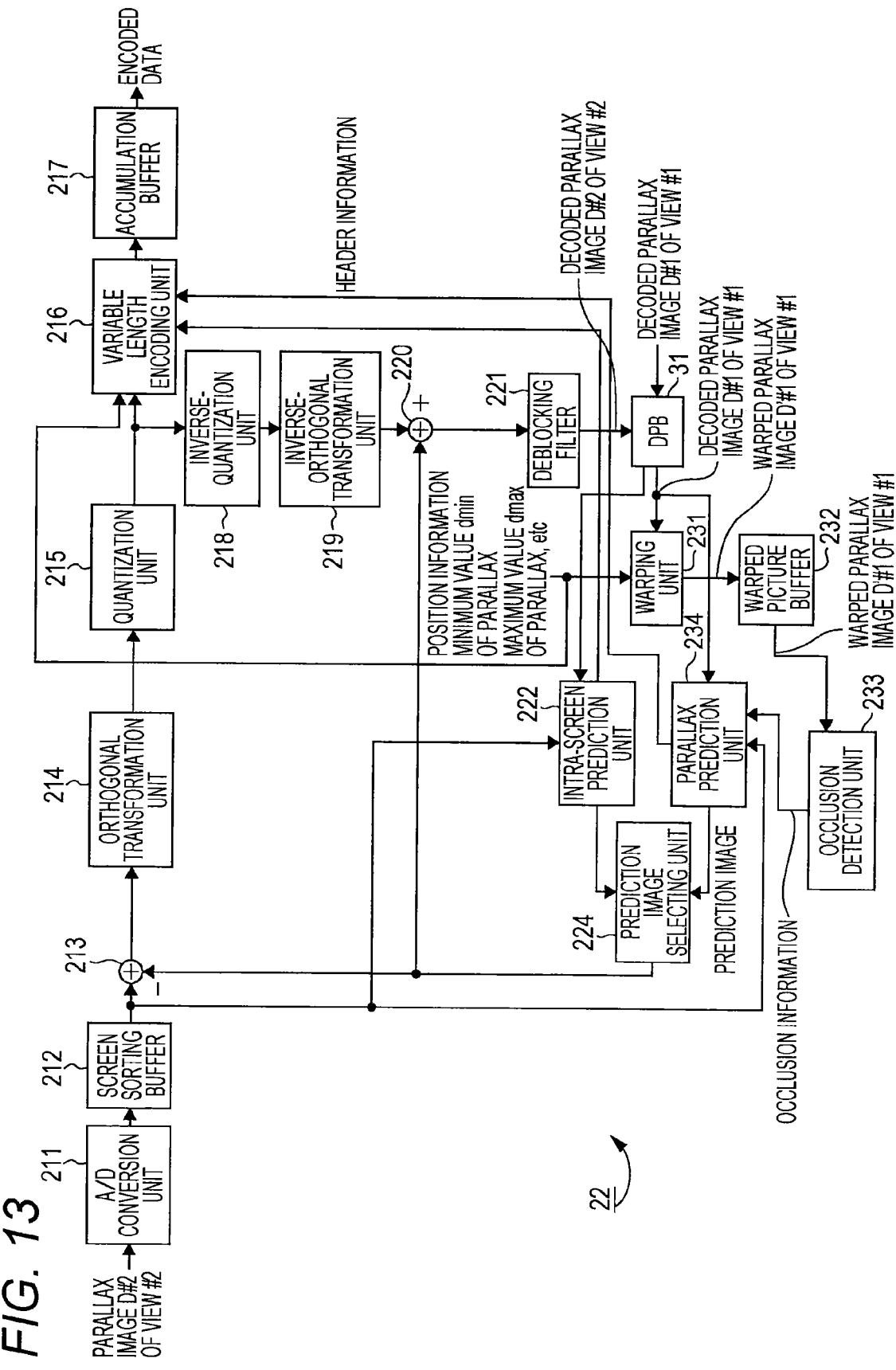
FIG. 13 is a block diagram illustrating a configuration example of an encoder 22.

FIG. 13 is a block diagram illustrating a configuration example of an encoder 22 of FIG. 5.

The encoder 22 encodes the parallax image D#2 of the viewpoint #2 which is the image of the encoding target using the MVC method. More specifically, the encoder 22 encodes the parallax image D#2 of the viewpoint #2 which is the image of the encoding target as explained in FIG. 3.

In FIG. 13, the encoder 22 includes an A/D conversion unit 211, a screen sorting buffer 212, a calculation unit 213, an orthogonal transformation unit 214, a quantization unit 215, a variable length encoding unit 216, an accumulation buffer 217, an inverse-quantization unit 218, an inverse-orthogonal transformation unit 219, a calculation unit 220, a deblocking filter 221, an intra-screen prediction unit 222, a prediction image selecting unit 224, a warping unit 231, a warped picture buffer 232, an occlusion detection unit 233, and a parallax prediction unit 234.

The A/D conversion unit 211 to the intra-screen prediction unit 222 and the prediction image selecting unit 224 are respectively configured in the same manner as the A/D conversion unit 111 to the intra-screen prediction unit 122 and the prediction image selecting unit 124 of the encoder 11 of FIG. 9, and therefore explanation thereabout is omitted as necessary.

In FIG. 13, the DPB 31 receives the decoded image from the deblocking filter 221, and more specifically, the DPB 31 receives the picture of the parallax image (which may be hereinafter referred to as decoded parallax image) D#2 which is encoded by the encoder 22 and locally decoded, and stores it as the reference picture.

As explained in FIGS. 5 and 9, the DPB 31 also receives and stores the picture of the color image C#1 which is encoded by the encoder 11 and locally decoded, the picture of the color image C#2 which is encoded by the encoder 12 and locally decoded, and the picture of the parallax image (decoded parallax image) D#1 which is encoded by the encoder 21 and locally decoded.

In the encoder 22, not only the picture of the decoded parallax image D#2 given by the deblocking filter 221 but also the decoded parallax image D#1 obtained by the encoder 21 is used for encoding of the parallax image D#2 which is the encoding target, and therefore, FIG. 13 shows an arrow indicating that the decoded parallax image D#1 obtained by the encoder 21 is provided to the DPB 31.

The warping unit 231 receives the maximum value dmax and the minimum value dmin of the image-capturing parallax vector d (the image-capturing parallax vector d1 of the viewpoint #1), the base line length L, the focal length f, and position information as the parallax related information (FIG. 5).

The warping unit 231 obtains (reads) the picture (the same time picture as the target picture) of the decoded parallax image D#1 among the pictures of the decoded parallax images D#1 and D#2 stored in the DPB 31.

Then, the warping unit 231 warps the picture of the decoded parallax image D#1 obtained from the DPB 31 using the parallax related information as necessary, whereby the warping unit 231 generates the picture of the warped parallax image D'#1 which is the warped image obtained by converting the picture of the decoded parallax image D#1 into the image (parallax image) obtained with the viewpoint #2.

More specifically, the warping unit 231 uses the maximum value dmax and the minimum value dmin of the image-capturing parallax vector d to convert the parallax value v which is the pixel value of each pixel of the picture of the decoded parallax image D#1 into the image-capturing parallax vector d (d1) of each pixel according to the expression (4).

In this case, when not a parallax image but a depth image is used as the parallax information image, the base line length L and the focal length f are used to convert the not-yet-normalized depth Z of the depth value which is the pixel value of the depth image into the image-capturing parallax vector d according to the expression (5).

The warping unit 231 performs warping process to move each pixel of the picture of the decoded parallax image D#1 in accordance with the image-capturing parallax vector d of the pixel, whereby the picture of the warped parallax image D'#1 is generated.

When the warping unit 231 generates the picture of the warped parallax image D'#1 by warping the picture of the decoded parallax image D#1, and the warping unit 231 provides the picture of the warped parallax image D'#1 to the warped picture buffer 232.

In this case, the parallax related information provided to the warping unit 231 is also provided to the variable length encoding unit 216, and as necessary, it is put into the header of the encoded data as header information.

Instead of putting the parallax related information into the header of the encoded data, the multiplexing unit 32 (FIG. 5) may multiplex the information with the encoded data.

The warped picture buffer 232 temporarily stores the picture of the warped parallax image D'#1 given by the warping unit 231.

In the present embodiment, the warped picture buffer 232 storing the picture of the warped parallax image D'#1 is provided in addition to the DPB 31, but one buffer may be provided to be shared by the DPB 31 and the warped picture buffer 232.

As explained in FIG. 2, the occlusion detection unit 233 detects a portion having no pixel value (pixel value-absent portion) in the picture of the warped parallax image D'#1 stored in the warped picture buffer 232 (picture of the same time as the target picture).

Further, the occlusion detection unit 233 detects, as an occlusion portion, a portion in the target picture of the parallax image D#2 at the same position as the pixel value-absent portion.

Then, as explained in FIG. 2, the occlusion detection unit 233 scans, in the horizontal direction (in which parallax exists), each block that can be processing target in the target picture of the parallax image D#2, whereby the occlusion detection unit 233 detects a start pixel S where the occlusion portion starts and an end pixel E where it ends.

When the occlusion detection unit 233 detects the start pixel S and the end pixel E of each block of the target picture, the occlusion detection unit 233 provides the start pixel S and the end pixel E to the parallax prediction unit 234 as the occlusion information.

The parallax prediction unit 234 adopts the picture of the decoded parallax image D#1 of the viewpoint #1 stored in the DPB 31 as the reference picture and performs parallax prediction of the target block (generation of the prediction image).

More specifically, the parallax prediction unit 234 adopts the picture of the decoded parallax image D#1 stored in the DPB 31 as the reference picture and performs the ME, thereby obtaining the calculation parallax vector of the target block.

Further, the parallax prediction unit 234 performs the MC (Motion Compensation) (motion compensation), in which the picture of the decoded parallax image D#1 stored in the DPB 31 is adopted as the reference picture in accordance with the calculation parallax vector of the target block, thus generating the prediction image of the target block.

For each macro block-type, the parallax prediction unit 234 calculates the encoding cost required for encoding of the target block (prediction encoding) using the prediction image obtained from the reference picture using the parallax prediction.

Then, the parallax prediction unit 234 selects the macro block-type of which encoding cost is the minimum, as the optimum inter-prediction mode, and provides the prediction image selecting unit 224 with the prediction image generated in the optimum inter-prediction mode.

Further, the parallax prediction unit 234 outputs information about the optimum inter-prediction mode and the like, as header information, to the variable length encoding unit 216.

As described above, the reference index is assigned to the reference picture, and the reference index assigned to the reference picture referred to when the parallax prediction unit 234 generates the prediction image generated in the optimum inter-prediction mode is selected as the prediction reference index for the target block, and is output to the variable length encoding unit 216 as one of pieces of header information.

Further, the parallax prediction unit 234 uses the occlusion information given by the occlusion detection unit 463 as necessary, and derives the prediction vector (of the calculation parallax vector) of the target block. Then, the parallax prediction unit 234 derives the residual vector which is the difference between the calculation parallax vector of the target block and the prediction vector, and outputs it as one of the pieces of header information to the variable length encoding unit 216.

In FIG. 13, in order to simplify the explanation, the encoder 22 is provided with the parallax prediction unit 234 performing only the parallax prediction of the inter-prediction. Alternatively, like the inter-prediction unit 123 of the encoder 11 of FIG. 9, the encoder 22 can also perform not only the parallax prediction but also the time prediction.

When the encoder 22 performs both of the parallax prediction and the time prediction, the reference index is assigned to the picture of the decoded parallax image D#1 which is the reference picture that can be referred to in the parallax prediction and the picture of the decoded parallax image D#2 (another time picture of which time is different from the target picture) which is the reference picture that can be referred to in the time prediction.

Then, in the encoder 22, for example, the reference index assigned to the reference picture referred to for generation of one of the prediction image generated by the parallax prediction and the prediction image generated by the time prediction, whichever the encoding cost of the target block is smaller, is set as the prediction image generated by the parallax prediction of the target block, and is made into one of pieces of header information.

Figure 14:
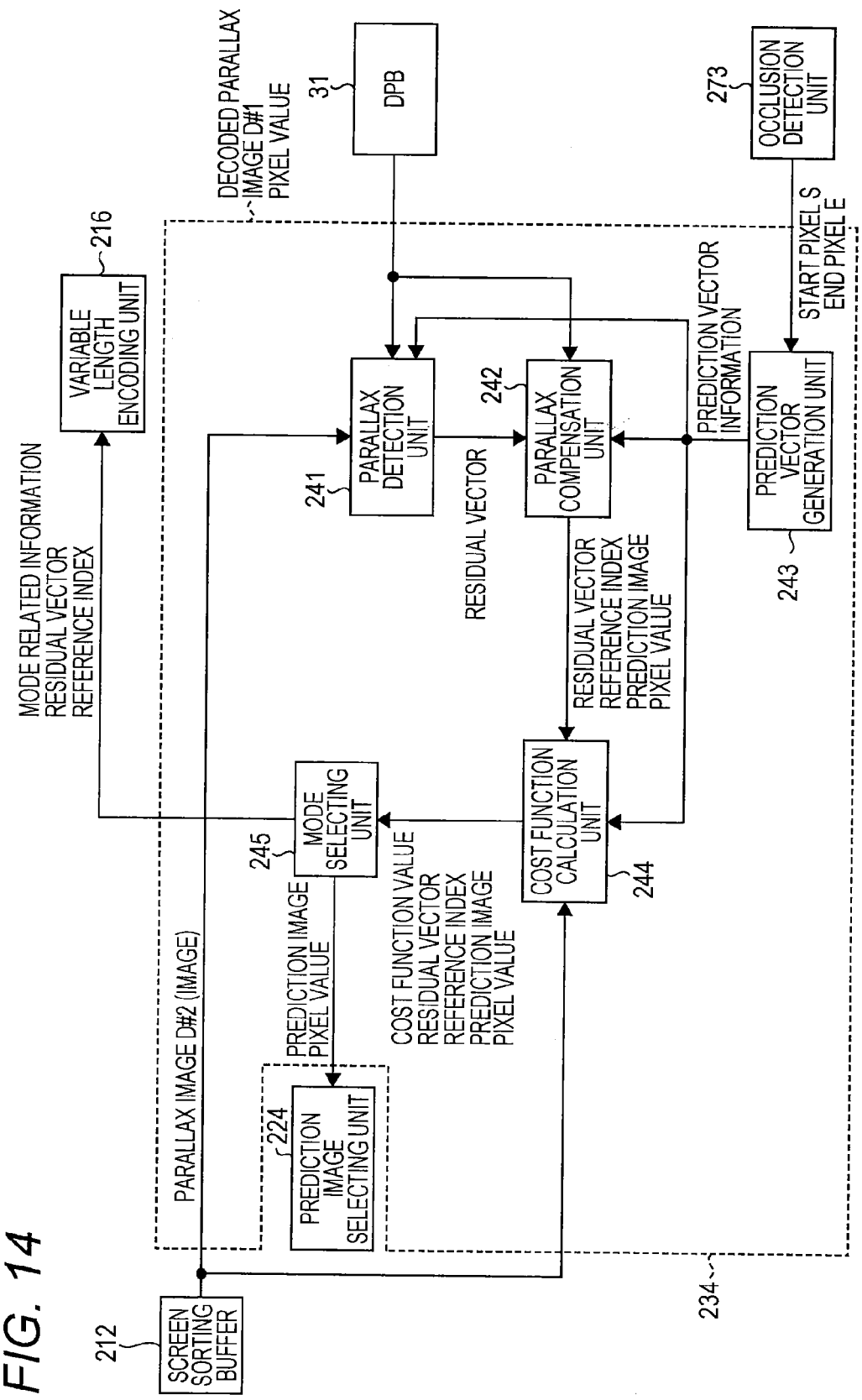
FIG. 14 is a block diagram illustrating a configuration example of a parallax prediction unit 234.

FIG. 14 is a block diagram illustrating a configuration example of a parallax prediction unit 234 of FIG. 13.

In FIG. 14, the parallax prediction unit 234 includes a parallax detection unit 241, a parallax compensation unit 242, a prediction vector generation unit 243, a cost function calculation unit 244, and a mode selecting unit 245.

The parallax detection unit 241 receives the picture of the decoded parallax image D#1 which is the reference picture stored in the DPB 31, and receives the picture of the parallax image D#2 of the encoding target (target picture) from the screen sorting buffer 212.

For the target block in the target picture given by the screen sorting buffer 212, the parallax detection unit 241 performs the ME using the picture of the decoded parallax image D#1 as the reference picture in the same manner as the MVC method, thus detecting, for each macro block-type, the deviation vector representing the deviation between the target block and the corresponding block with which the SAD from the target block is the minimum in the picture of the decoded parallax image D#1, i.e., the calculation parallax vector mv representing the parallax of the target block with respect to the viewpoint #1, for example.

In this case, in order to simplify the explanation, in the picture of the decoded parallax image D#1, the block where the SAD from the target block is the minimum is adopted as the corresponding block used for deriving the calculation parallax vector mv. Alternatively, the parallax detection unit 241 may detect, for example, the corresponding block where the encoding cost COST of the target block is the minimum that is represented by an expression COST=D+λR (ultimately, calculation parallax vector mv).

In this case, in the expression COST=D+λR, D denotes the SAD of the target block and the block at the position that is moved from the target block by the calculation parallax vector mv in the picture of the decoded parallax image D#1, λ denotes the weight for R and is set in accordance with quantization step of the residual of the target block (residual of the target block and the prediction image).

In the expression COST=D+λR, R denotes a value corresponding to the amount of codes of the calculation parallax vector mv.

In the MVC method, the residual vector of the calculation parallax vector mv and the prediction vector thereof is encoded, and therefore, a value corresponding to the amount of codes of the residual vector may be employed as the value R.

When a value corresponding to the amount of codes of the residual vector may be employed as the value R, the parallax detection unit 241 recognizes the prediction vector from the prediction vector information provided from the prediction vector generation unit 243, and derives the residual vector from the prediction vector thereof and the calculation parallax vector mv.

When the parallax detection unit 241 detects the calculation parallax vector mv of the target block, the parallax detection unit 241 derives the residual vector which is the difference between the calculation parallax vector mv and the prediction vector obtained from the prediction vector information provided by the prediction vector generation unit 243, and provides it to the parallax compensation unit 242.

The parallax compensation unit 242 receives not only the residual vector of the calculation parallax vector mv from the parallax detection unit 241 but also the picture of the decoded parallax image D#1 which is the reference picture stored in the DPB 31.

Further, the parallax compensation unit 242 receives the prediction vector information from the prediction vector generation unit 243.

The parallax compensation unit 242 restores the calculation parallax vector mv of the target block from the residual vector given by the parallax detection unit 241 and the prediction vector information given by the prediction vector generation unit 243.

Further, the parallax compensation unit 242 adopts the picture of the decoded parallax image D#1 given by the DPB 31 as the reference picture and performs the deviation compensation (parallax compensation) of the reference picture in the same manner as the MVC method using the calculation parallax vector mv of the target block, thus generating the prediction image of the target block for each macro block-type.

More specifically, the parallax compensation unit 242 obtains, as the prediction image, the corresponding block in the picture of the decoded parallax image D#1 which is a block (area) at the position deviated by the calculation parallax vector mv from the position of the target block.

Then, the parallax compensation unit 242 provides the cost function calculation unit 244 with the prediction image, the residual vector provided by parallax detection unit 241, and the reference index assigned to the reference picture (in this case, the picture of the decoded parallax image D#1) used to generate the prediction image.

The prediction vector generation unit 243 receives the start pixel S and the end pixel E from the occlusion detection unit 233 as the occlusion information.

The prediction vector generation unit 243 uses the occlusion information given by the occlusion detection unit 233 to determine whether the target block is an occlusion block or not.

Then, the prediction vector generation unit 243 generates the prediction vector of the target block in accordance with different vector prediction method depending on whether the target block is an occlusion block or not.

More specifically, when the target block is an occlusion block, the prediction vector generation unit 243 generates the prediction vector of the target block in accordance with the proximity prediction method explained with reference to FIGS. 2 to 4.

Figure 12:
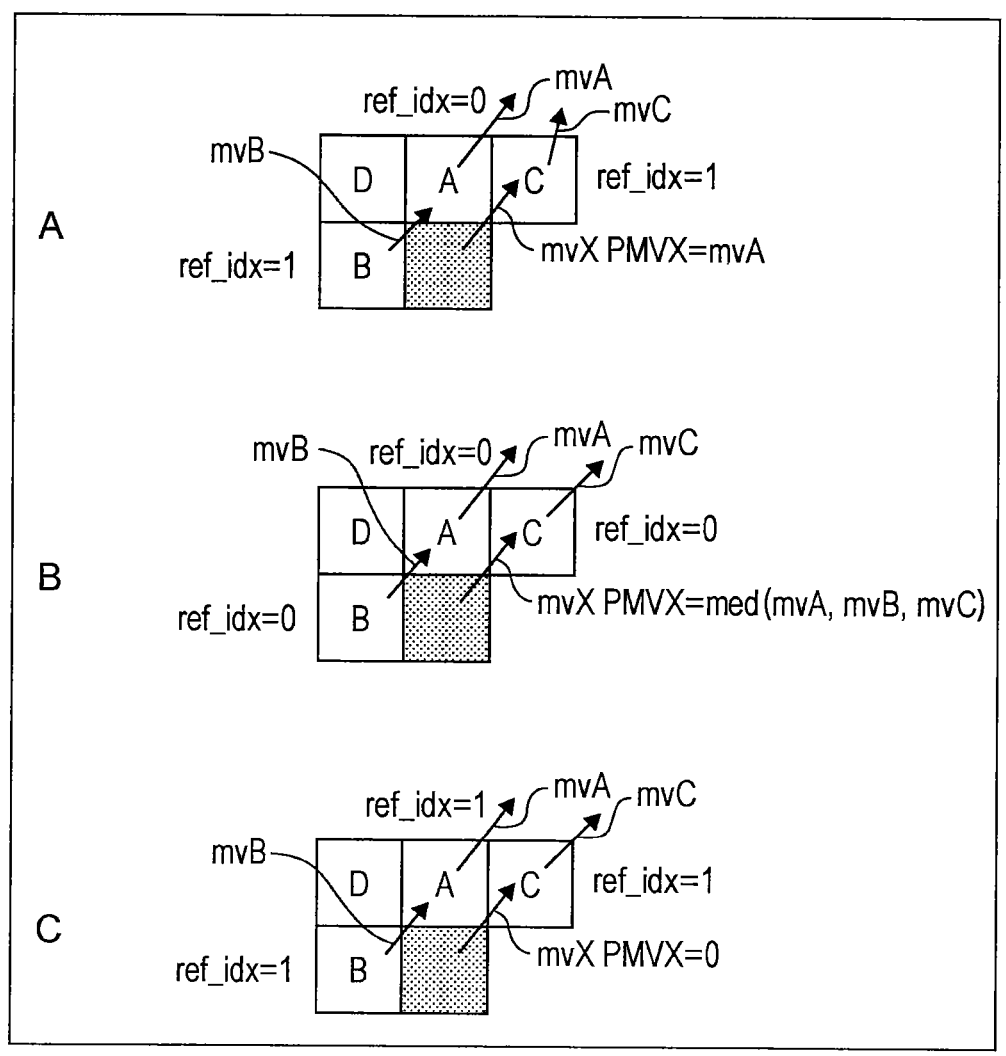
FIGS. 12A to 12C are figures for explaining a prediction vector according to the MVC (AVC) method.

When the target block is not an occlusion block (non-occlusion block), the prediction vector generation unit 243 generates the prediction vector of the target block in accordance with the MVC method explained with reference to FIGS. 11 and 12.

For each macro block-type (FIG. 10), the prediction vector generation unit 243 generates the prediction vector, and provides it as the prediction vector information to the parallax detection unit 241, the parallax compensation unit 242, and the cost function calculation unit 244.

The cost function calculation unit 244 receives the prediction image, the residual vector, and the reference index from the parallax compensation unit 242, and receives the prediction vector information from the prediction vector generation unit 243, and in addition, receives the target picture of the parallax image D#2 from the screen sorting unit buffer 212.

For each macro block-type (FIG. 10), the cost function calculation unit 244 derives the encoding cost required to encode the target block of the target picture given by the screen sorting buffer 212 in accordance with a predetermined cost function for calculating the encoding cost.

More specifically, the cost function calculation unit 244 derives the value MV corresponding to the amount of codes of the residual vector given by the parallax compensation unit 242 and derives the value IN corresponding to the amount of codes of the reference index (prediction reference index) given by the parallax compensation unit 242.

Further, the cost function calculation unit 244 derives the SAD which is the value D corresponding to the residual of the target block with respect to the prediction image given by the parallax compensation unit 242.

The, the cost function calculation unit 244 adopts, for example, $\lambda 1$ and $\lambda 2$ as weights, and derives the encoding cost COST for each macro block-type in accordance with the expression COST=D+$\lambda 1$×MV+$\lambda 2$×IN.

When the cost function calculation unit 244 derives the encoding cost (cost function value) for each macro block-type, the cost function calculation unit 244 provides the encoding cost as well as the reference index, the prediction image, and the residual vector to the mode selecting unit 245.

The mode selecting unit 245 detects the minimum cost which is the minimum value from among the encoding costs of the macro block-types given by the cost function calculation unit 244.

Further, the mode selecting unit 245 selects, as the optimum inter-prediction mode, the macro block-type from which the minimum cost is obtained.

Then, the mode selecting unit 245 provides the variable length encoding unit 216 with the mode-related information representing the optimum inter-prediction mode, the reference index of the optimum inter-prediction mode (prediction reference index), the residual vector, and the like as header information.

Further, the mode selecting unit 245 provides the prediction image selecting unit 224 with the prediction image of the optimum inter-prediction mode and the encoding cost (minimum cost).

It should be noted that when the reference index where the minimum cost is obtained is a reference index of which value is zero, the mode selecting unit 245 determines whether the target block is to be encoded as the skip macro block or not on the basis of, for example, the minimum cost and the like.

When the mode selecting unit 245 determines that the target block is to be encoded as the skip macro block, the optimum inter-prediction mode is a skip mode for encoding the target block as the skip macro block.

Figure 15:
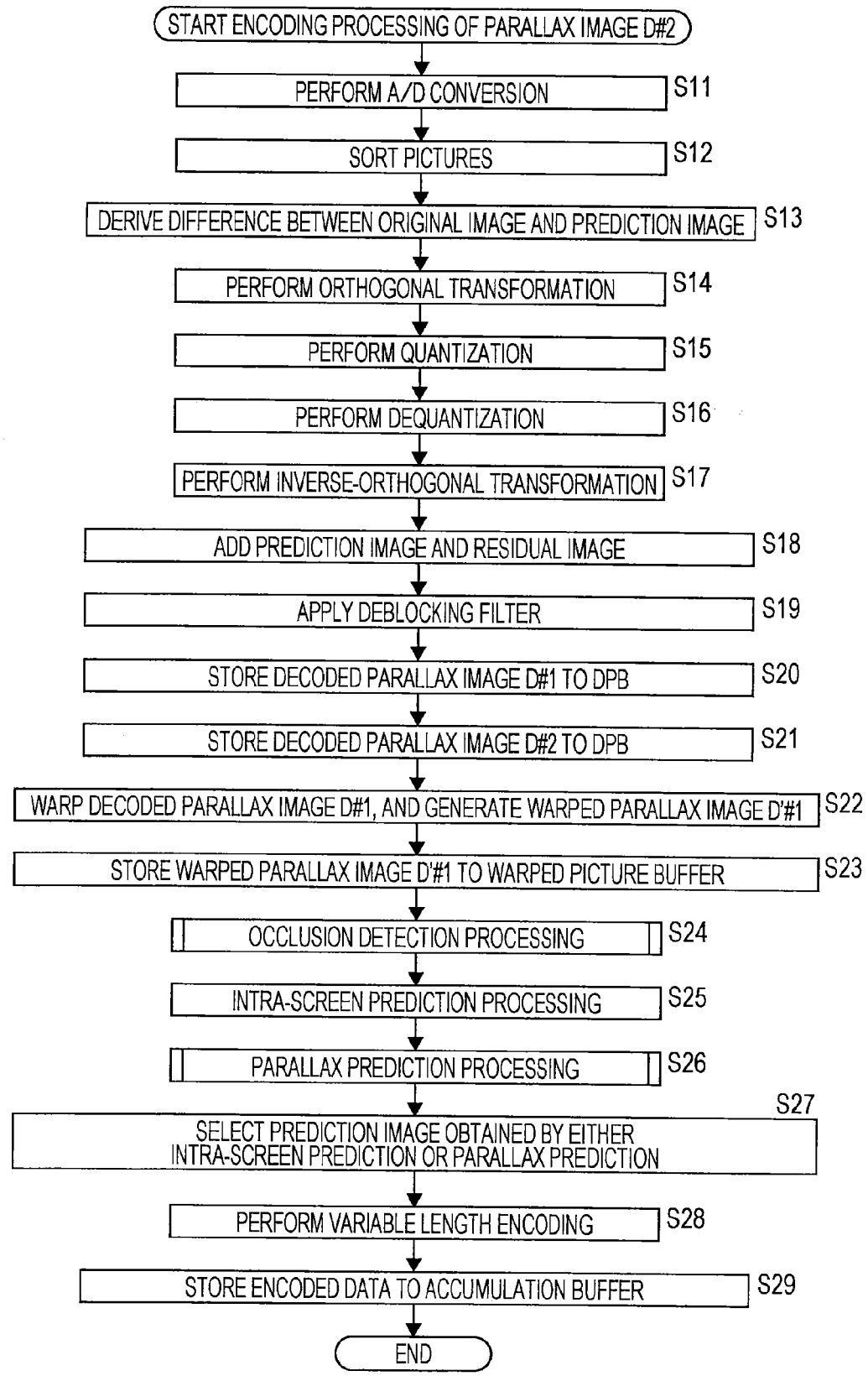
FIG. 15 is a flowchart explaining encoding processing for encoding a parallax image D#2 of a viewpoint #2.

FIG. 15 is a flowchart explaining encoding processing for encoding a parallax image D#2 of a viewpoint #2, which is performed by the encoder 22 of FIG. 13.

In step S11, the A/D conversion unit 211 performs A/D conversion of the analog signal of the picture of the parallax image D#2 of the viewpoint #2 provided thereto, and provides it to the screen sorting buffer 212, and proceeds to processing in step S12.

In step S12, the screen sorting buffer 212 temporarily stores the picture of the parallax image D#2 given by the A/D conversion unit 211, and reads the pictures in accordance with the structure of GOP determined in advance, thus performs sorting for sorting the order of pictures from the order of display into the order of encoding (the order of decoding).

The pictures read from the screen sorting buffer 212 are provided to the calculation unit 213, the intra-screen prediction unit 222, and the parallax prediction unit 234, and then, the processing in step S13 is performed after step S12.

In step S13, the calculation unit 213 adopts the picture of the parallax image D#2 given by the screen sorting buffer 212 as a target picture of encoding target, and further, adopts a macro block constituting the target picture as a target block of encoding target in order.

Then, as necessary, the calculation unit 213 calculates difference (residual) between the pixel value of the target block and the pixel value of the prediction image provided by the prediction image selecting unit 224, and provides it to the orthogonal transformation unit 214, and then, the processing in step S14 is performed after step S13.

In step S14, the orthogonal transformation unit 214 applies orthogonal transformation to the target block given by the calculation unit 213, and provides the transformation coefficient obtained as the result to the quantization unit 215, and then, the processing in step S15 is performed.

In step S15, the quantization unit 215 quantizes the transformation coefficient provided by the orthogonal transformation unit 214, and provides the inverse-quantization unit 218 and the variable length encoding unit 216 with the quantization value obtained as the result, and then, the processing in step S16 is performed.

In step S16, the inverse-quantization unit 218 dequantizes the quantization value given by the quantization unit 215 into the transformation coefficient, and provides it to the inverse-orthogonal transformation unit 219, and then, the processing in step S17 is performed.

In step S17, the inverse-orthogonal transformation unit 219 dequantizes the transformation coefficient provided by the inverse-quantization unit 218, and provides it to the calculation unit 220, and then, the processing in step S18 is performed.

In step S18, as necessary, the calculation unit 220 adds pixel values of the prediction image provided by the prediction image selecting unit 224 to the data provided by the inverse-orthogonal transformation unit 219, thereby obtaining the decoded parallax image D#2 obtained by decoding (locally decoding) the target block. Then, the calculation unit 220 provides the decoded parallax image D#2 obtained by locally decoding the target block to the deblocking filter 221, and then, the processing in step S19 is performed after step S18.

In step S19, the deblocking filter 221 filters the decoded parallax image D#2 provided by the calculation unit 220, and provides it to the DPB 31 (FIG. 5), and then, the processing in step S20 is, performed.

In step S20, the DPB 31 waits for receiving the decoded parallax image D#1 obtained by encoding the parallax image D#1 and locally decoding it from the encoder 21 encoding the parallax image D#1, and stores the decoded parallax image D#1, and then, the processing in step S21 is performed.

In step S21, the DPB 31 stores the decoded parallax image D#2 provided by the deblocking filter 221, and then, the processing in step S22 is performed.

In step S22, the warping unit 231 warps the picture of the decoded parallax image D#1 stored in the DPB 31, thereby generating the picture of the warped parallax image D'#1, and provides it to the warped picture buffer 232, and then, the processing in step S23 is performed.

In step S23, the warped picture buffer 232 stores the picture of the warped parallax image D'#1 given by the warping unit 231, and then, the processing in step S24 is performed.

In step S24, the occlusion detection unit 233 uses the picture of the warped parallax image D'#1 stored in the warped picture buffer 232 to perform occlusion detection processing for detecting an occlusion portion of the target picture of the parallax image D#2.

Then, the occlusion detection unit 233 provides the parallax prediction unit 234 with the occlusion information obtained by the occlusion detection processing, and then, the processing in step S25 is performed after step S24.

In step S25, the intra-screen prediction unit 222 performs intra-prediction processing (intra-screen prediction processing) on a subsequent target block which is a macro block that becomes the target of subsequent encoding.

More specifically, with regard to the subsequent target block, the intra-screen prediction unit 222 performs intra-prediction (intra-screen prediction) for generating a prediction image (the prediction image of intra-prediction) from the picture of the decoded parallax image D#2 stored in the DPB 31.

Then, the intra-screen prediction unit 222 uses the prediction image of intra-prediction to obtain the encoding cost required to encode the target block, and provides it as well as the prediction image of intra-prediction to the prediction image selecting unit 224, and then, the processing in step S26 is performed after step S25.

In step S26, with regard to the subsequent target block, the parallax prediction unit 234 adopts the picture of the decoded parallax image D#1 stored in the DPB 31 as the reference picture and performs parallax prediction processing.

More specifically, with regard to the subsequent target block, the parallax prediction unit 234 performs parallax prediction while the picture of the decoded parallax image D#1 stored in the DPB 31 is adopted as the reference image, thus deriving the calculation parallax vector, the prediction vector, the prediction image, the encoding cost, and the like for each inter-prediction mode of which macro block-type and the like are different.

Further, the parallax prediction unit 234 adopts the inter-prediction mode of which encoding cost is the minimum as the optimum inter-prediction mode, and provides the prediction image of the optimum inter-prediction mode as well as the encoding cost to the prediction image selecting unit 224, and then, the processing in step S27 is performed after step S26.

In step S27, the prediction image selecting unit 224 selects one of the prediction image (the prediction image of intra-prediction) given by the intra-screen prediction unit 222 and the prediction image (the prediction image of the inter-prediction) given by the parallax prediction unit 234, whichever the encoding cost is smaller, for example, and provides it to the calculation units 213 and 220, and then, the processing in step S28 is performed.

In this case, the prediction image selected by the prediction image selecting unit 224 in step S27 is used in the processing of steps S13 and S18 performed in the encoding process of the subsequent target block.

The intra-screen prediction unit 222 provides the variable length encoding unit 216 with information about the intra-prediction obtained in the intra-prediction processing of step S25 as header information, and the parallax prediction unit 234 provides the variable length encoding unit 216 with information about the parallax prediction (inter-prediction) obtained in the parallax prediction processing of step S26 (mode-related information and the like representing the optimum inter-prediction mode) as header information.

In step S28, the variable length encoding unit 216 applies the variable length encoding to the quantization value given by the quantization unit 215, and obtains the encoded data.

Further, the variable length encoding unit 216 selects one of pieces of header information given by the intra-screen prediction unit 222 and the parallax prediction unit 234 whichever a prediction image of which encoding cost is smaller is generated therefrom, and puts it into the header of the encoded data.

Then, the variable length encoding unit 216 provides the encoded data to the accumulation buffer 217, and then, the processing in step S29 is performed after step S28.

IN step S29, the accumulation buffer 217 temporarily stores the encoded data given by the variable length encoding unit 216, and outputs the data with a predetermined data rate.

The encoded data which are output from the accumulation buffer 217 are provided to the multiplexing unit 32 (FIG. 5).

The encoder 22 performs the processing in steps S11 to S29 explained above repeatedly as necessary.

Figure 16:
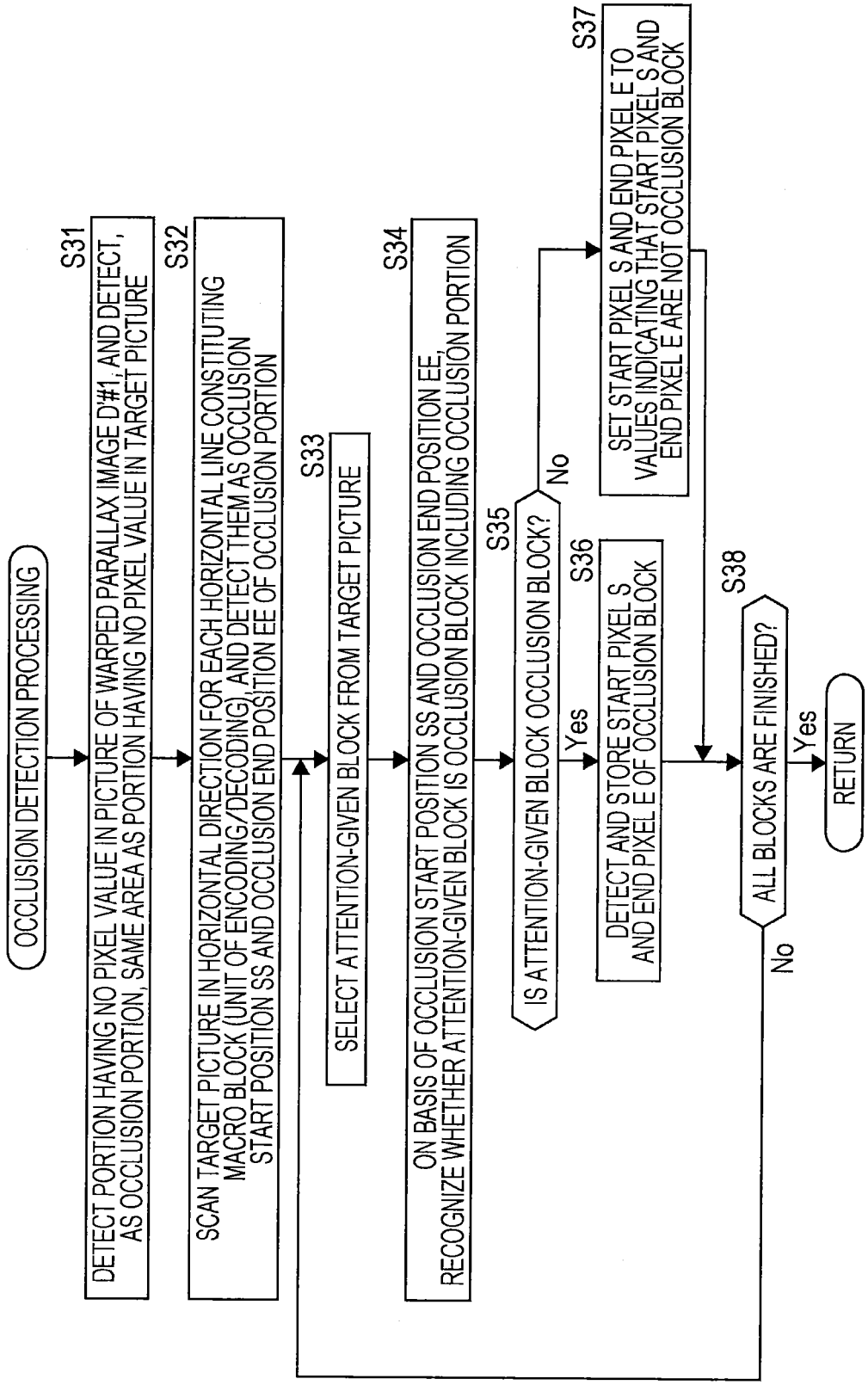
FIG. 16 is a flowchart explaining occlusion detection processing.

FIG. 16 is a flowchart explaining occlusion detection processing performed by the occlusion detection unit 233 of FIG. 13 in step S24 of FIG. 15.

In step S31, as explained in FIG. 2, the occlusion detection unit 233 detects a portion having no pixel value (pixel value-absent portion) in the picture of the warped parallax image D'#1 stored in the warped picture buffer 232.

Further, the occlusion detection unit 233 detects, as an occlusion portion, a portion in the parallax image D#2 at the same position as the pixel value-absent portion, and then, the processing in step S32 is performed after step S31.

In step S32, the occlusion detection unit 233 scans the target picture of the parallax image D#2 for each horizontal line constituting the macro block, for example, and detects an occlusion start position SS and an occlusion end position EE which are the start position and the end position of the occlusion portion (in the horizontal direction (x direction)) in the target picture.

More specifically, for example, the occlusion detection unit 233 scans the first horizontal line from the top of the target picture in the x direction (direction from the left to the right), and detects, as the occlusion start position SS, the position of the pixel where the occlusion portion starts and detects the position of the pixel where the occlusion portion ends as the occlusion end position EE in a series (slice) of the macro blocks of the first column from the top of the target picture.

Further, for example, the occlusion detection unit 233 scans the 17 (=16×(2−1)+1)-th horizontal line from the top of the target picture in the x direction, and detects, as the occlusion start position SS, the position of the pixel where the occlusion portion starts and detects the position of the pixel where the occlusion portion ends as the occlusion end position EE in a series of the macro blocks of the second column from the top of the target picture.

Further, for example, the occlusion detection unit 233 scans the 33 (=16×(3−1)+1)-th horizontal line from the top of the target picture in the x direction, and detects, as the occlusion start position SS, the position of the pixel where the occlusion portion starts and detects the position of the pixel where the occlusion portion ends as the occlusion end position EE in a series of the macro blocks of the third column from the top of the target picture.

Likewise, hereinafter, for example, the occlusion detection unit 233 scans the (16×(k−1)+1)-th horizontal line from the top of the target picture in the x direction, and detects, as the occlusion start position SS, the position of the pixel where the occlusion portion starts and detects the position of the pixel where the occlusion portion ends as the occlusion end position EE in a series of the macro blocks of the k-th column from the top of the target picture.

In this case, the occlusion start position SS and the occlusion end position EE indicate the number of pixels from the left (left end) of the target picture (how many pixels there are from the left).

When the occlusion start position SS and the occlusion end position EE are detected in the series up to the series of the macro blocks in the lowest column of the target picture as described above, then, the processing in step S33 is performed after step S32, and the occlusion detection unit 233 selects, from the target picture, a macro block that has not yet selected as the attention-given block in the order of encoding, for example, and then, the processing in step S34 is performed.

In step S34, the occlusion detection unit 233 recognizes whether the attention-given block is an occlusion block or not on the basis of the occlusion start position SS and the occlusion end position EE detected in the series of macro blocks in the column of the number where the attention-given block exists in the target picture, and then, the processing in step S35 is performed.

In step S35, the occlusion detection unit 233 determines whether the attention-given block is an occlusion block.

In step S35, when the attention-given block is determined to be an occlusion block, the processing in step S36 is subsequently performed, and the occlusion detection unit 233 detects and stores the start pixel S where the occlusion portion explained with reference to FIGS. 2 to 4 starts and the end pixel E where it ends with regard to the attention-given block which is the occlusion block, and then, the processing in step S38 is performed.

In step S35, when the attention-given block is determined not to be an occlusion block, the processing in step S37 is subsequently performed, and the occlusion detection unit 233 sets a value indicating non-occlusion block (for example, values such as 0 or −1 that could not be the start pixel S and the end pixel E of the occlusion block) in (the variables as) the start pixel S and the end pixel E of the attention-given block which is the non-occlusion block, and then, the processing in step S38 is performed.

In step S38, the occlusion detection unit 233 determines whether the start pixel S and the end pixel E are obtained with all the macro blocks in the target picture being the attention-given blocks.

In step S38, when all the macro blocks in the target picture are determined not yet to be adopted as the attention-given block, the processing in step S33 is performed back again, and a macro block that has not yet selected as the attention-given block in the order of encoding is newly selected as the attention-given block from the target picture, and the same processing is repeated thereafter.

In step S38, when all the macro blocks in the target picture are determined to be adopted as the attention-given block, the processing returns.

The occlusion detection processing of FIG. 16 may be performed once for the target picture.

In FIG. 16, the occlusion detection processing is performed while the macro block is adopted as the minimum unit, so that, for each macro block, the start pixel S where the occlusion portion starts and the end pixel E where it ends with regard to the macro block is detected. Alternatively, the occlusion detection processing may be performed in a unit with which the calculation parallax vector is detected with the parallax prediction unit 234 (a unit with which ME is performed).

More specifically, in the occlusion detection processing, the processing may be performed in units of partitions (sub-partitions) explained in FIG. 10.

In this case, the minimum unit with which the occlusion detection processing is performed is a partition (sub-partition) having 4×4 pixels.

FIGS. 17A and 17B are figures for explaining occlusion detection processing (FIG. 16) performed by the occlusion detection unit 233 (FIG. 13).

More specifically, FIG. 17A is a figure for explaining processing in which, in step S34 of FIG. 16, the occlusion detection unit 233 recognizes whether the attention-given block is an occlusion block or not on the basis of the occlusion start position SS and the occlusion end position EE detected in the series of macro blocks in the column of the number where the attention-given block exists.

Figure 17:
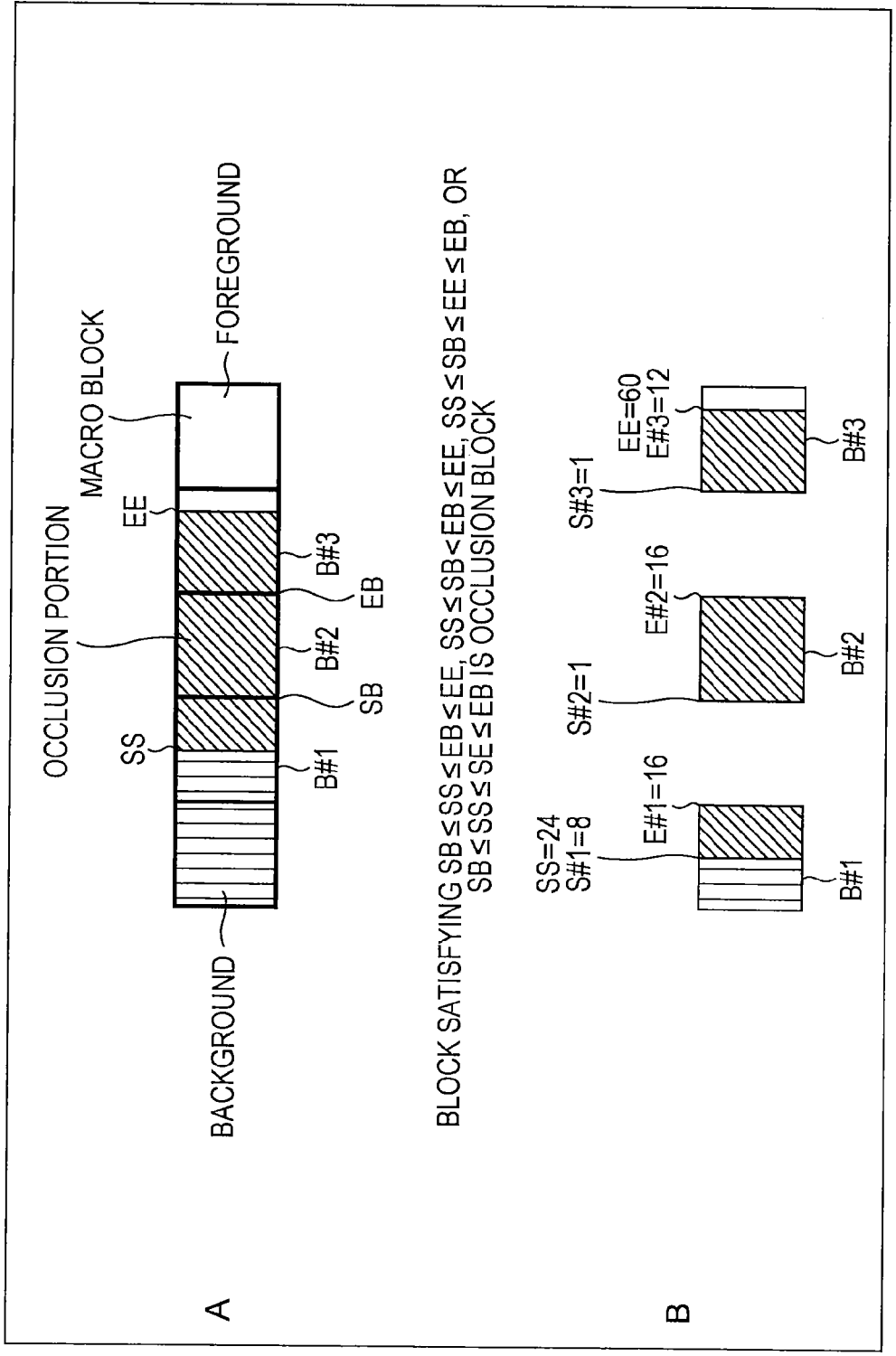
FIGS. 17A and 17B are figures for explaining occlusion detection processing.

FIG. 17 is like FIG. 2, and the viewpoint #1 is at the right side, and the viewpoint #2 is at the left side, and in the parallax image D#2 of the viewpoint #2, a background portion adjacent to the left side of the foreground is the occlusion portion. Therefore, the left side of the occlusion portion is the background, and the right side thereof is the foreground.

In FIG. 17, the position of a pixel at the left end of the macro block is denoted as SB, and the position of a pixel at the right end is denoted as EB. The positions SB and EB indicate the number of pixels from the left (left end) of the target picture (how many pixels there are from the left). Therefore, EB−SB+1 is 16 pixels which is the width of the macro block in the x direction.

As explained in FIG. 16, the occlusion start position SS and the occlusion end position EE indicate the number of pixels from the left (left end) of the target picture (how many pixels there are from the left).

Therefore, when the position SB of the pixel at the left end of the macro block and the position EB of the pixel at the right end satisfy any one of an expression SB≤SS≤EB≤EE, expression SS≤SB<EB≤EE, expression SS≤SB≤EE≤EB, and an expression SB≤SS≤SE≤EB, the macro block in question includes the occlusion portion.

When the position SB of the pixel at the left end of the macro block and the position EB of the pixel at the right end satisfy any one of an expression SB≤SS≤EB≤EE, expression SS≤SB<EB≤EE, expression SS≤SB≤EE≤EB, and an expression SB≤SS≤SE≤EB, then the occlusion detection unit 233 recognizes that the macro block is the occlusion block.

In FIG. 17, the block (macro blocks) B#1, B#2, and B#3 are recognized as being the occlusion blocks.

FIG. 17B is a figure for explaining processing in which, in step S36 of FIG. 16, the occlusion detection unit 233 detects the start pixel S where the occlusion portion starts and the end pixel E where it ends with regard to the macro block which is the occlusion block.

In this case, with regard to the block (macro block) B#i which is the occlusion block, the start pixel S#i where the occlusion portion starts and the end pixel E#i where it ends indicate the number of pixels from the left of the macro block (how many pixels there are from the left).

Now, as illustrated in FIG. 17A, the blocks B#1, B#2, and B#3 which are occlusion blocks are the second, third, and fourth blocks, respectively, from the left of the target block.

Further, as illustrated in FIG. 17B, suppose that the occlusion start position SS of the occlusion portion is the 24-th pixel, and the occlusion end position EE is the 60-th pixel.

In this case, the number of pixels of the macro block in the x direction is 16 pixels, and therefore, as illustrated in FIG. 17B, the start pixel S#1 and the end pixel E#1 of the block B#1 are the 8-th pixel and the 16-th pixel, respectively.

On the other hand, the start pixel S#2 and the end pixel E#2 of the block B#2 are the 1-st pixel and the 16-th pixel, respectively, and the start pixel S#3 and the end pixel E#3 of the block B#3 are the 1-st pixel and the 12-th pixel, respectively.

Figure 18:
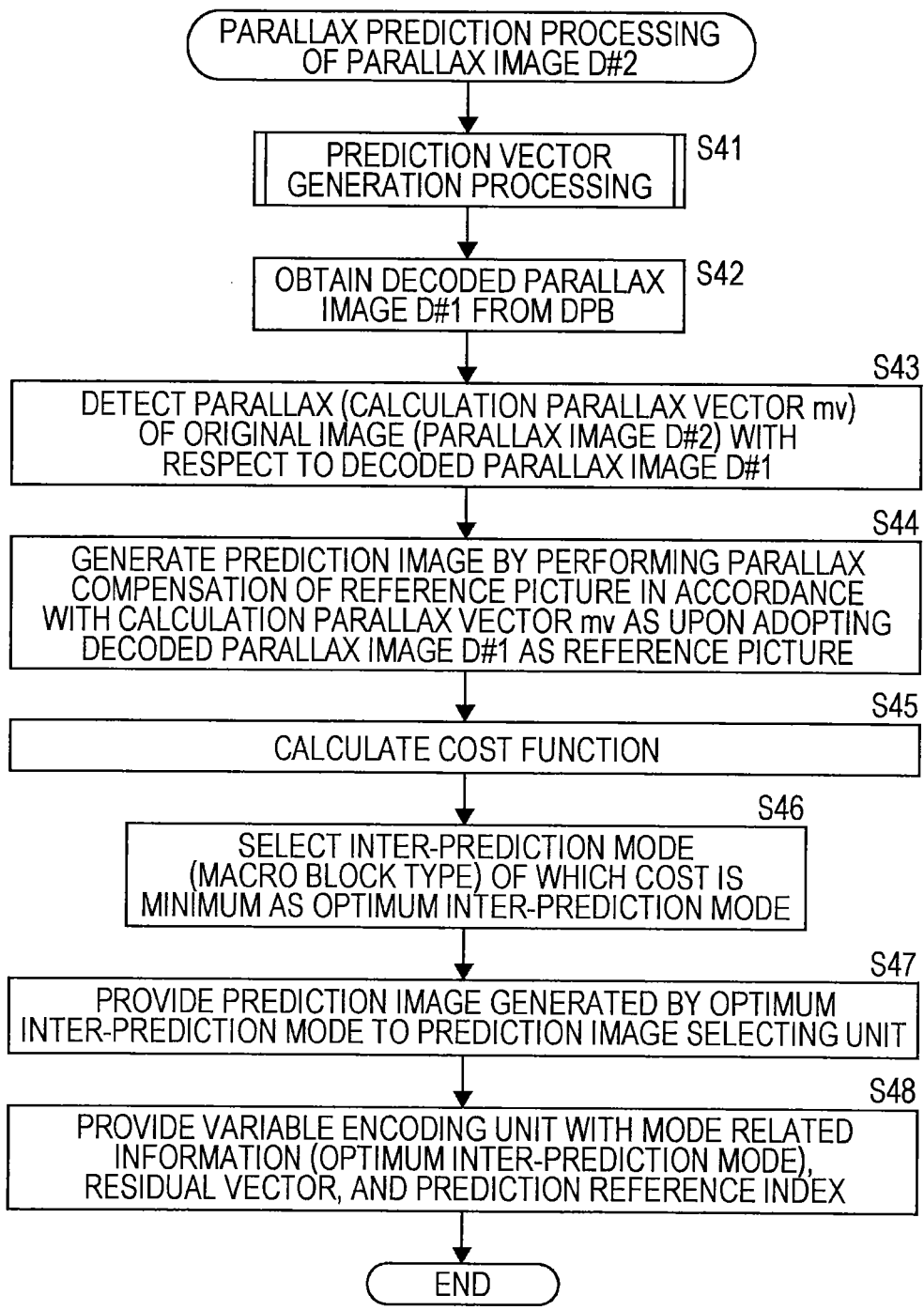
FIG. 18 is a flowchart explaining parallax prediction processing.

FIG. 18 is a flowchart explaining parallax prediction processing performed by the parallax prediction unit 234 of FIG. 14 in step S26 of FIG. 15.

In step S41, the prediction vector generation unit 243 uses the occlusion information provided by the occlusion detection unit 233 as necessary to perform prediction vector generation processing for generating the (subsequent) prediction vector of the target block for each macro block-type (FIG. 10).

Then, the prediction vector generation unit 243 provides the prediction vector of the target block obtained by the prediction vector generation processing as the prediction vector information to the parallax detection unit 241, the parallax compensation unit 242, and the cost function calculation unit 244, and then, the processing in step S42 is performed after step S41.

In step S42, the parallax prediction unit 234 obtains the picture of the decoded parallax image D#1 which is the reference picture from the DPB 31, and provides it to the parallax detection unit 241 and the parallax compensation unit 242, and then, the processing in step S43 is performed.

In step S43, the parallax detection unit 241 uses the picture of the decoded parallax image D#1 given by the DPB 31 as the reference picture to perform ME on the (subsequent) target block in the target picture provided by the screen sorting buffer 212, thus detecting the calculation parallax vector mv representing parallax of the target block with respect to the viewpoint #1.

Further, the parallax detection unit 241 detects the residual vector which is the difference between the calculation parallax vector mv and the prediction vector obtained from the prediction vector information provided by the prediction vector generation unit 243, and provides it to the parallax compensation unit 242, and then, the processing in step S43 is performed after step S43.

In step S43, the parallax compensation unit 242 restores the calculation parallax vector mv of the target block from the residual vector given by the parallax detection unit 241 and the prediction vector information given by the prediction vector generation unit 243.

Further, the parallax compensation unit 242 uses the picture of the decoded parallax image D#1 given by the DPB 31 as the reference picture to perform MC in accordance with the calculation parallax vector mv of the target block, thus generating the (subsequent) prediction image of the target block.

More specifically, the parallax compensation unit 242 obtains, as the prediction image, the corresponding block in the picture of the decoded parallax image D#1 which is a block at the position deviated by the calculation parallax vector mv from the position of the target block.

Then, the parallax compensation unit 242 provides the cost function calculation unit 244 with the prediction image, the residual vector provided by parallax detection unit 241, and the reference index assigned to the reference picture (in this case, the picture of the decoded parallax image D#1) used to generate the prediction image, and then, the processing in step S45 is performed after step S44.

In step S45, for each macro block-type (FIG. 10), the cost function calculation unit 244 derives the encoding cost required to encode the target block of the target picture given by the screen sorting buffer 212 in accordance with a predetermined cost function, and provides it as well as the reference index, the prediction image, and the residual vector given by the parallax compensation unit 242 to the mode selecting unit 245, and then, the processing in step S46 is performed.

In step S46, the mode selecting unit 245 detects the minimum cost which is the minimum value from among the encoding costs of the macro block-types given by the cost function calculation unit 244.

Further, the mode selecting unit 245 selects, as the optimum inter-prediction mode, the macro block-type from which the minimum cost is obtained, and then, the processing in step S47 is performed after step S46.

In step S47, the mode selecting unit 245 provides the prediction image selecting unit 224 with the prediction image of the optimum inter-prediction mode and the encoding cost (minimum cost), and then, the processing in step S48 is performed.

In step S48, the mode selecting unit 245 provides the variable length encoding unit 216 with the mode-related information representing the optimum inter-prediction mode, the reference index of the optimum inter-prediction mode (prediction reference index), the residual vector of the optimum inter-prediction mode, and the like as header information, and the processing returns.

Figure 19:
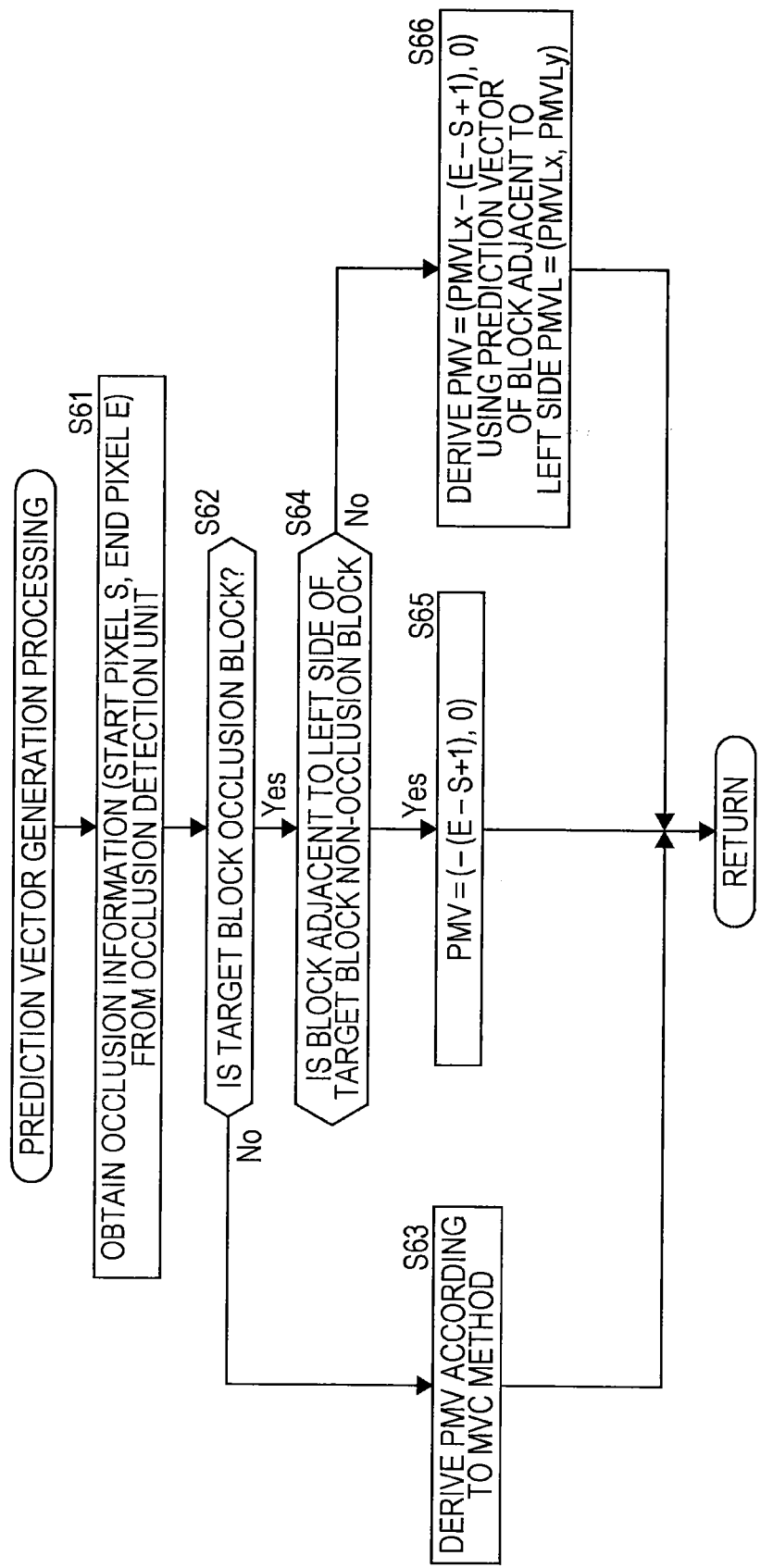
FIG. 19 is a flowchart explaining prediction vector generation processing.

FIG. 19 is a flowchart explaining prediction vector generation processing performed by the prediction vector generation unit 243 (FIG. 14) in step S41 of FIG. 18.

As explained in FIGS. 2 and 3, FIG. 19 shows prediction vector generation processing where the viewpoint #1 is at the right side, and the viewpoint #2 is at the left side, and in the parallax image D#2 of the viewpoint #2, a background portion adjacent to the left side of the foreground is the occlusion portion, and more specifically, the left side of the occlusion portion is the background and the right side thereof is the foreground.

The prediction vector generation unit 243 recognizes, from the position information provided to the warping unit 231, as to whether the viewpoint #2 of the parallax image D#2 of the encoding target of the encoder 22 (FIG. 13) is located at the left side of the viewpoint #1 of the parallax image D#1 which is the reference picture.

The prediction vector generation unit 243 performs prediction vector generation processing according to the flowchart of FIG. 19 when the viewpoint #2 is at the left side of the viewpoint #1.

In step S61, the prediction vector generation unit 243 obtains the start pixel S and the end pixel E of each block of the target picture serving as the occlusion information from the occlusion detection unit 233, and then, the processing in step S62 is performed.

In step S62, the prediction vector generation unit 243 determines whether the target block is an occlusion block or not, on the basis of the occlusion information given by the occlusion detection unit 233.

In this case, as explained in FIG. 16, the occlusion detection unit 233 sets a value indicating non-occlusion block (for example, values such as 0 or −1 that could not be the start pixel S and the end pixel E of the occlusion block) in (the variables as) the start pixel S and the end pixel E of the non-occlusion block.

Therefore, the prediction vector generation unit 243 can determine whether the target block is an occlusion block or not on the basis of the start pixel S and the end pixel E of the target block serving as the occlusion information.

In step S62, when the target block is determined not to be an occlusion block, and more specifically, when the target block is determined to be a non-occlusion block, then the processing in step S63 is subsequently performed, and the prediction vector generation unit 243 generates the prediction vector PMV of the target block according to the MVC method, and the processing returns.

In step S62, when the target block is determined to be an occlusion block, the processing in step S64 is subsequently performed, and thereafter, the prediction vector generation unit 243 generates the prediction vector PMV of the target block which is the occlusion block in accordance with the proximity prediction method explained in FIGS. 2 and 3.

More specifically, in step S64, the prediction vector generation unit 243 determines whether a block adjacent to the left side of the target block which is the occlusion block is a non-occlusion block or not on the basis of the occlusion information.

In step S64, when a block adjacent to the left side of the target block is determined to be a non-occlusion block, and more specifically, when a column (slice) of the target block in the target picture is scanned in the x direction and it is found that the occlusion portion starts from the target block, then the processing in step S65 is subsequently performed, and the prediction vector generation unit 243 uses the start pixel S and the end pixel E of the target block as the occlusion information to derive (generate) the prediction vector PMV of the target block according to the expression PMV=(−(E−S+1), 0) which is the same as the expression (1), and the processing returns.

In step S64, when a block adjacent to the left side of the target block is determined not to be a non-occlusion block, and more specifically, when a block adjacent to the left side of the target block is an occlusion block, then the processing in step S66 is subsequently performed, and the prediction vector generation unit 243 uses the x component of the prediction vector PMVL=(PMVLx, PMVLy) already derived, in the start pixel S and the end pixel E of the target block and a block adjacent to the left side of the target block (occlusion block) serving as the occlusion information to derive the prediction vector PMV of the target block in accordance with the expression PMV=(PMVLx−(E−S+1), 0) which is the same as the expression (1), and the processing returns.

In step S66, the prediction vector of the target block can be derived in accordance with not only the expression PMV=(PMVLx−(E−S+1), 0) but also, for example, the expression PMV=(PMVLx−(E−S+1), PMVLy).

Figure 20:
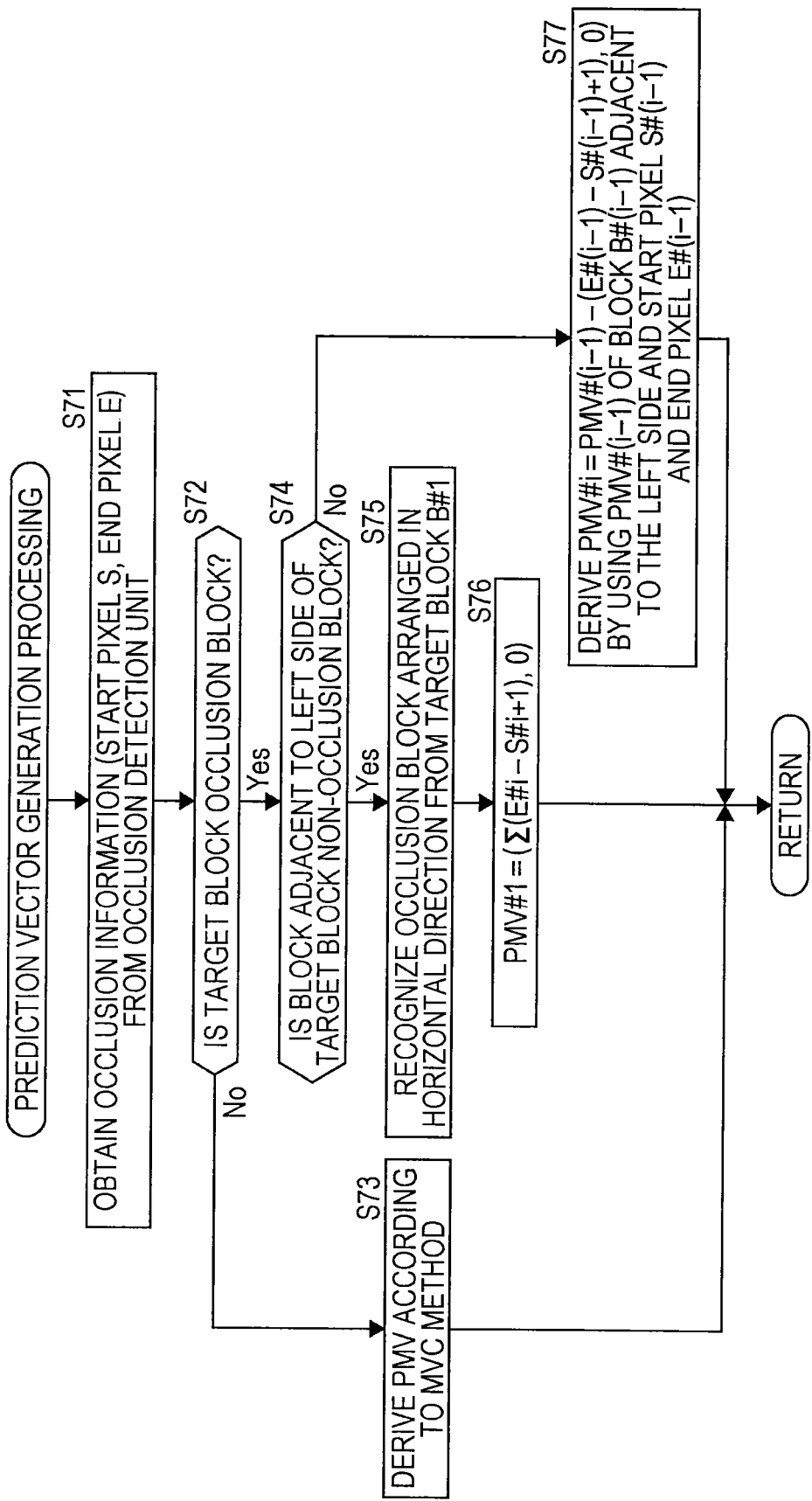
FIG. 20 is a flowchart explaining prediction vector generation processing.

FIG. 20 is a flowchart explaining prediction vector generation processing which is performed by the prediction vector generation unit 243 (FIG. 14) in step S41 of FIG. 18.

As explained in FIG. 4, FIG. 20 shows prediction vector generation processing where the viewpoint #1 is at the left side, and the viewpoint #2 is at the right side, and in the parallax image D#2 of the viewpoint #2, a background portion adjacent to the right side of the foreground is the occlusion portion, and more specifically, the right side of the occlusion portion is the background and the left side thereof is the foreground.

The prediction vector generation unit 243 recognizes, from the position information provided to the warping unit 231, as to whether the viewpoint #2 of the parallax image D#2 of the encoding target of the encoder 22 (FIG. 13) is located at the right side of the viewpoint #1 of the parallax image D#1 which is the reference picture.

The prediction vector generation unit 243 performs prediction vector generation processing according to the flowchart of FIG. 20 when the viewpoint #2 is at the right side of the viewpoint #1.

In step S71, the prediction vector generation unit 243 obtains the start pixel S and the end pixel E of each block of the target picture serving as the occlusion information from the occlusion detection unit 233, and then, the processing in step S72 is performed.

In step S72, the prediction vector generation unit 243 determines whether the target block is an occlusion block or not, on the basis of the occlusion information given by the occlusion detection unit 233.

In step S72, when the target block is determined not to be an occlusion block, and more specifically, when the target block is determined to be a non-occlusion block, then the processing in step S73 is subsequently performed, and the prediction vector generation unit 243 generates the prediction vector PMV of the target block according to the MVC method, and the processing returns.

In step S72, when the target block is determined to be an occlusion block, the processing in step S74 is subsequently performed, and thereafter, the prediction vector generation unit 243 generates the prediction vector PMV of the target block which is the occlusion block in accordance with the proximity prediction method explained in FIG. 4.

More specifically, in step S74, the prediction vector generation unit 243 determines whether a block adjacent to the left side of the target block which is the occlusion block is a non-occlusion block or not.

In step S74, when a block adjacent to the left side of the target block is determined to be a non-occlusion block, and more specifically, when a column (slice) of the target block in the target picture is scanned in the x direction and it is found that the occlusion portion starts from the target block, then the processing in step S75 is subsequently performed, and the prediction vector generation unit 243 recognizes the occlusion blocks arranged continuously in the x direction with the target block being the front from the occlusion information, and then, the processing in step S76 is performed.

In this case, the i-th block counted from the first one of the occlusion blocks arranged continuously in the x direction with the target block being the front will be denoted as B#i. The number of occlusion blocks arranged continuously in the x direction with the target block being the front is considered to be N.

In this case, the first block (target block) at the front of the occlusion blocks arranged continuously in the x-direction with the target block being the front will be denoted as B#1, and the last block will be denoted as B#N.

In step S76, the prediction vector generation unit 243 uses the start pixels S#1 to S#N and the end pixels E#1 to E#N of all the blocks B#1 to B#N of the occlusion blocks arranged continuously in the x direction serving as the occlusion information with the target block being arranged in the front to derive the prediction vector PMV#1 of the target block B#1 in accordance with the expression PMV#1=(Σ(E#i−S#i+1), 0)=((E#1−S#1+1)+(E#2−S#2+1)+ . . . +(E#N−S#N+1), 0) that is the same as the expression (2), and the processing returns.

In step S74, when a block adjacent to the left side of the target block is determined not to be a non-occlusion block, and more specifically, when a block adjacent to the left side of the target block is an occlusion block, then the processing in step S76 is subsequently performed, and the prediction vector generation unit 243 uses the prediction vector PMV# (i−1) already derived in the start pixel S# (i−1) and the end pixel E# (i−1) of the block B# (i−1) adjacent to the left side of the target block B#i and a block adjacent to the left side of the target block (occlusion block) serving as the occlusion information to derive the prediction vector PMV#i of the target block in accordance with the expression PMV#i=PMV#(i−1)−((E#(i−1)−S#(i−1)+1), 0) that is the same as the expression (2), and the processing returns.

[Embodiment of Multi-Viewpoint Image Decoder to which the Present Technique is Applied]

Figure 21:
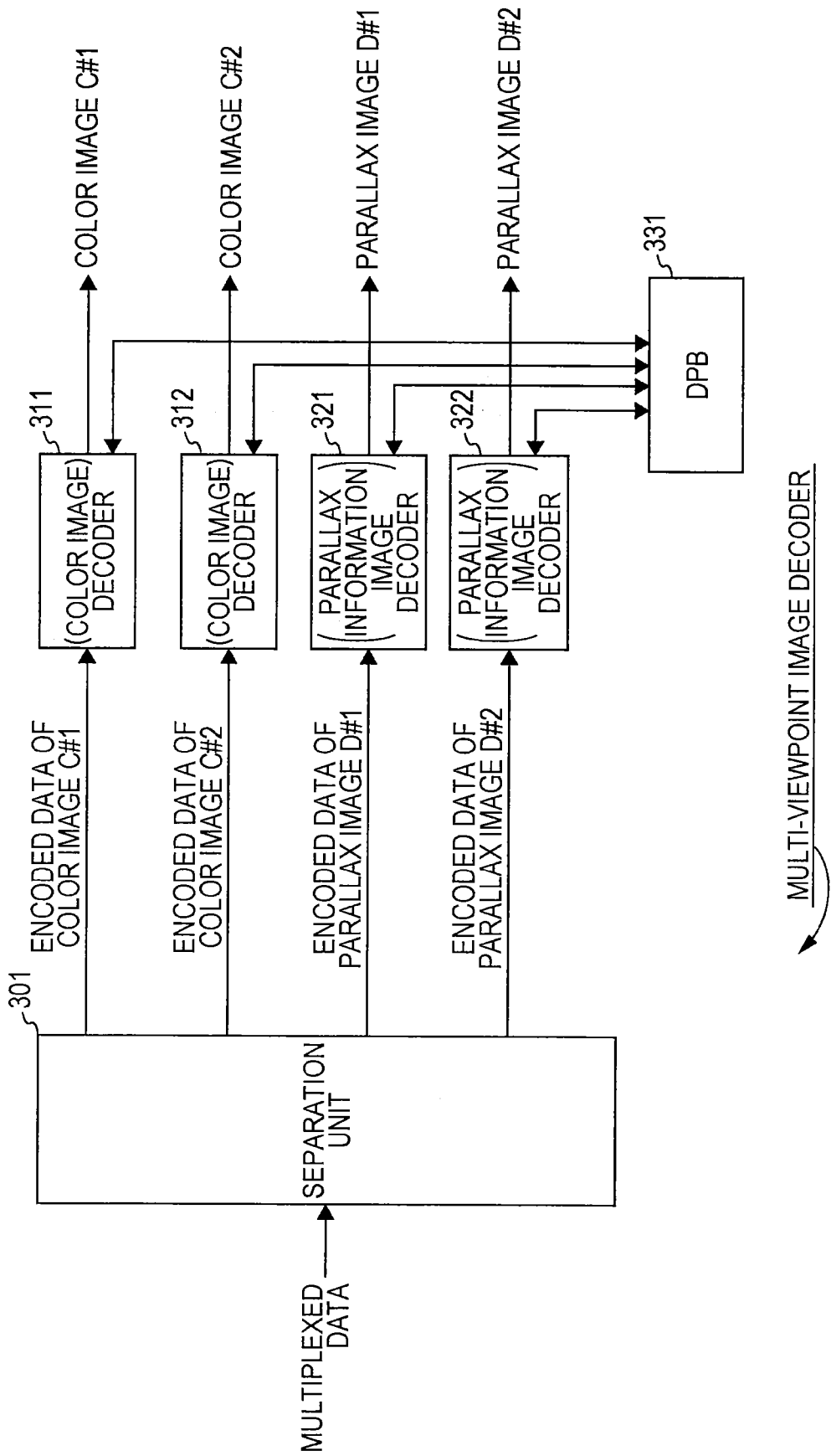
FIG. 21 is a block diagram illustrating a configuration example of an embodiment of a multi-viewpoint image decoder to which the present technique is applied.

FIG. 21 is a block diagram illustrating a configuration example of an embodiment of a multi-viewpoint image decoder to which the present technique is applied.

The multi-viewpoint image decoder in FIG. 21 is, for example, a decoder for decoding images of multiple viewpoints using the MVC method. In the explanation below, the same processing as the MVC method will be omitted as necessary.

The multi-viewpoint image decoder is not limited to the decoder using the MVC method.

The multi-viewpoint image decoder of FIG. 21 decodes the multiplexed data, which are output by the multi-viewpoint image encoder of FIG. 5, into the color image C#1 of the viewpoint #1 and the color image C#2 of the viewpoint #2 which are the color images of the two viewpoints #1 and #2, and the parallax image D#1 of the viewpoint #1 and the parallax image D#2 of the viewpoint #2 which are parallax images of the two viewpoints #1 and #2.

In FIG. 21, the multi-viewpoint image decoder includes a separation unit 301, decoders 311, 312, 321, 322, and the DPB 331.

The multiplexed data which are output by the multi-viewpoint image encoder of FIG. 5 are provided to the separation unit 301 via a recording medium or a transmission medium, not shown.

The separation unit 301 separates the multiplexed data provided thereto into the encoded data of the color image C#1, the encoded data of the color image C#2, the encoded data of the parallax image D#1, and the encoded data of the parallax image D#2.

Then, the separation unit 301 provides the encoded data of the color image C#1 to the decoder 311, the encoded data of the color image C#2 to the decoder 312, the encoded data of the parallax image D#1 to the decoder 321, and the encoded data of the parallax image D#2 to the decoder 322.

The decoder 311 decodes the encoded data of the color image C#1 given by the separation unit 301 and outputs the color image C#1 obtained as the result.

The decoder 312 decodes the encoded data of the color image C#2 given by the separation unit 301 and outputs the color image C#2 obtained as the result.

The decoder 321 decodes the encoded data of the parallax image D#1 given by the separation unit 301 and outputs the parallax image D#1 obtained as the result.

The decoder 322 decodes the encoded data of the parallax image D#2 given by the separation unit 301 and outputs the parallax image D#2 obtained as the result.

The DPB 331 temporarily stores the images (decoded images) which have been decoded and which are obtained by causing each of the decoders 311, 312, 321, and 322 to decode the image of the decoding target as candidates of the reference picture referred to during generation of the prediction image.

More specifically, the decoders 311, 312, 321, and 322 decode images prediction-encoded by the encoders 11, 12, 21 and 22, respectively, of FIG. 5.

In order to decode an image that is prediction-encoded, it is necessary to have a prediction image used for the prediction encoding, and therefore, in order to generate the prediction image used for the prediction encoding, the decoders 311, 312, 321, and 322 decode the images of the decoding targets, and thereafter, causes the DPB 331 to temporarily store the decoded image used for generation of the prediction image.

The DPB 331 is a shared buffer temporarily storing the images (decoded images) which have been decoded and which are obtained by the decoders 311, 312, 321, and 322, and each of the decoders 311, 312, 321, and 322 selects the reference picture referred to for decoding the image of the decoding target from among the decoded images stored in the DPB 331, and uses the reference picture to generate the prediction image.

The DPB 331 is shared by the decoders 311, 312, 321, and 322, and therefore, each of the decoders 311, 312, 321, and 322 can refer to not only the decoded image obtained by itself but also decoded images obtained by other decoders.

[Configuration Example of Decoder 311]

Figure 22:
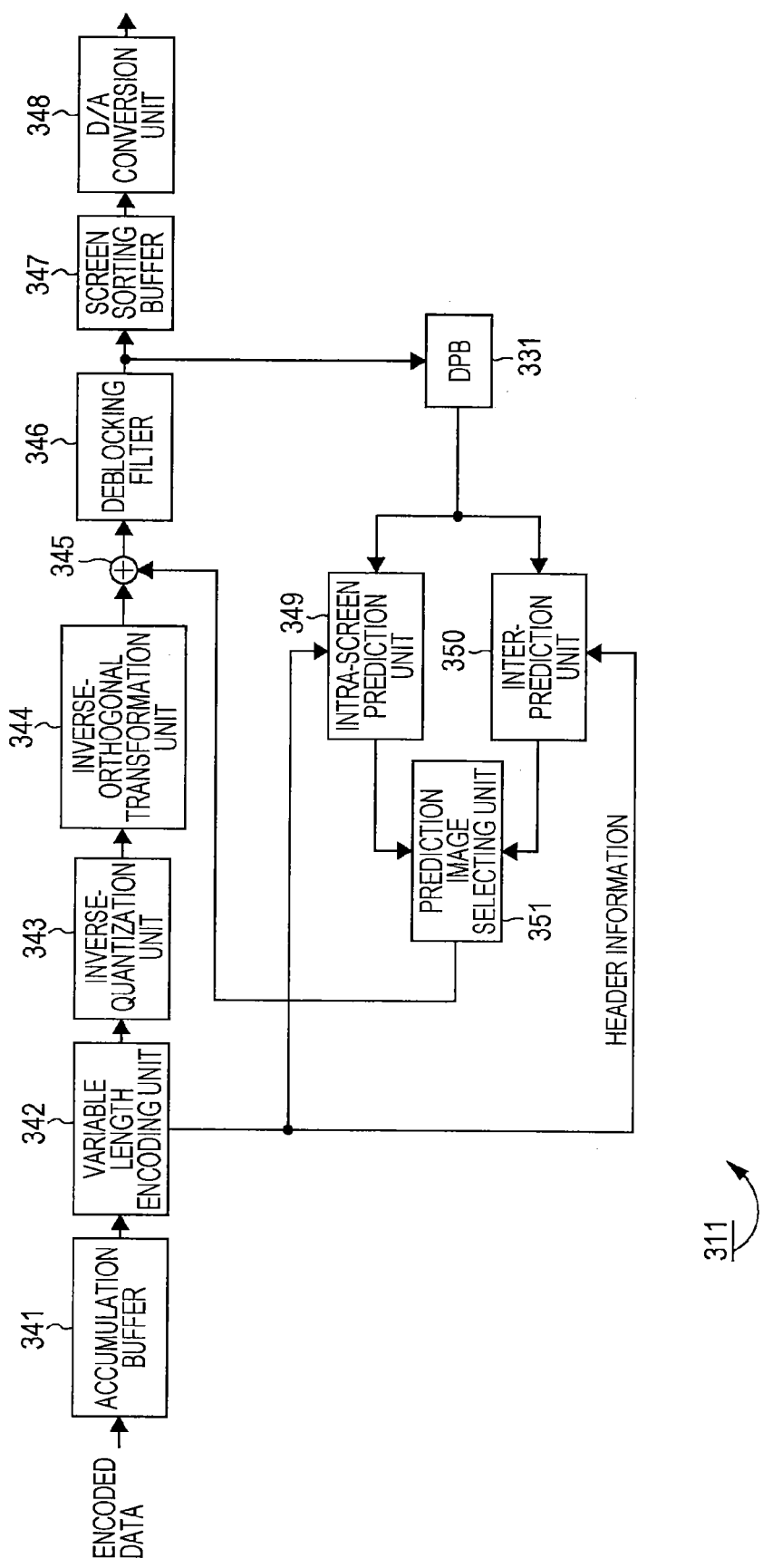
FIG. 22 is a block diagram illustrating a configuration example of a decoder 311.

FIG. 22 is a block diagram illustrating a configuration example of a decoder 311 of FIG. 21.

The decoders 312 and 321 of FIG. 21 are also configured in the same manner as the decoder 311, and, for example, encode images in accordance with the MVC method.

In FIG. 22, the decoder 311 includes an accumulation buffer 341, a variable length decoding unit 342, an inverse-quantization unit 343, an inverse-orthogonal transformation unit 344, a calculation unit 345, a deblocking filter 346, a screen sorting buffer 347, a D/A conversion unit 348, an intra-screen prediction unit 349, an inter-prediction unit 350, and a prediction image selecting unit 351.

The accumulation buffer 341 receives the encoded data of the color image C#1 from the separation unit 301 (FIG. 21).

The accumulation buffer 341 temporarily stores the encoded data provided thereto, and provides the data to the variable length decoding unit 342.

The variable length decoding unit 342 decodes, using the variable length decoding, the encoded data given by the accumulation buffer 341, thereby restoring the quantization value and the header information. Then, the variable length decoding unit 342 provides the quantization values to the inverse-quantization unit 343, and provides the header information to the intra-screen prediction unit 349 and the inter-prediction unit 350.

The inverse-quantization unit 343 dequantizes the quantization values given by the variable length decoding unit 342 into transformation coefficients, and provides them to the inverse-orthogonal transformation unit 344.

The inverse-orthogonal transformation unit 344 performs inverse-orthogonal transformation on the transformation coefficients given by the inverse-quantization unit 343, and provides them to the calculation unit 345 in units of macro blocks.

The calculation unit 345 adopts the macro block provided by the inverse-orthogonal transformation unit 344 as the target block of the decoding target, and adds the prediction image provided by the prediction image selecting unit 351 to the target block as necessary, thus deriving the decoded image and providing it to the deblocking filter 346.

For example, the deblocking filter 346 applies the same filtering as the deblocking filter 121 of FIG. 9 to the decoded image given by the calculation unit 345, and provides the filtered decoded image to the screen sorting buffer 347.

The screen sorting buffer 347 temporarily stores and reads the pictures of the decoded image from the deblocking filter 346, thereby sorting the order of the pictures into the original order (the order of display), and providing them to the D/A (Digital/Analog) conversion unit 348.

When it is necessary to output the pictures from the screen sorting buffer 347 as analog signals, the D/A conversion unit 348 converts the pictures from analog to digital, and outputs the pictures converted.

The deblocking filter 346 provides the DPB 331 with decoded images of I picture, P picture, and Bs picture which are reference-enabled pictures from among the filtered decoded images.

In this case, the DPB 331 stores the picture of the decoded image given by the deblocking filter 346, i.e., the picture of the color image C#1 as (candidate of) the reference picture referred to when generating the prediction image used for decoding that is performed later in terms of time.

As explained in FIG. 21, the DPB 331 is shared by the decoders 311, 312, 321, and 322, and therefore, stores not only the picture of the color image C#1 decoded by the decoder 311 but also the picture of the color image C#2 decoded by the decoder 312, the picture of the parallax image D#1 decoded by the decoder 321, and the picture of the parallax image D#2 decoded by the decoder 322.

The intra-screen prediction unit 349 recognizes whether the target block is encoded using the prediction image generated by the intra-prediction (intra-screen prediction), on the basis of the header information given by the variable length decoding unit 342.

When the target block is encoded using the prediction image generated by the intra-prediction, the intra-screen prediction unit 349 reads the already decoded portion (decoded image) from among the pictures (target pictures) including the target block from the DPB 331 like the intra-screen prediction unit 122 of FIG. 9. Then, the intra-screen prediction unit 349 provides some of the decoded images in the target picture which are read from the DPB 331 to the prediction image selecting unit 351 as the prediction image of the target block.

The inter-prediction unit 350 recognizes whether the target block is encoded using the prediction image generated by the inter-prediction, on the basis of the header information given by the variable length decoding unit 342.

When the target block is encoded using the prediction image generated by the inter-prediction, the inter-prediction unit 350 recognizes the prediction reference index, i.e., the reference index assigned to the reference picture used for generation of the prediction image of the target block, on the basis of the header information given by the variable length decoding unit 342.

Then, inter-prediction unit 350 reads, as the reference picture, the reference picture to which the prediction reference index is assigned from the reference pictures stored in the DPB 331.

Further, the inter-prediction unit 350 recognizes the deviation vector (parallax vector, motion vector) used for generation of the prediction image of the target block on the basis of the header information given by the variable length decoding unit 342, and like the inter-prediction unit 123 of FIG. 9, generates the prediction image by performing deviation compensation of the reference picture (motion compensation for compensating deviation for motion or parallax compensation for compensating deviation for parallax) in accordance with the deviation vector.

More specifically, the inter-prediction unit 350 obtains, as the prediction image, the block (corresponding block) at the position moved (deviated) in accordance with the deviation vector of the target block from the position of the target block in the reference picture.

Then, the inter-prediction unit 350 provides the prediction image to the prediction image selecting unit 351.

When the prediction image selecting unit 351 receives the prediction image from the intra-screen prediction unit 349, then, the prediction image selecting unit 351 selects the prediction image thus received, and provides it to the calculation unit 345. When the prediction image selecting unit 351 receives the prediction image from the inter-prediction unit 350, then, the prediction image selecting unit 351 selects the prediction image thus received, and provides it to the calculation unit 345.

[Configuration Example of Decoder 322]

Figure 23:
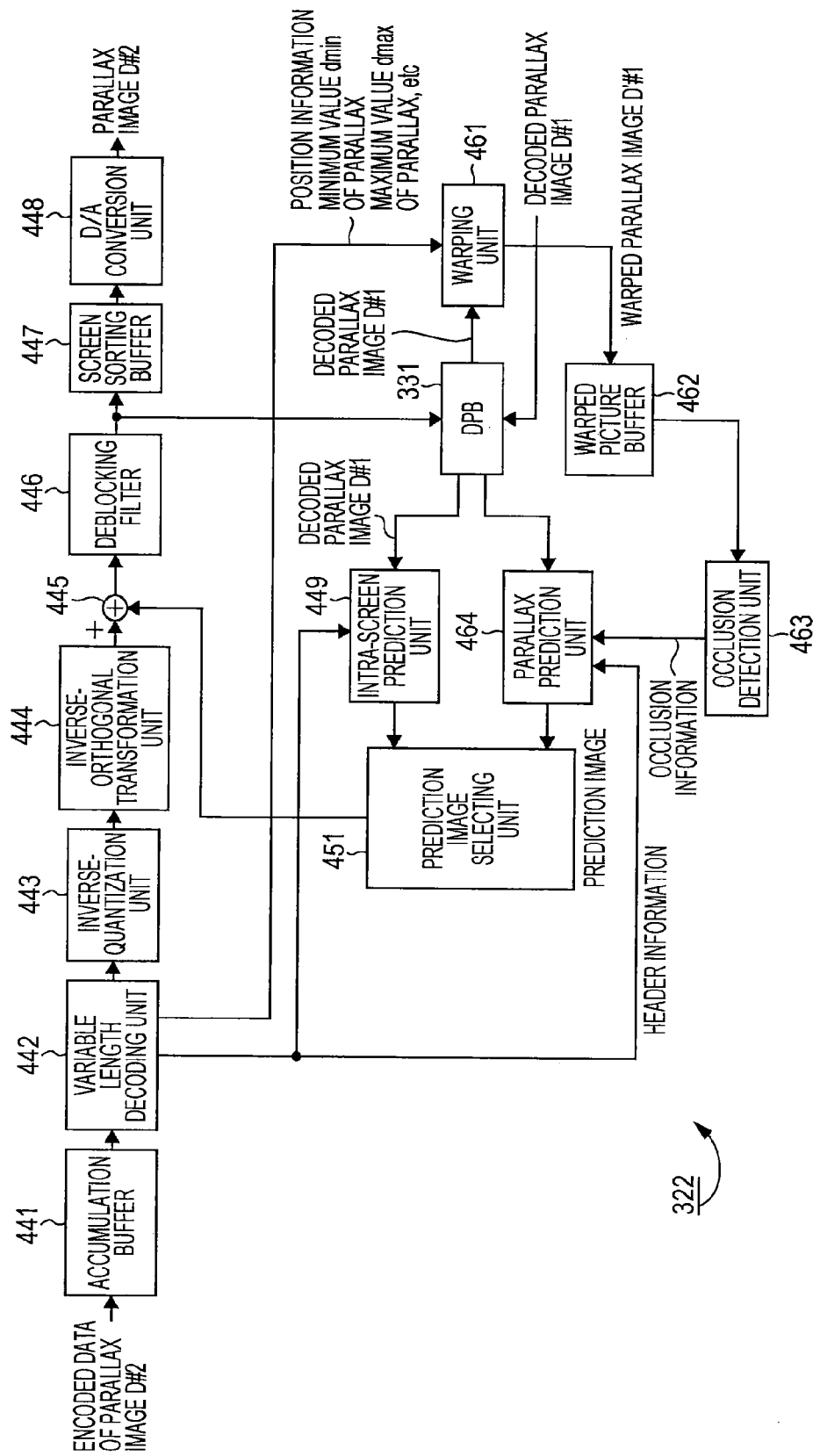
FIG. 23 is a block diagram illustrating a configuration example of a decoder 322.

FIG. 23 is a block diagram illustrating a configuration example of a decoder 322 of FIG. 21

The decoder 322 decodes the encoded data of the parallax image D#2 of the viewpoint #2 which is the decoding target using the MVC method, i.e., in the same manner as the local decoding performed by the encoder 22 of FIG. 13.

In FIG. 23, the decoder 322 includes an accumulation buffer 441, a variable length decoding unit 442, an inverse-quantization unit 443, an inverse-orthogonal transformation unit 444, a calculation unit 445, a deblocking filter 446, a screen sorting buffer 447, a D/A conversion unit 448, an intra-screen prediction unit 449, a prediction image selecting unit 451, a warping unit 461, a warped picture buffer 462, an occlusion detection unit 463, and a parallax prediction unit 464.

The accumulation buffer 441 to the intra-screen prediction unit 449 and the prediction image selecting unit 451 are configured in the same manner as the accumulation buffer 341 to the intra-screen prediction unit 349 and the prediction image selecting unit 351 of FIG. 22, respectively, and therefore, description thereabout is omitted as necessary.

In FIG. 23, the DPB 331 receives the decoded image from the deblocking filter 446, and more specifically, the DPB 331 receives the picture of the decoded parallax image D#2 which is the parallax image decoded by the decoder 322, and stores it as a reference picture that could be a reference picture.

As explained in FIGS. 21 and 22, the DPB 331 also receives and stores the pictures of the color image C#1 decoded by the decoder 311, the pictures of the color image C#2 decoded by the decoder 312, and the pictures of the parallax image (decoded parallax image) D#1 decoded by the decoder 321.

However, in the decoder 322, not only the pictures of the decoded parallax image D#2 given by the deblocking filter 446 but also the decoded parallax image D#1 obtained by the decoder 321 are used for decoding of the parallax image D#2 which is the decoding target, and therefore, FIG. 23 shows an arrow indicating the decoded parallax image D#1 obtained by the decoder 321 is provided to the DPB 331.

The warping unit 461 receives the maximum value dmax and the minimum value dmin of the image-capturing parallax vector d (the image-capturing parallax vector d1 of the viewpoint #1), the base line length L, the focal length f, and position information as the parallax related information from the variable length decoding unit 442.

The warping unit 461 obtains (reads) the picture of the decoded parallax image D#1 among the pictures of the decoded parallax images D#1 and D#2 stored in the DPB 331.

Then, like the warping unit 231 of FIG. 13, the warping unit 461 warps the picture of the decoded parallax image D#1 obtained from the DPB 331 using the parallax related information as necessary, whereby the warping unit 431 generates the picture of the warped parallax image D'#1 which is the warped image obtained by converting the picture of the decoded parallax image D#1 into the image (parallax image) obtained with the viewpoint #2.

When the warping unit 461 generates the picture of the warped parallax image D'#1 by warping the picture of the decoded parallax image D#1, and the warping unit 231 provides the picture of the warped parallax image D'#1 to the warped picture buffer 462.

The warped picture buffer 462 temporarily stores the picture of the warped parallax image D'#1 given by the warping unit 461.

In the present embodiment, the warped picture buffer 462 storing the picture of the warped parallax image D'#1 is provided in addition to the DPB 331, but one buffer may be provided to be shared by the DPB 331 and the warped picture buffer 462.

Like the occlusion detection unit 233 of FIG. 13, the occlusion detection unit 463 detects the occlusion portion of the parallax image D#2, and provides the occlusion information to the occlusion portion parallax prediction unit 464.

More specifically, the occlusion detection unit 463 detects a portion having no pixel value (pixel value-absent portion) in the picture of the warped parallax image D'#1 stored in the warped picture buffer 462 (picture of the same time as the target picture), as explained in FIG. 2.

Further, the occlusion detection unit 463 detects, as an occlusion portion, a portion in the target picture of the parallax image D#2 at the same position as the pixel value-absent portion.

Then, the occlusion detection unit 463 scans, in the horizontal direction (in which parallax exists), each block that can be processing target in the target picture of the parallax image D#2, whereby the occlusion detection unit 463 detects a start pixel S where the occlusion portion starts and an end pixel E where it ends.

When the occlusion detection unit 463 detects the start pixel S and the end pixel E of each block of the target picture, the occlusion detection unit 463 provides the start pixel S and the end pixel E to the parallax prediction unit 464 as the occlusion information.

The parallax prediction unit 464 recognizes whether the target block is encoded using the prediction image generated by the parallax prediction (inter-prediction), on the basis of the header information given by the variable length decoding unit 342.

When the target block is encoded using the prediction image generated by the parallax prediction, the parallax prediction unit 464 recognizes (obtains) the prediction reference index, i.e., the reference index assigned to the reference picture used for generation of the prediction image of the target block, on the basis of the header information given by the variable length decoding unit 342.

Then, the parallax prediction unit 464 obtains the picture of the decoded parallax image D#1 serving as the reference picture to which the prediction reference index of the target block is assigned and which is stored in the DPB 331.

Like the parallax prediction unit 234 of FIG. 13, the parallax prediction unit 234 uses the occlusion information given by the occlusion detection unit 463 as necessary, and derives the prediction vector (of the calculation parallax vector) of the target block. Then, the parallax prediction unit 234 adds the prediction vector and the residual vector included in the header information given by the variable length decoding unit 342, thus restoring the calculation parallax vector serving as the deviation vector used for generation of the prediction image of the target block.

Further, in accordance with the calculation parallax vector of the target block, like the parallax prediction unit 234 of FIG. 13, the parallax prediction unit 464 performs the parallax prediction in accordance with the calculation parallax vector, thus generating the prediction image.

More specifically, the parallax prediction unit 464 obtains, as the prediction image, the block (corresponding block) at the position moved (deviated) in accordance with the calculation parallax vector of the target block from the position of the target block in the picture of the decoded parallax image D# which is the reference picture.

Then, the parallax prediction unit 464 provides the prediction image to the prediction image selecting unit 451.

In FIG. 23, in order to simplify the explanation, like the case of the encoder 22 of FIG. 13, the decoder 322 has a parallax prediction unit 464 for performing parallax prediction of the inter-prediction. However, when the encoder 22 of FIG. 13 performs not only the parallax prediction but also the time prediction, the decoder 322 also performs (generation of the prediction image by) the parallax prediction and the time prediction just like what is done by the encoder 22.

Figure 24:
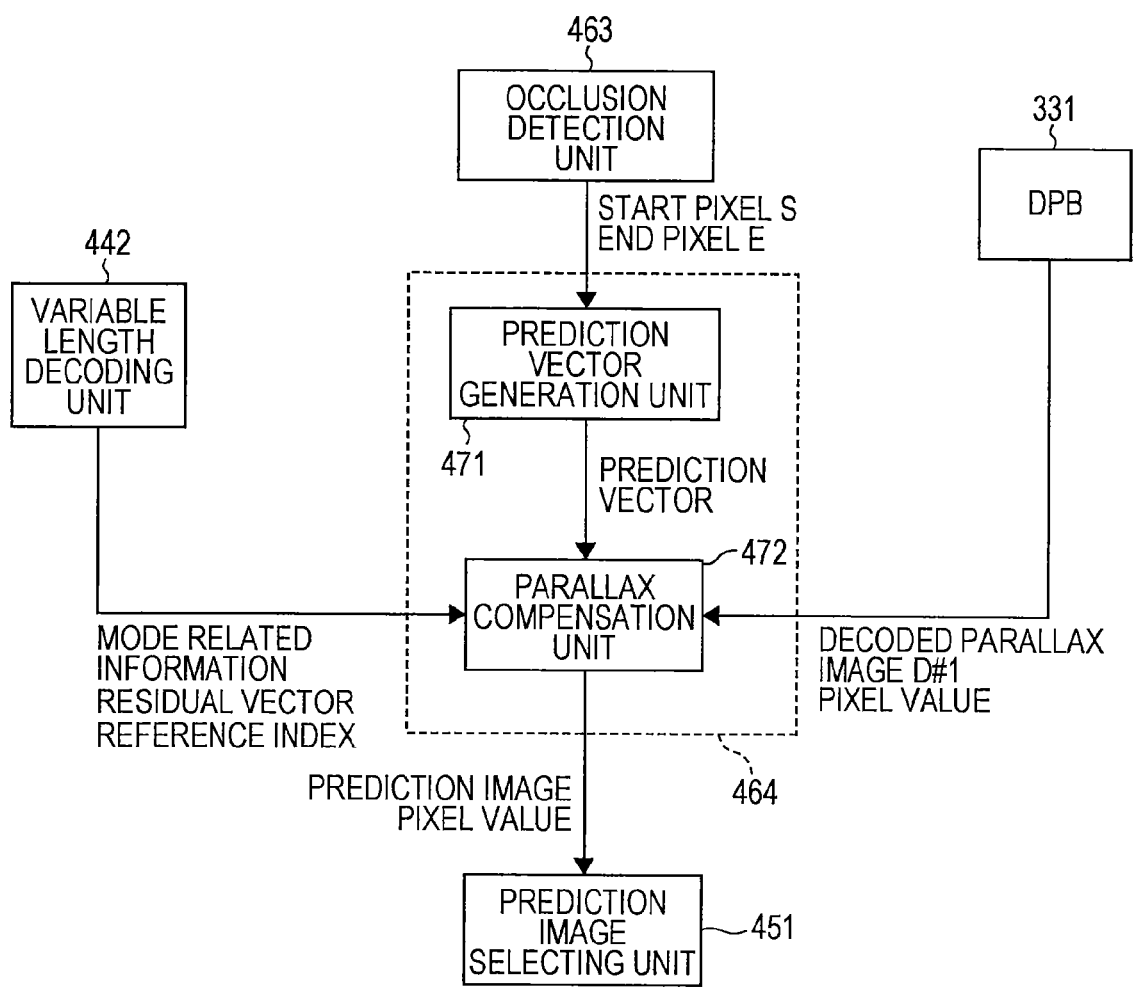
FIG. 24 is a block diagram illustrating a configuration example of a parallax prediction unit 464.

FIG. 24 is a block diagram illustrating a configuration example of the parallax prediction unit 464 of FIG. 23.

In FIG. 24, the parallax prediction unit 464 includes a prediction vector generation unit 471 and a parallax compensation unit 472.

The prediction vector generation unit 471 receives the start pixel S and the end pixel E from the occlusion detection unit 463 as the occlusion information.

Like the prediction vector generation unit 243 of FIG. 14, the prediction vector generation unit 471 uses the occlusion information given by the occlusion detection unit 463 as necessary, and generates the prediction vector of the target block (the prediction vector of the optimum inter-prediction mode) in accordance with the vector prediction method which is different depending on whether the target block is an occlusion block or not.

More specifically, when the target block is an occlusion block, the prediction vector generation unit 471 generates the prediction vector in accordance with the proximity prediction method, and when the target block is not an occlusion block, the prediction vector generation unit 471 generates the prediction vector in accordance with the MVC method.

Then, the prediction vector generation unit 471 provides the prediction vector of the target block to the parallax compensation unit 472.

When the prediction vector generation unit 471 generates the prediction vector in accordance with the proximity prediction method, it is necessary to recognize whether the viewpoint #2 of the parallax image D#2 of the decoding target of the decoder 322 is at the left side of the viewpoint #1 of the parallax image D#1 which is the reference picture, or at the right side, just like the prediction vector generation unit 243 of FIG. 14, but this recognition is done using the position information provided from the variable length decoding unit 442 (FIG. 23) to the warping unit 461.

The parallax compensation unit 472 receives the prediction vector of the target block from the prediction vector generation unit 471, and in addition, receives the mode-related information, the residual vector, and the prediction reference index of the target block included in the header information given by the variable length decoding unit 442.

Further, the parallax compensation unit 472 receives the picture of the decoded parallax image D#1 which is the reference picture stored in the DPB 331.

The parallax compensation unit 472 restores the calculation parallax vector mv of the target block by adding the residual vector given by the variable length decoding unit 442 and the prediction vector given by the prediction vector generation unit 471.

Further, the parallax compensation unit 472 adopts, as the reference picture, one of the pictures of the decoded parallax image D#1 stored in the DPB 331 which is assigned with the prediction reference index given by the variable length decoding unit 442, and uses the calculation parallax vector mv of the target block to perform the deviation compensation of the reference picture (parallax compensation) in the same manner as the MVC method, thus generating the prediction image of the target block with regard to the macro block-type represented by the mode-related information given by the variable length decoding unit 442.

More specifically, the parallax compensation unit 472 obtains, as the prediction image, the corresponding block in the picture of the decoded parallax image D#1 which is a block at the position deviated by the calculation parallax vector mv from the position of the target block.

Then, the parallax compensation unit 472 provides the prediction image to the prediction image selecting unit 451.

Figure 25:
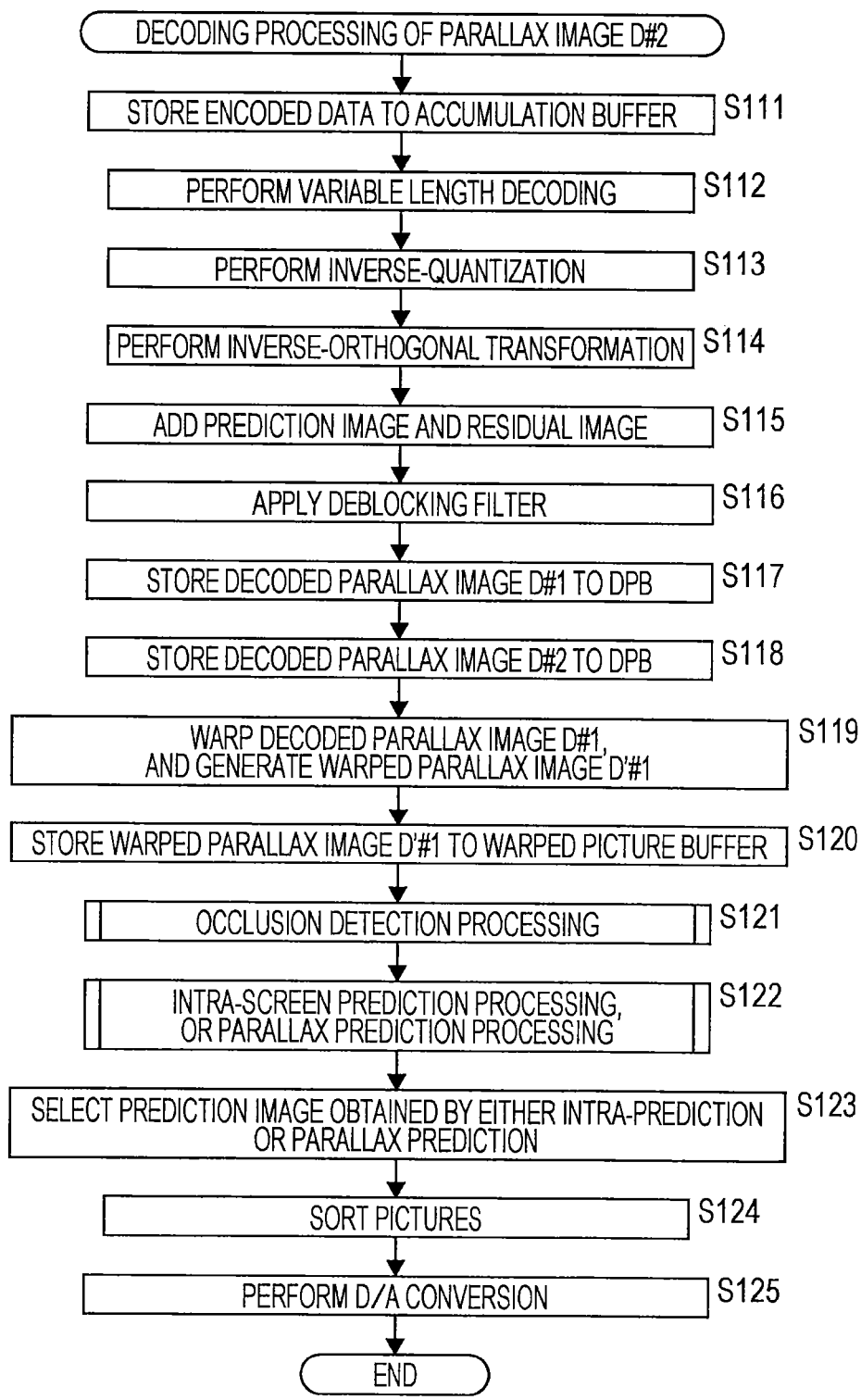
FIG. 25 is a flowchart explaining decoding processing for decoding encoded data of the parallax image D#2 of the viewpoint #2.

FIG. 25 is a flowchart explaining decoding processing for decoding encoded data of the parallax image D#2 of the viewpoint #2 performed by the decoder 322 of FIG. 23.

In step S111, the accumulation buffer 441 stores the encoded data of the parallax image D#2 of the viewpoint #2 provided thereto, and then, the processing in step S112 is performed.

In step S112, the variable length decoding unit 442 restores the quantization value and the header information by reading the encoded data stored in the accumulation buffer 441 and applying the variable length decoding thereto. Then, the variable length decoding unit 442 provides the quantization value to the inverse-quantization unit 443, and provides the header information to the intra-screen prediction unit 449 and the parallax prediction unit 450, and then, the processing in step S113 is performed.

In step S113, the inverse-quantization unit 443 dequantizes the quantization value given by the variable length decoding unit 442 into the transformation coefficient, and provides it to the inverse-orthogonal transformation unit 444, and then, the processing in step S114 is performed.

In step S114, the inverse-orthogonal transformation unit 444 dequantizes the transformation coefficient provided by the inverse-quantization unit 443, and provides it to the calculation unit 445 in unit of macro block, and then, the processing in step S115 is performed.

In step S115, the calculation unit 445 adopts the macro block provided by the inverse-orthogonal transformation unit 444 as the target block of the decoding target, and adds the prediction image provided by the prediction image selecting unit 451 to the target block (residual image) as necessary, thus deriving the decoded image. Then, calculation unit 445 provides the decoded image to the deblocking filter 446, and then, the processing in step S116 is performed after step S115.

In step S116, the deblocking filter 446 performs the filtering on the decoded image provided by the calculation unit 445, and provides the filtered decoded image (decoded parallax image D#2) to the DPB 331 and the screen sorting buffer 447, and then, the processing in step S117 is performed.

In step S117, the DPB 331 waits for receiving the decoded parallax image D#1 provided from the decoder 321 decoding the parallax image D#1, and stores the decoded parallax image D#1, and then, the processing in step S118 is performed.

In step S118, DPB 331 stores the decoded parallax image D#2 provided by the deblocking filter 446, and then, the processing in step S119 is performed.

In step S119, the warping unit 461 warps the picture of the decoded parallax image D#1 stored in the DPB 331, thereby generating the picture of the warped parallax image D'#1, and provides it to the warped picture buffer 462, and then, the processing in step S120 is performed.

In step S120, the warped picture buffer 462 stores the picture of the warped parallax image D'#1 given by the warping unit 461, and then, the processing in step S121 is performed.

In step S121, the occlusion detection unit 463 uses the picture of the warped parallax image D'#1 stored in the warped picture buffer 462 to perform occlusion detection processing for detecting an occlusion portion of the target picture of the parallax image D#2 in the same manner as FIG. 16.

Then, the occlusion detection unit 233 provides the parallax prediction unit 464 with the occlusion information obtained by the occlusion detection processing, and then, the processing in step S122 is performed after step S121.

In step S122, the intra-screen prediction unit 449 and the parallax prediction unit 464 recognize, on the basis of the header information provided from the variable length decoding unit 442, whether the subsequent target block (macro block that becomes the decoding target subsequently) is encoded using the prediction image generated by any one of the intra-prediction (intra-screen prediction) and the parallax prediction (inter-prediction).

Then, when the subsequent target block is encoded using the prediction image generated by the intra-screen prediction, the intra-screen prediction unit 449 performs the intra-prediction processing (intra-screen prediction processing).

More specifically, with regard to the subsequent target block, the intra-screen prediction unit 449 performs intra-prediction (intra-screen prediction) for generating a prediction image (the prediction image of intra-prediction) from the picture of the decoded parallax image D#2 stored in the DPB 331, and provides the prediction image to the prediction image selecting unit 451, and then, the processing in step S123 is performed after step S122.

When the subsequent target block is encoded using the prediction image generated by the parallax prediction (inter-prediction), the parallax prediction unit 464 performs the parallax prediction processing (inter-prediction processing).

More specifically, the parallax prediction unit 464 uses, with regard to the subsequent target block, the picture of the decoded parallax image D#1 stored in the DPB 331, the mode-related information, the prediction reference index, and the residual vector included in the header information given by the variable length decoding unit 442, and the occlusion information given by the occlusion detection unit 463 as necessary to perform the parallax prediction (parallax compensation), thus generating the prediction image.

Then, the parallax prediction unit 464 provides the prediction image to the prediction image selecting unit 451, and then, the processing in step S123 is performed after step S122.

In step S123, the prediction image selecting unit 451 selects the prediction image provided from one of the intra-screen prediction unit 449 and the parallax prediction unit 464 providing the prediction image, and provides it to the calculation unit 445, and then, the processing in step S124 is performed.

In this case, the prediction image selected by the prediction image selecting unit 451 in step S123 is used in the processing of step S115 performed in the decoding process of the subsequent target block.

In step S124, the screen sorting buffer 447 temporarily stores and reads the pictures of the decoded parallax image D#2 given by the deblocking filter 446, and sorts the order of the pictures into the original order, and provides them to the D/A conversion unit 448, and then, the processing in step S125 is performed.

In step S125, when it is necessary to output the pictures from the screen sorting buffer 447 as analog signals, the D/A conversion unit 348 converts the pictures from analog to digital, and outputs the pictures converted.

The encoder 322 performs the processing in steps S111 to S125 explained above repeatedly as necessary.

Figure 26:
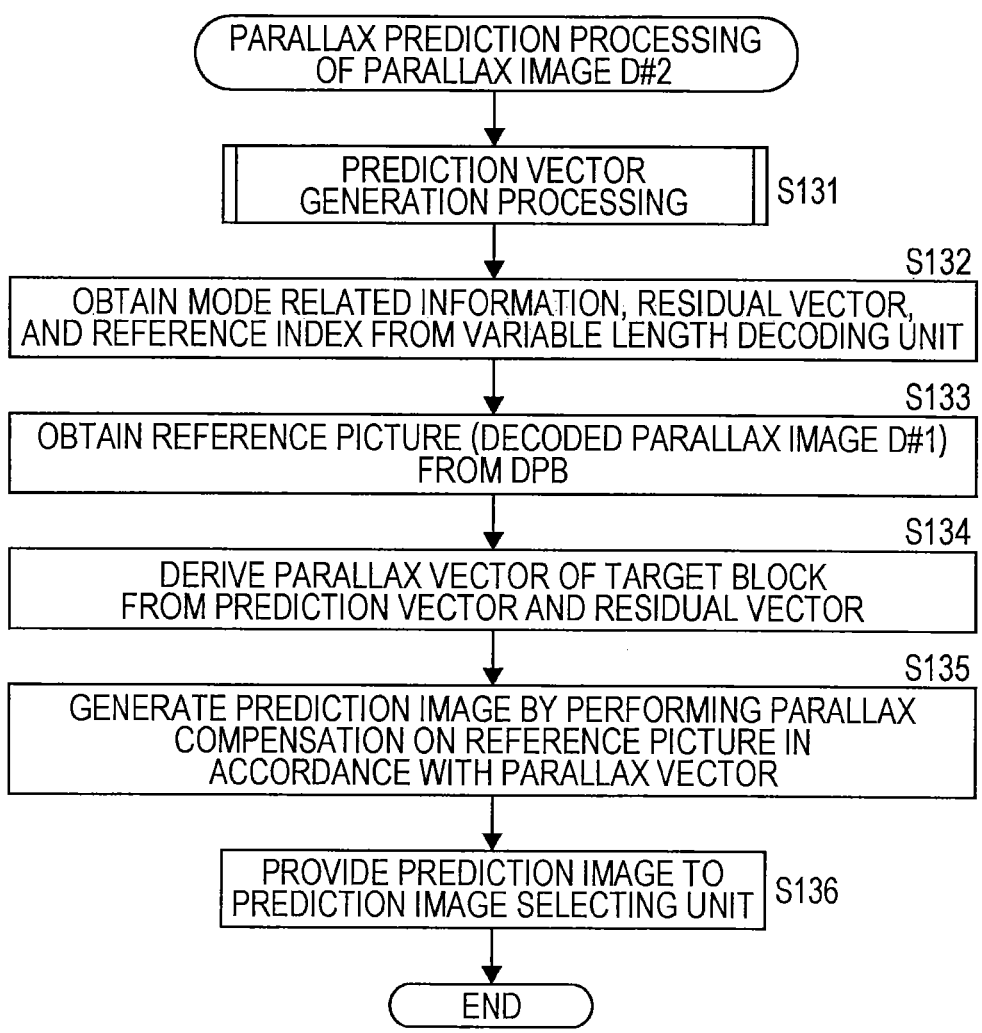
FIG. 26 is a flowchart explaining parallax prediction processing.

FIG. 26 is a flowchart explaining parallax prediction processing performed by the parallax prediction unit 464 of FIG. 24 in step S122 of FIG. 25.

In step S131, the prediction vector generation unit 471 uses the occlusion information provided by the occlusion detection unit 463 as necessary to perform prediction vector generation processing for generating the (subsequent) prediction vector of the target block as explained in FIGS. 19 and 20.

Then, the prediction vector generation unit 471 provides the prediction vector of the target block obtained by the prediction vector generation processing to the parallax compensation unit 472, and then, the processing in step S132 is performed after step S131.

In step S132, the parallax prediction unit 464 obtains the mode-related information, the residual vector, and the prediction reference index of the (subsequent) target block included in the header information given by the variable length decoding unit 442, and provides them to the parallax compensation unit 472, and then, the processing in step S133 is performed after step S132.

In step S132, the parallax compensation unit 472 obtains, as the reference picture, the picture of the decoded parallax image D#1 (picture of the same time as the target picture) assigned with the prediction reference index from the DPB 331, and then, the processing in step S134 is performed.

In step S134, the parallax compensation unit 472 restores the calculation parallax vector mv of the target block by adding the residual vector included in the header information given by the variable length decoding unit 442 and the prediction vector given by the prediction vector generation unit 471, and then, the processing in step S135 is performed.

In step S135, the parallax compensation unit 472 performs the MC on the picture of the decoded parallax image D#1 which is the reference picture given by the DPB 331 in accordance with the calculation parallax vector mv of the target block, thus generating the prediction image of the target block, and then, the processing in step S136 is performed.

More specifically, the parallax compensation unit 472 obtains, as the prediction image, the corresponding block in the picture of the decoded parallax image D#1 which is a block at the position deviated by the calculation parallax vector mv from the position of the target block.

In step S136, the parallax compensation unit 472 provides the prediction image to the prediction image selecting unit 451, and the processing returns.

[Another Configuration Example of Encoder 22]

Figure 27:
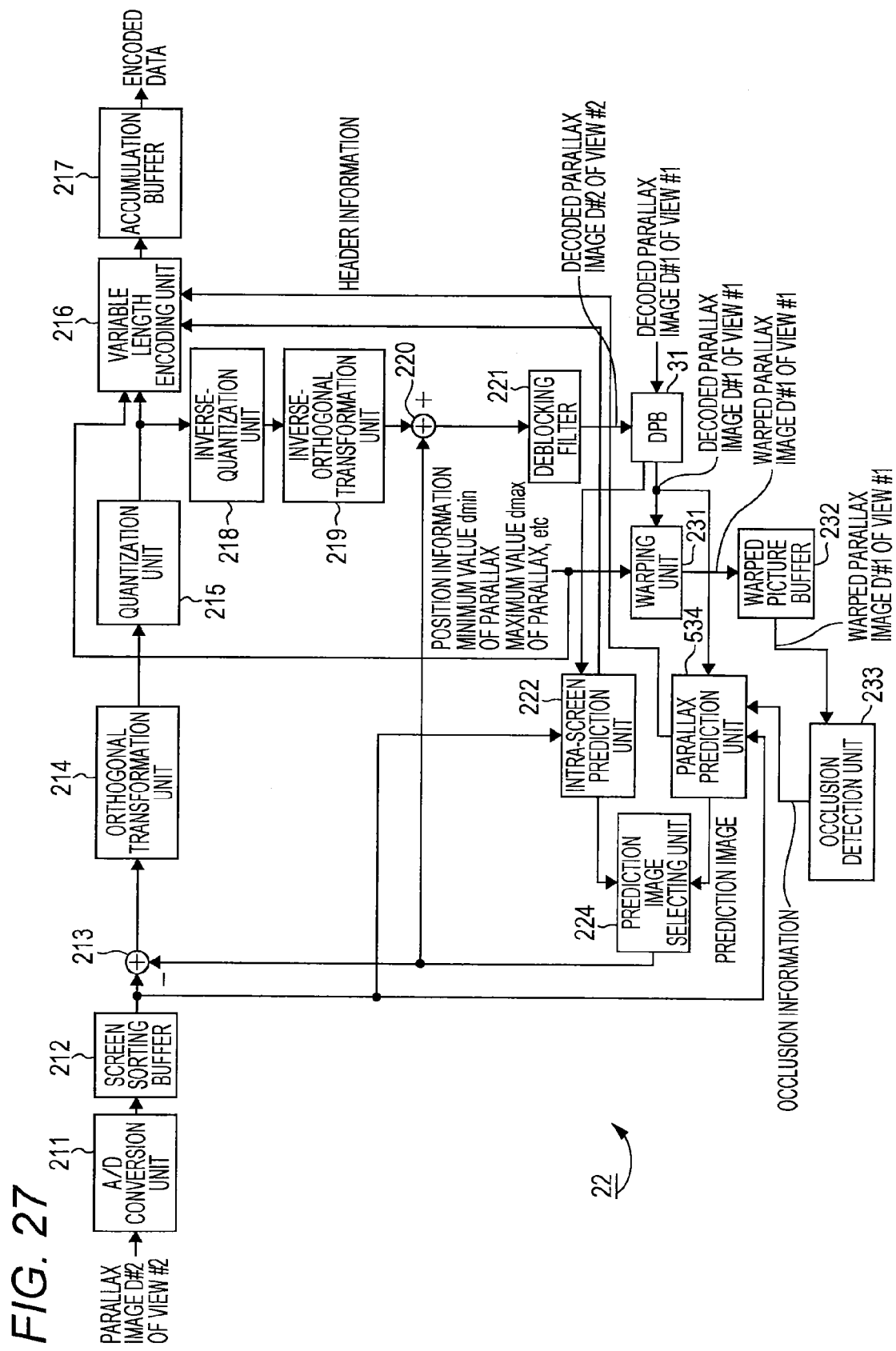
FIG. 27 is a block diagram illustrating another configuration example of an encoder 22.

FIG. 27 is a block diagram illustrating another configuration example of an encoder 22 of FIG. 5.

In FIG. 27, the same portions corresponding to those of FIG. 13 are denoted with the same reference numerals, and in the explanation below, explanation thereabout is omitted as necessary.

The encoder 22 of FIG. 27 is the same as the case of FIG. 13 in that it has an A/D conversion unit 211 to an intra-screen prediction unit 222, a prediction image selecting unit 224, a warping unit 231, a warped picture buffer 232, and an occlusion detection unit 233.

However, the encoder 22 of FIG. 27 is different from the case of FIG. 13 in that it has a parallax prediction unit 534 instead of the parallax prediction unit 234.

The parallax prediction unit 234 of FIG. 13 is such that, with the proximity prediction method, as explained with the expression (1) and the expression (2), the number of pixels E−S+1 from the start pixel S to the end pixel E of the occlusion block is subtracted from the prediction vector PMV# (i−1) of the occlusion block B# (i−1) adjacent to the left side of the target block B#i, whereby so-called the vector of accuracy in unit of pixel is derived as the prediction vector PMV#i of the target block B#i. In contrast, the parallax prediction unit 534 of FIG. 27 uses the proximity prediction method to subtract the number of pixels (which may be hereinafter referred to as the width of the occlusion block) in the x direction of the occlusion block from the prediction vector PMV# (i−1) of the occlusion block B# (i−1) adjacent to the left side of the target block B#i, thus deriving so-called vector of accuracy in unit of the width of the occlusion block as the prediction vector PMV#i of the target block B#i.

Further, the parallax prediction unit 534 outputs a predictor flag which is a flag representing a vector prediction method for generating the prediction vector of the target block.

Therefore, the prediction accuracy of the prediction vector derived by the parallax prediction unit 534 is somewhat deteriorated as compared with the prediction accuracy of the prediction vector derived by the parallax prediction unit 234 (FIG. 13), but the decoder side can use the predictor flag to generate the prediction vector in an easy manner (without using the occlusion detection processing).

The parallax prediction unit 534 performs the same processing as the parallax prediction unit 234 of FIG. 13 except that the parallax prediction unit 534 generates the vector of accuracy in unit of the width of the occlusion block as the prediction vector of the proximity prediction method and outputs a predictor flag which is a flag indicating a vector prediction method for generating the prediction vector as explained above.

Figure 28:
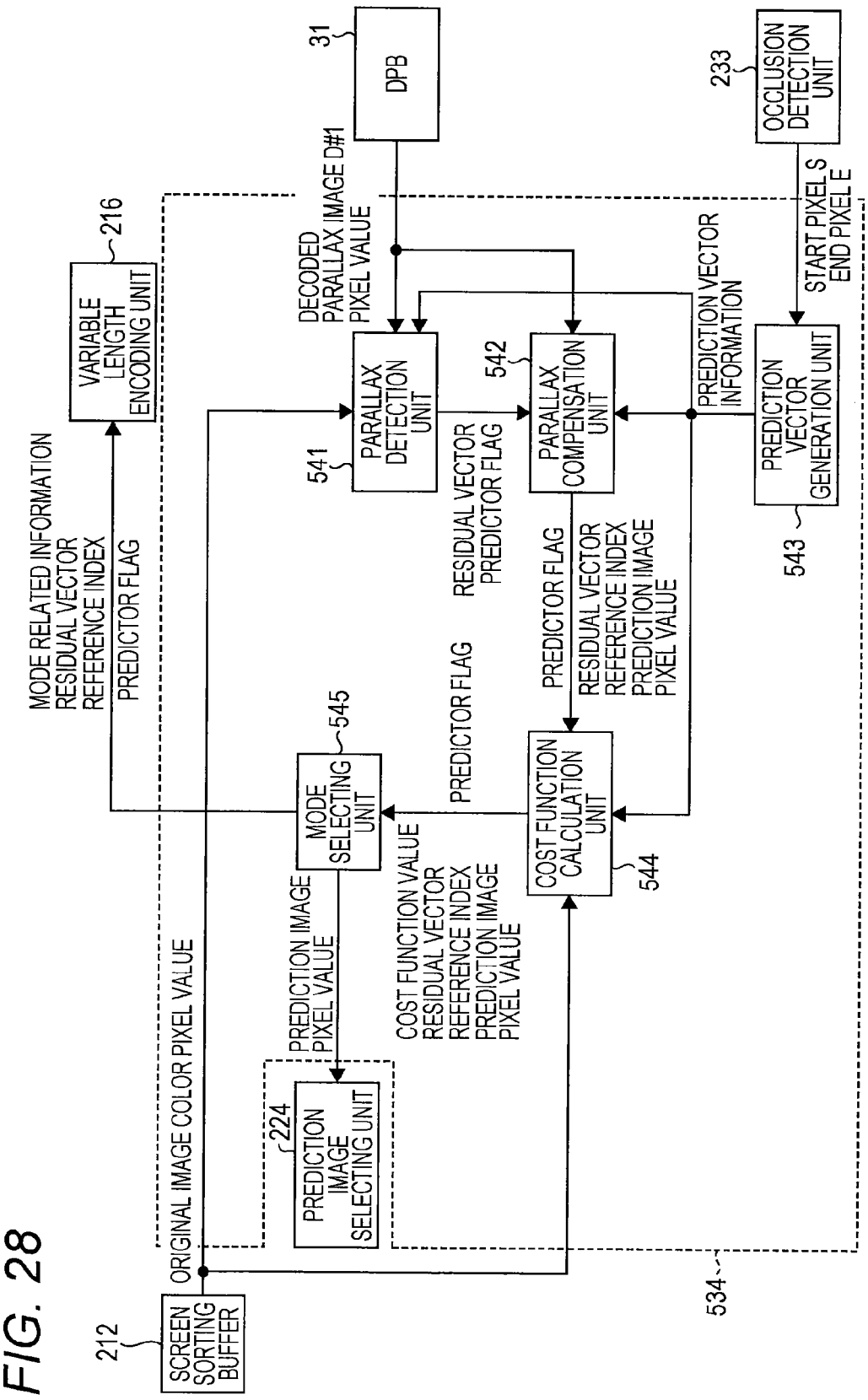
FIG. 28 is a block diagram illustrating a configuration example of a parallax prediction unit 534.

FIG. 28 is a block diagram illustrating a configuration example of the parallax prediction unit 534 of FIG. 27.

In FIG. 28, the parallax prediction unit 534 includes a parallax detection unit 541, a parallax compensation unit 542, a prediction vector generation unit 543, a cost function calculation unit 544, and a mode selecting unit 545.

The parallax detection unit 541, the parallax compensation unit 542, the cost function calculation unit 544, and the mode selecting unit 545 of the parallax detection unit 541 to the mode selecting unit 545 perform the same processing as the parallax detection unit 241, the parallax compensation unit 242, the cost function calculation unit 244, and the mode selecting unit 245 of FIG. 14 except that the parallax detection unit 541, the parallax compensation unit 542, the cost function calculation unit 544, and the mode selecting unit 545 handle the predictor flag.

The prediction vector generation unit 543 performs the same processing as the prediction vector generation unit 243 of FIG. 14 except that it generates the vector of accuracy in unit of the width of the occlusion block as the prediction vector of the proximity prediction method and handles the predictor flag.

More specifically, the parallax detection unit 541 receives the picture of the decoded parallax image D#1 which is the reference picture stored in the DPB 31, and receives the picture of the parallax image D#2 of the encoding target (target picture) from the screen sorting buffer 212.

For the target block in the target picture given by the screen sorting buffer 212, the parallax detection unit 541 performs the ME using the picture of the decoded parallax image D#1 as the reference picture in the same manner as the MVC method, thus detecting, for each macro block-type, the calculation parallax vector mv of the target block.

Further, the parallax detection unit 541 detects the residual vector which is the difference between the calculation parallax vector mv and the prediction vector obtained from the prediction vector information provided by the prediction vector generation unit 543.

In this case, the prediction vector information provided from the prediction vector generation unit 543 to the parallax detection unit 541 includes a prediction vector and a predictor flag representing the vector prediction method of the prediction vector (in this case, MVC method, or proximity prediction method).

The parallax detection unit 541 provides the parallax compensation unit 542 with the residual vector as well as the predictor flag included in the prediction vector information representing the vector prediction method of the prediction vector used to derive the residual vector.

The parallax compensation unit 542 receives not only the residual vector of the calculation parallax vector mv and the predictor flag from the parallax detection unit 541 but also the picture of the decoded parallax image D#1 which is the reference picture stored in the DPB 31.

Further, the parallax compensation unit 542 receives the prediction vector information from the prediction vector generation unit 543.

The parallax compensation unit 542 restores the calculation parallax vector mv of the target block from the residual vector given by the parallax detection unit 541 and the prediction vector information given by the prediction vector generation unit 543.

Further, the parallax compensation unit 542 adopts the picture of the decoded parallax image D#1 given by the DPB 31 as the reference picture and performs the deviation compensation (parallax compensation) of the reference picture in the same manner as the MVC method using the calculation parallax vector mv of the target block, thus generating the prediction image of the target block for each macro block-type.

Then, the parallax compensation unit 542 provides the cost function calculation unit 544 with the prediction image, the residual vector and the predictor flag provided by parallax detection unit 541, and the reference index assigned to the reference picture (in this case, the picture of the decoded parallax image D#1) used to generate the prediction image.

The prediction vector generation unit 543 receives the start pixel S and the end pixel E from the occlusion detection unit 233 as the occlusion information.

The prediction vector generation unit 543 uses the occlusion information given by the occlusion detection unit 233 to determine whether the target block is an occlusion block or not.

Then, when the target block is an occlusion block, the prediction vector generation unit 543 generates the prediction vector of the target block in accordance with the proximity prediction method explained with reference to FIGS. 2 to 4.

When the target block is not an occlusion block (non-occlusion block), the prediction vector generation unit 543 generates the prediction vector of the target block in accordance with the MVC method explained with reference to FIGS. 11 and 12.

The prediction vector generation unit 543 generates the prediction vector of the proximity prediction method, the prediction vector generation unit 543 generates the vector of accuracy in unit of the width of the occlusion block.

For each macro block-type (FIG. 10), the prediction vector generation unit 543 generates the prediction vector, and provides it and the predictor flag representing the vector prediction method of the prediction vector as the prediction vector information to the parallax detection unit 541, the parallax compensation unit 542, and the cost function calculation unit 544.

The cost function calculation unit 544 receives the prediction image, the residual vector, the predictor flag and the reference index from the parallax compensation unit 542, and receives the prediction vector information from the prediction vector generation unit 543, and in addition, receives the target picture of the parallax image D#2 from the screen sorting unit buffer 212.

For each macro block-type (FIG. 10), the cost function calculation unit 544 derives the encoding cost required to encode the target block of the target picture given by the screen sorting buffer 212 in accordance with, e.g., the same cost function as that used by the cost function calculation unit 244 of FIG. 14.

When the cost function calculation unit 544 derives the encoding cost (cost function value) for each macro block-type, the cost function calculation unit 544 provides the encoding cost as well as the reference index, the prediction image, the residual vector, and the predictor flag to the mode selecting unit 545.

The mode selecting unit 545 detects the minimum cost which is the minimum value from among the encoding costs of the macro block-types given by the cost function calculation unit 544.

Further, the mode selecting unit 545 selects, as the optimum inter-prediction mode, the macro block-type from which the minimum cost is obtained.

Then, the mode selecting unit 545 provides the variable length encoding unit 216 with the mode-related information representing the optimum inter-prediction mode, the reference index of the optimum inter-prediction mode (prediction reference index), the residual vector, the predictor flag, and the like as header information.

Further, the mode selecting unit 545 provides the prediction image selecting unit 224 with the prediction image of the optimum inter-prediction mode and the encoding cost (minimum cost).

In this case explained above, the predictor flag is put into the header of the encoded data by the variable length encoding unit 216. In addition to putting the predictor flag into the header of the encoded data, it may be possible to provide (transmit) it separately from the encoded data.

The encoder 22 of FIG. 27 performs the same encoding processing as that explained with reference to FIG. 15. However, in step S26 of FIG. 15, the parallax prediction unit 534 performs the parallax prediction processing instead of the parallax prediction unit 234 of FIG. 13.

Figure 29:
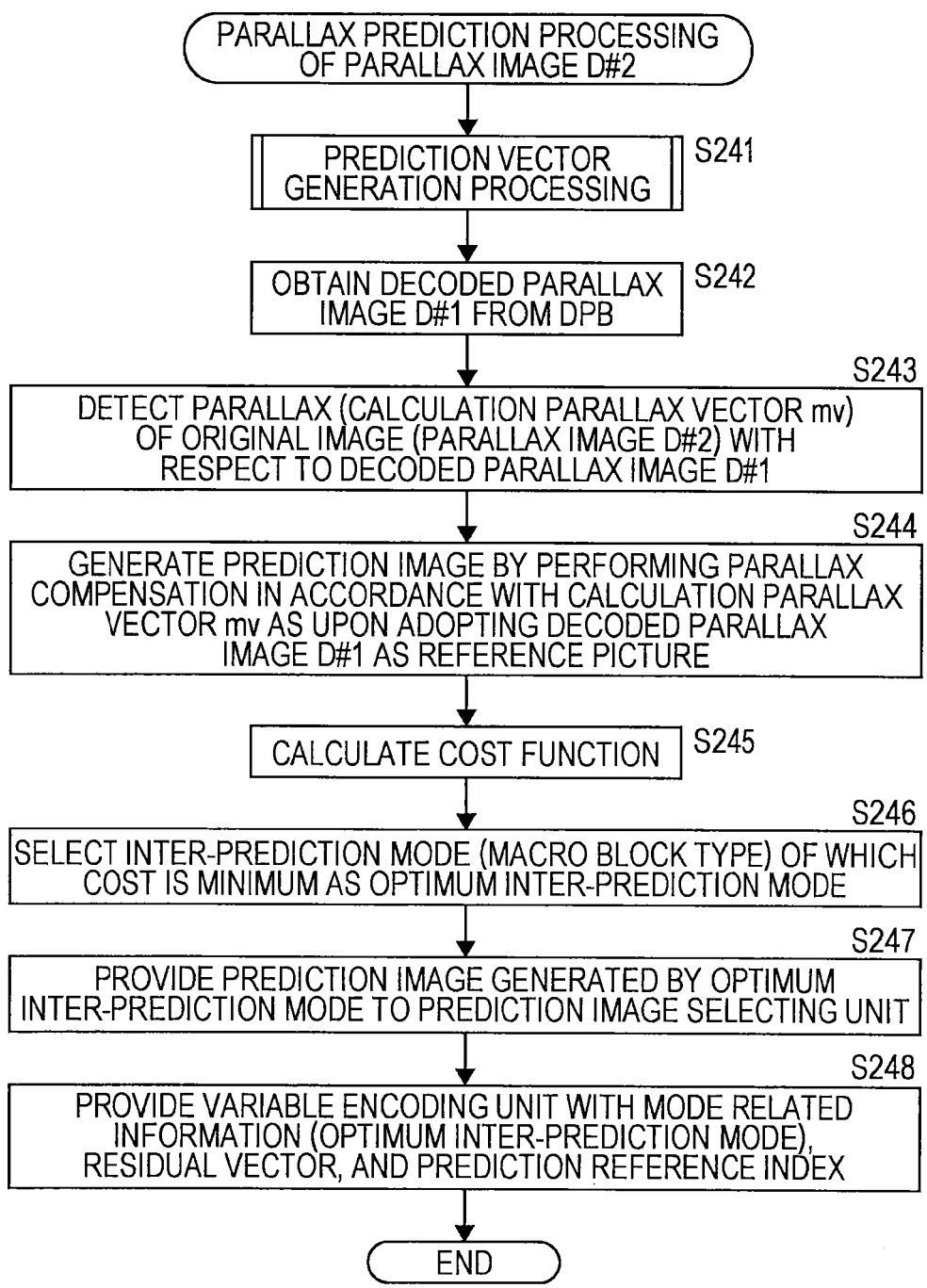
FIG. 29 is a flowchart explaining parallax prediction processing.

FIG. 29 is a flowchart explaining parallax prediction processing performed by the parallax prediction unit 534 of FIG. 28 in step S26 of FIG. 15.

In step S241, the prediction vector generation unit 543 uses the occlusion information provided by the occlusion detection unit 233 as necessary to perform prediction vector generation processing for generating the (subsequent) prediction vector of the target block for each macro block-type (FIG. 10) in accordance with the MVC method or the proximity prediction method.

However, the prediction vector generation unit 543 derives the prediction vector of accuracy in unit of the width of the occlusion block in the proximity prediction method.

Then, the prediction vector generation unit 543 provides the prediction vector of the target block obtained by the prediction vector generation processing and the predictor flag representing the vector prediction method of the prediction vector, as the prediction vector information, to the parallax detection unit 541, the parallax compensation unit 542, and the cost function calculation unit 544, and then, the processing in step S242 is performed after step S241.

In step S242, the parallax prediction unit 534 obtains the picture of the decoded parallax image D#1 which is the reference picture from the DPB 31, and provides it to the parallax detection unit 541 and the parallax compensation unit 542, and then, the processing in step S243 is performed.

In step S243, the parallax detection unit 541 uses the picture of the decoded parallax image D#1 given by the DPB 31 as the reference picture to perform ME on the (subsequent) target block in the target picture provided by the screen sorting buffer 212, thus detecting the calculation parallax vector mv representing parallax of the target block with respect to the viewpoint #1.

Further, the parallax detection unit 541 derives the residual vector which is the difference between the calculation parallax vector mv of the target vector and the prediction vector obtained from the prediction vector information provided by the prediction vector generation unit 543, and provides it as well as the predictor flag of the prediction vector used to derive the residual vector to the parallax compensation unit 542, and then, the processing in step S244 is performed after step S243.

In step S244, the parallax compensation unit 542 restores the calculation parallax vector mv of the target block from the residual vector given by the parallax detection unit 541 and the prediction vector information given by the prediction vector generation unit 543.

Further, the parallax compensation unit 542 uses the picture of the decoded parallax image D#1 given by the DPB 31 as the reference picture to perform MC in accordance with the calculation parallax vector mv of the target block mv, thus generating the (subsequent) prediction image of the target block.

Then, the parallax compensation unit 542 provides the cost function calculation unit 544 with the prediction image, the residual vector and the predictor flag provided by parallax detection unit 541, and the reference index assigned to the reference picture (in this case, the picture of the decoded parallax image D#1) used to generate the prediction image, and then, the processing in step S245 is performed after step S244.

In step S245, for each macro block-type (FIG. 10), the cost function calculation unit 544 derives the encoding cost required to encode the target block of the target picture given by the screen sorting buffer 212 in accordance with a predetermined cost function, and provides it as well as the reference index, the prediction image, the residual vector and the predictor flag given by the parallax compensation unit 542 to the mode selecting unit 545, and then, the processing in step S246 is performed.

In step S246, the mode selecting unit 545 detects the minimum cost which is the minimum value from among the encoding costs of the macro block-types given by the cost function calculation unit 544.

Further, the mode selecting unit 545 selects, as the optimum inter-prediction mode, the macro block-type from which the minimum cost is obtained, and then, the processing in step S247 is performed after step S246.

In step S247, the mode selecting unit 545 provides the prediction image selecting unit 224 with the prediction image of the optimum inter-prediction mode and the encoding cost (minimum cost), and then, the processing in step S248 is performed.

In step S248, the mode selecting unit 545 provides the variable length encoding unit 216 with the mode-related information representing the optimum inter-prediction mode, the reference index of the optimum inter-prediction mode (prediction reference index), the residual vector, the predictor flag, and the like as header information, and the processing returns.

Figure 30:
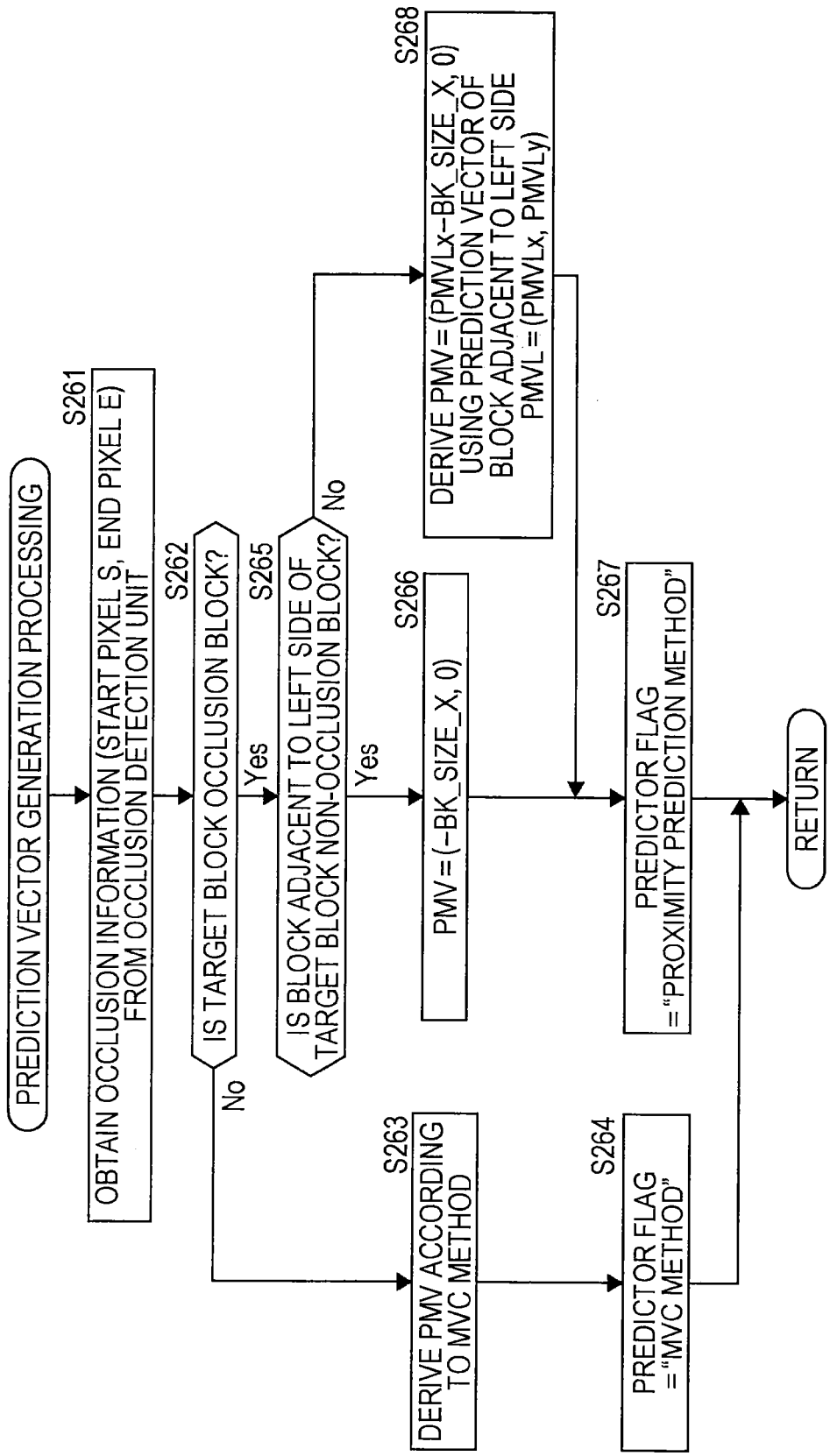
FIG. 30 is a flowchart explaining prediction vector generation processing.

FIG. 30 is a flowchart explaining prediction vector generation processing performed by the prediction vector generation unit 543 (FIG. 28) in step S241 of FIG. 29.

In the same manner as FIG. 19, FIG. 30 shows prediction vector generation processing where the viewpoint #1 is at the right side, and the viewpoint #2 is at the left side, and in the parallax information image D#2 of the viewpoint #2, a background portion adjacent to the left side of the foreground is the occlusion portion, and more specifically, the left side of the occlusion portion is the background and the right side thereof is the foreground (FIG. 3).

The prediction vector generation unit 543 recognizes, from the position information provided to the warping unit 231 (FIG. 27), as to whether the viewpoint #2 of the parallax image D#2 of the encoding target of the encoder 22 (FIG. 27) is located at the left side of the viewpoint #1 of the parallax image D#1 which is the reference picture.

The prediction vector generation unit 543 performs prediction vector generation processing according to the flowchart of FIG. 30 when the viewpoint #2 is at the left side of the viewpoint #1.

In step S261, like step S61 of FIG. 19, the prediction vector generation unit 543 obtains the start pixel S and the end pixel E of each block of the target picture serving as the occlusion information from the occlusion detection unit 233, and then, the processing in step S262 is performed.

In step S262, like step S62 of FIG. 19, the prediction vector generation unit 543 determines whether the target block is an occlusion block or not, on the basis of the occlusion information given by the occlusion detection unit 233.

In step S262, when the target block is determined not to be an occlusion block, and more specifically, when the target block is determined to be a non-occlusion block, then the processing in step S263 is subsequently performed, and the prediction vector generation unit 543 generates the prediction vector PMV of the target block according to the MVC method, and the processing in step S264 is subsequently performed.

In step S264, the prediction vector generation unit 543 sets the predictor flag to a value "MVC method" indicating that the prediction vector PMV is the prediction vector of the MVC method, and the processing returns.

In step S262, when the target block is determined to be an occlusion block, the processing in step S265 is subsequently performed, and thereafter, the prediction vector generation unit 543 generates the prediction vector PMV of the target block which is the occlusion block in accordance with the proximity prediction method.

More specifically, in step S265, the prediction vector generation unit 543 determines whether an (encoded) block adjacent to the left side of the target block which is the occlusion block is a non-occlusion block or not on the basis of the occlusion information.

In step S265, when a block adjacent to the left side of the target block is determined to be a non-occlusion block, and more specifically, when a column (slice) of the target block in the target picture is scanned in the x direction and it is found that the occlusion portion starts from the target block, then the processing in step S266 is subsequently performed, and the prediction vector generation unit 543 uses the width of the occlusion block (the number of pixels in the x direction of the occlusion block) BK_SIZE_X to derive (generate) the prediction vector of accuracy in unit of the width of the occlusion block serving as the prediction vector PMV of the target block in accordance with the expression PMV=(−BK_SIZE_X, 0), and then, the processing in step S267 is performed.

In this case, in step S65 of FIG. 19, the start pixel S and the end pixel E of the target block are used to derive the prediction vector PMV of accuracy in unit of pixel in accordance with the expression PMV=(−(E−S+1), 0), but in step S266, instead of using the start pixel S and the end pixel E of the target block, the prediction vector PMV of accuracy in unit of the width of the occlusion block is derived using the width of the occlusion block BK_SIZE_X.

In step S267, the prediction vector generation unit 543 sets the predictor flag to a value "proximity prediction method" indicating that the prediction vector PMV is the prediction vector of the proximity prediction method, and then the processing returns.

In step S265, when a block adjacent to the left side of the target block is determined not to be a non-occlusion block, and more specifically, when a block adjacent to the left side of the target block is an occlusion block, then the processing in step S268 is subsequently performed, and the prediction vector generation unit 543 uses, instead of the start pixel S and the end pixel E of the target block of the expression (1), the width of the occlusion block BK_SIZE_X, and uses the x component of the prediction vector PMVL=(PMVLx, PMVLy) already derived, in a block adjacent to the left side of the target block (occlusion block) to derive the prediction vector of accuracy in unit of the width of the occlusion block serving as the prediction vector PMV of the target block in accordance with the expression PMV=(PMVLx−BK_SIZE_X, 0), and then, the processing in step S267 is performed.

In step S267, the prediction vector generation unit 543 sets the predictor flag to the value "proximity prediction method" as described above, and then the processing returns.

In step S268, the prediction vector of the target block can be derived in accordance with not only the expression PMV=(PMVLx−BK_SIZE_X, 0) but also, for example, the expression PMV=(PMVLx−BK_SIZE_X, PMVLy).

Figure 31:
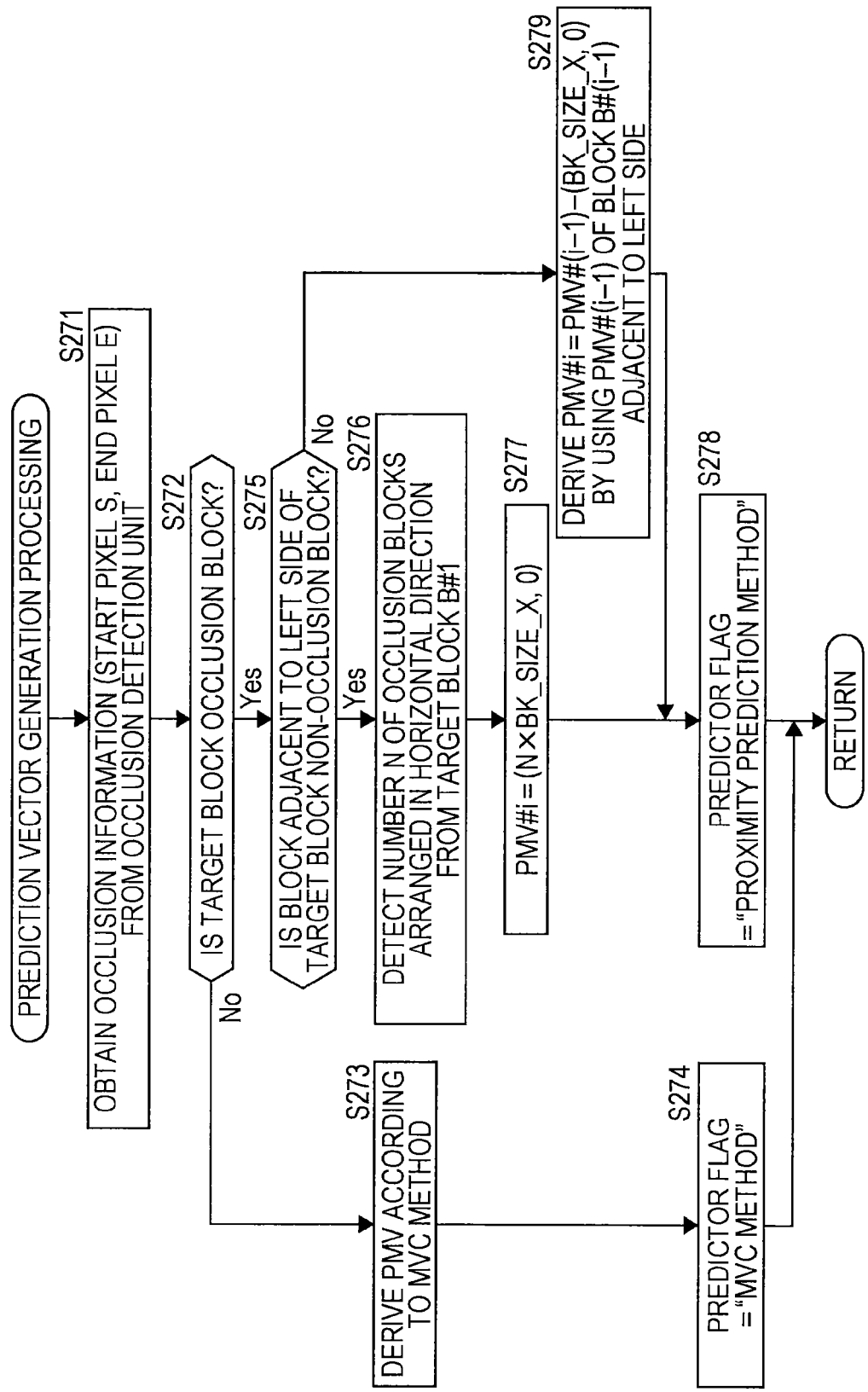
FIG. 31 is a flowchart explaining prediction vector generation processing.

FIG. 31 is a flowchart explaining prediction vector generation processing performed by the prediction vector generation unit 543 (FIG. 28) in step S241 of FIG. 29.

In the same manner as FIG. 20, FIG. 31 shows prediction vector generation processing where the viewpoint #1 is at the left side, and the viewpoint #2 is at the right side, and in the parallax information image D#2 of the viewpoint #2, a background portion adjacent to the right side of the foreground is the occlusion portion, and more specifically, the right side of the occlusion portion is the background and the left side thereof is the foreground (FIG. 4).

The prediction vector generation unit 543 recognizes, from the position information provided to the warping unit 231, as to whether the viewpoint #2 of the parallax image D#2 of the encoding target of the encoder 22 (FIG. 27) is located at the right side of the viewpoint #1 of the parallax image D#1 which is the reference picture.

The prediction vector generation unit 543 performs prediction vector generation processing according to the flowchart of FIG. 31 when the viewpoint #2 is at the right side of the viewpoint #1.

In steps S271 to S275, the prediction vector generation unit 543 performs the same processing as that in steps S261 to S265 of FIG. 30.

Then, in step S275, when a block adjacent to the left side of the target block is determined to be a non-occlusion block, and more specifically, when a column (slice) of the target block in the target picture is scanned in the x direction and it is found that the occlusion portion starts from the target block, then the processing in step S276 is subsequently performed, and the prediction vector generation unit 543 recognizes (detects) the number N of occlusion blocks arranged continuously in the x direction with the target block being the front from the occlusion information, and then, the processing in step S277 is performed.

In this case, when the i-th block from the first one of the occlusion blocks arranged continuously in the x direction with the target block being at the front is denoted as B#i, the first block (target block) of the occlusion blocks arranged continuously in the x direction with the target block being at the front is denoted as B#1, and the last block is denoted as B#N.

In step S277, the prediction vector generation unit 543 uses a summation N×BK_SIZE_X of each of the width BK_SIZE_X of N blocks B#1 to B#N which are occlusion blocks arranged continuously in the x direction with the target block being at the front to derive the prediction vector PMV#1 of the target block B#1 in accordance with the expression PMV#1=(N×BK_SIZE_X, 0), and then, the processing in step S278 is performed.

In this case, in step S76 of FIG. 20, the start pixel S and the end pixel E of the occlusion block are used to derive the prediction vector PMV#1 of accuracy in unit of pixel, but in step S277, instead of using the start pixel S and the end pixel E, the prediction vector PMV#1 of accuracy in unit of the width of the occlusion block is derived using the width of the occlusion block BK_SIZE_X.

In step S278, like step S267 of FIG. 30, the prediction vector generation unit 543 sets the predictor flag to the value "proximity prediction method", and then the processing returns.

In step S275, when a block adjacent to the left side of the target block is determined not to be a non-occlusion block, and more specifically, when a block adjacent to the left side of the target block is an occlusion block, then the processing in step S279 is subsequently performed. In step S279, instead of the start pixel S# (i−1) and the end pixel E# (i−1) of a block B# (i−1) adjacent to the left side of the target block B#i of the expression (2), the prediction vector generation unit 543 uses the width of the occlusion block BK_SIZE_X and the already derived prediction vector PMV# (i−1) of a block adjacent to the left side of the target block (occlusion block) to derive the prediction vector of accuracy in unit of the width of the occlusion block serving as the prediction vector PMV#i of the target block in accordance with the expression PMV#i=PMV#(i−1)−(BK_SIZE_X, 0), and then, the processing in step S278 is performed.

In step S278, the prediction vector generation unit 543 sets the predictor flag to the value "proximity prediction method" as described above, and then the processing returns.

[Another Configuration Example of Decoder 322]

Figure 32:
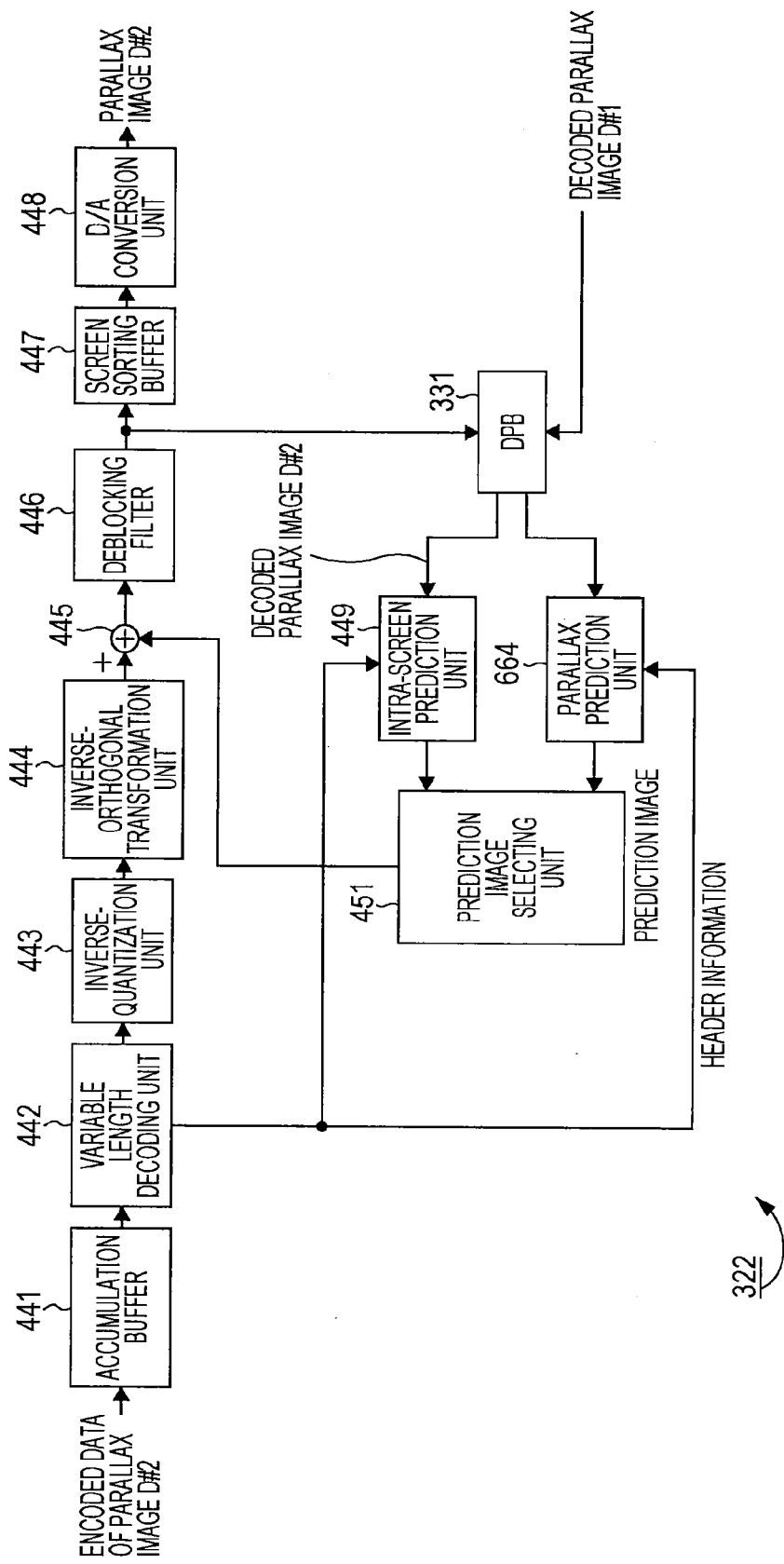
FIG. 32 is a block diagram illustrating another configuration example of a decoder 322.

FIG. 32 is a block diagram illustrating another configuration example of a decoder 322 of FIG. 21.

More specifically, FIG. 32 illustrates the configuration example of the decoder 322 when the encoder 22 is configured as illustrated in FIG. 27.

In FIG. 32, the same portions corresponding to those of FIG. 23 are denoted with the same reference numerals, and in the explanation below, explanation thereabout is omitted as necessary.

The decoder 322 of FIG. 32 is the same as the case of FIG. 23 in that the decoder 322 of FIG. 32 includes an accumulation buffer 441, a variable length decoding unit 442, an inverse-quantization unit 443, an inverse-orthogonal transformation unit 444, a calculation unit 445, a deblocking filter 446, a screen sorting buffer 447, a D/A conversion unit 448, an intra-screen prediction unit 449, a prediction image selecting unit 451.

However, the decoder 322 of FIG. 32 is different from the case of FIG. 23 in that the decoder 322 of FIG. 32 does not include the warping unit 461, the warped picture buffer 462, and the occlusion detection unit 463, and includes a parallax prediction unit 664 instead of the parallax prediction unit 464.

In the same manner as the parallax prediction unit 234 of FIG. 13, the parallax prediction unit 464 of FIG. 23 derives the prediction vector of the MVC method or the prediction vector of the proximity prediction method, and derives the vector of accuracy in unit of pixel as the prediction vector of the proximity prediction method. However, the parallax prediction unit 664 of FIG. 32 obtains the prediction vector of the MVC method or the prediction vector of the proximity prediction method on the basis of the predictor flag and derives the vector of accuracy in unit of the width of the occlusion block as the prediction vector of the proximity prediction method.

The parallax prediction unit 664 performs the same processing as the parallax prediction unit 464 of FIG. 23 except the above.

Figure 33:
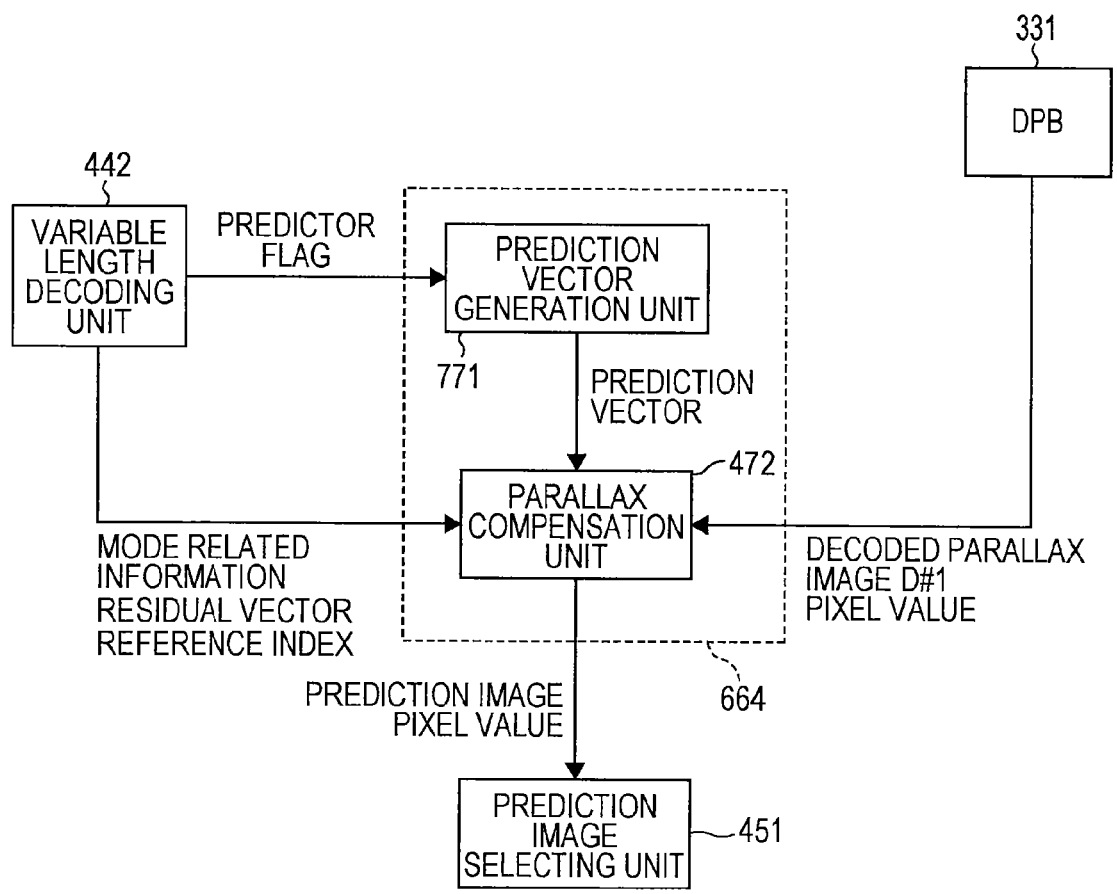
FIG. 33 is a block diagram illustrating a configuration example of a parallax prediction unit 664.

FIG. 33 is a block diagram illustrating a configuration example of a parallax prediction unit 664 of FIG. 32.

In FIG. 33, the parallax prediction unit 664 includes a prediction vector generation unit 771 and a parallax compensation unit 472.

Therefore, the parallax prediction unit 664 is the same as the parallax prediction unit 464 of FIG. 24 in that the parallax prediction unit 664 includes the parallax compensation unit 472, but is different from the parallax prediction unit 464 of FIG. 24 in that the parallax prediction unit 664 includes the prediction vector generation unit 771 instead of the prediction vector generation unit 471.

The prediction vector generation unit 771 provides the predictor flag included in the header information from the variable length decoding unit 442.

The prediction vector generation unit 771 generates the prediction vector in accordance with the MVC method or the proximity prediction method on the basis of the predictor flag, and provides the prediction vector to the parallax compensation unit 472.

When the prediction vector generation unit 771 generates the prediction vector in accordance with the proximity prediction method, it is necessary to recognize whether the viewpoint #2 of the parallax image D#2 of the decoding target of the decoder 322 is at the left side of the viewpoint #1 of the parallax image D#1 which is the reference picture, or at the right side, just like the prediction vector generation unit 543 of FIG. 28. The prediction vector generation unit 771 recognizes whether the viewpoint #2 of the parallax image D#2 of the decoding target is at the left side of the viewpoint #1 of the parallax image D#1 which is the reference picture or at the right side, on the basis of the position information included in the header information obtained by the variable length decoding unit 442 (FIG. 32).

Figure 34:
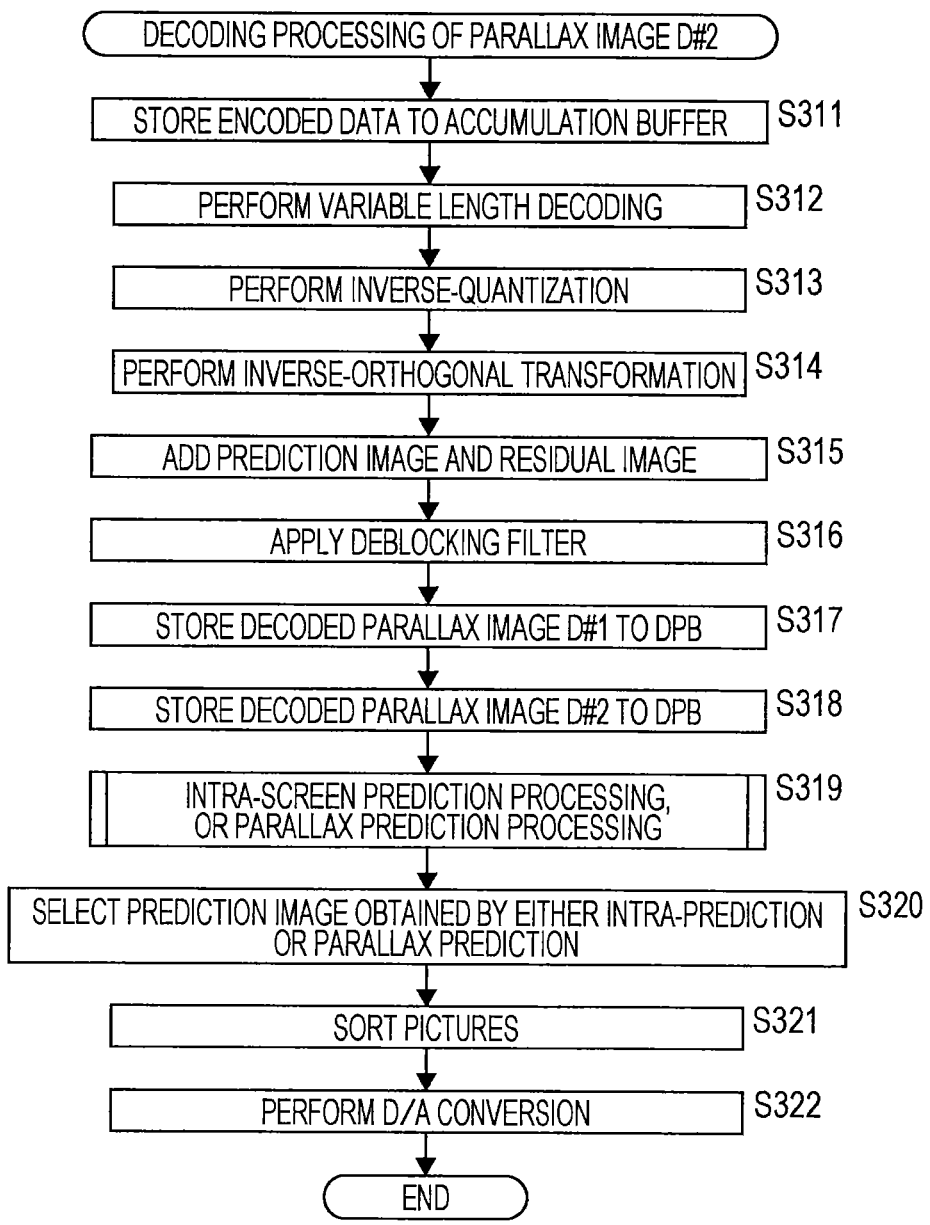
FIG. 34 is a flowchart explaining decoding processing for decoding encoded data of the parallax image D#2 of the viewpoint #2.

FIG. 34 is a flowchart explaining decoding processing for decoding encoded data of the parallax image D#2 of the viewpoint #2 performed by the decoder 322 of FIG. 32.

Insteps S311 to S318, the decoder 322 performs the same processing as that in steps S111 to S118, respectively, of FIG. 25.

Then, the decoder 322 does not perform (processing corresponding to) the processing in steps S119 to S121 of FIG. 25, and in steps S319 to S322, the decoder 322 performs the same processing as that of steps S122 to S125, respectively, of FIG. 25.

However, in step S319, the parallax prediction processing (inter-prediction processing) is performed by the parallax prediction unit 664 (FIG. 33) instead of the parallax prediction unit 464 (FIG. 24).

Figure 35:
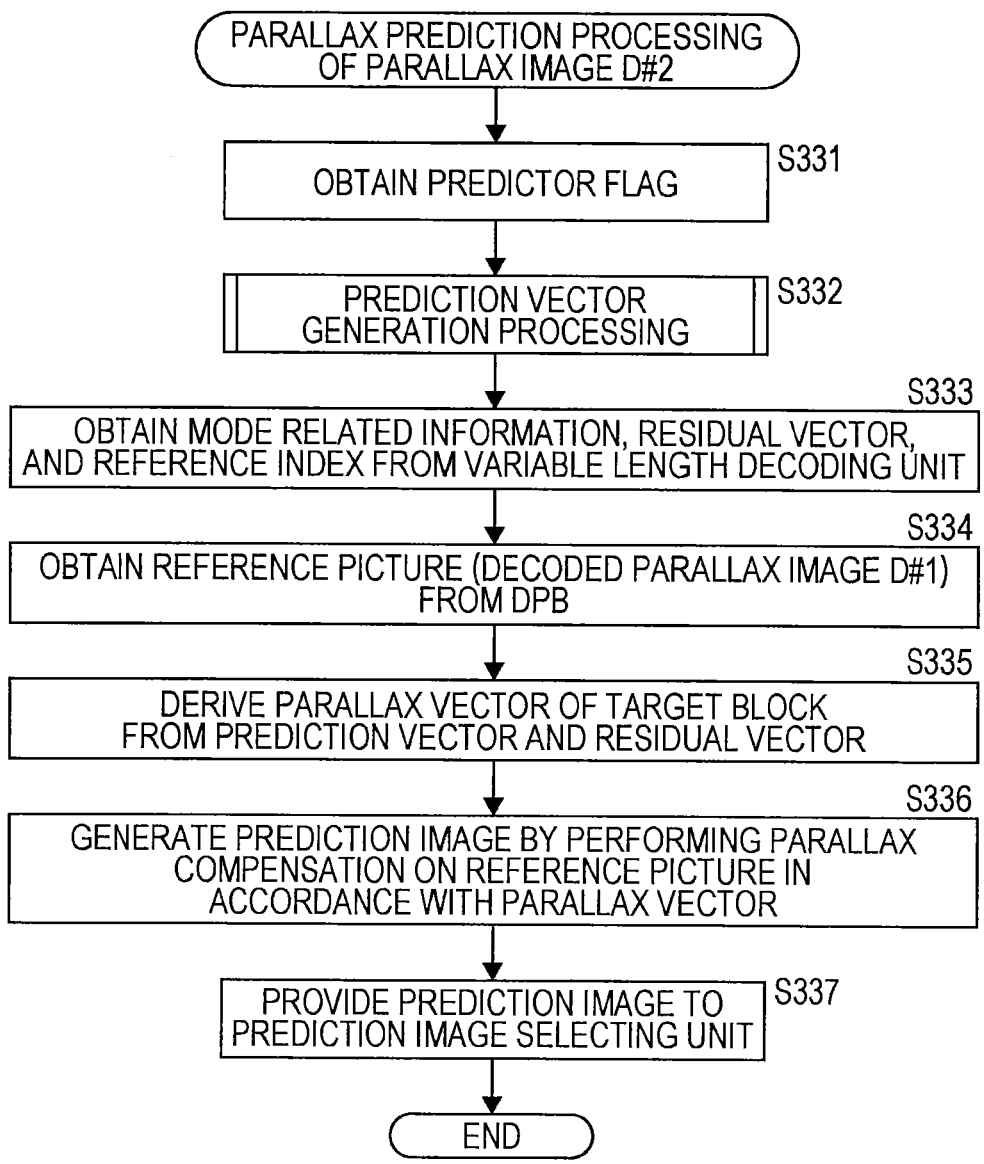
FIG. 35 is a flowchart explaining parallax prediction processing.

FIG. 35 is a flowchart explaining parallax prediction processing performed by the parallax prediction unit 664 of FIG. 33 in step S319 of FIG. 34.

In step S331, the parallax prediction unit 664 obtains the predictor flag from the variable length decoding unit 442, and provides it to the prediction vector generation unit 771, and then, the processing in step S332 is performed.

In step S332, the prediction vector generation unit 771 performs the prediction vector generation processing for generating the (subsequent) prediction vector of the target block in accordance with the MVC method or the proximity prediction method on the basis of the predictor flag in the same manner as the prediction vector generation unit 543 of FIG. 28.

Then, the prediction vector generation unit 771 provides the prediction vector of the target block obtained by the prediction vector generation processing to the parallax compensation unit 472, and then, the processing in step S333 is performed after step S332.

Hereinafter, insteps S333 to S337, the same processing as that in steps S132 to S136, respectively, of FIG. 26 is performed.

Figure 36:
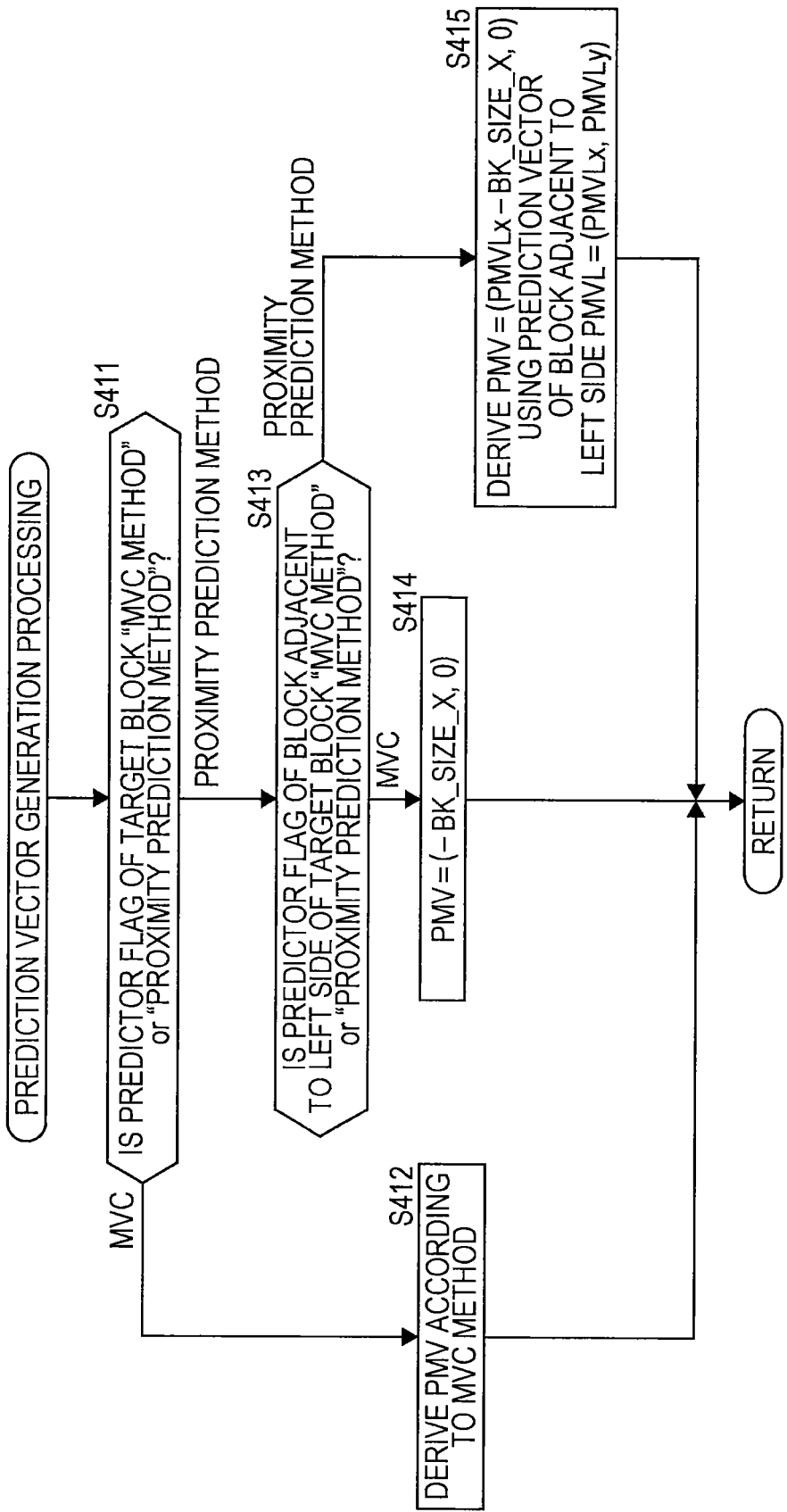
FIG. 36 is a flowchart explaining prediction vector generation processing.
Figure 37:
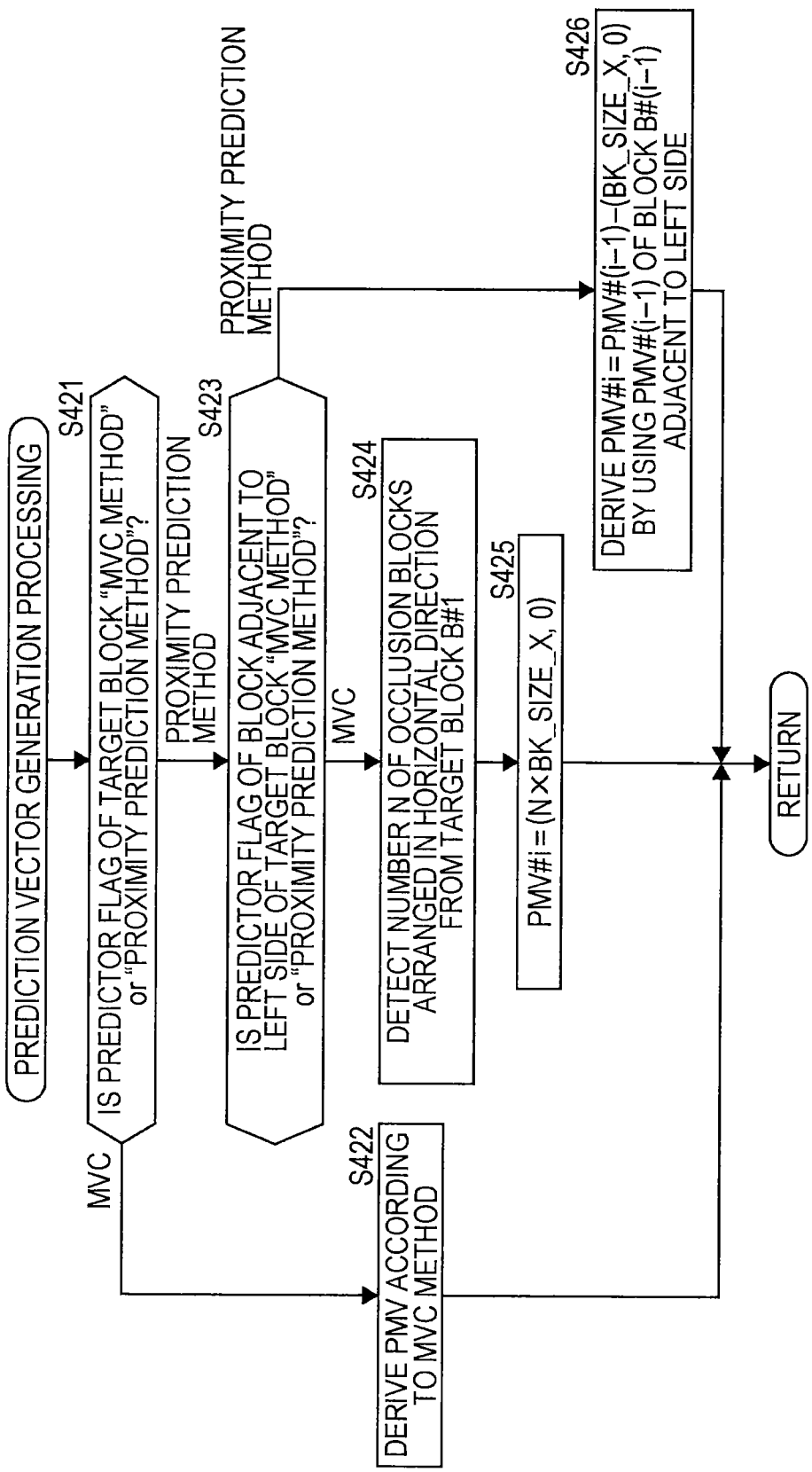
FIG. 37 is a flowchart explaining prediction vector generation processing.

FIG. 36 and FIG. 37 are flowcharts explaining the prediction vector generation processing performed by the prediction vector generation unit 771 (FIG. 33) in step S332 of FIG. 35.

In the same manner as FIGS. 19 and 30, FIG. 36 shows prediction vector generation processing in step S332 of FIG. 35 where the viewpoint #1 is at the right side, and the viewpoint #2 is at the left side, and in the parallax image D#2 of the viewpoint #2, a background portion adjacent to the left side of the foreground is the occlusion portion, and more specifically, the left side of the occlusion portion is the background and the right side thereof is the foreground (FIG. 3).

The prediction vector generation unit 771 recognizes whether the viewpoint #2 of the parallax image D#2 of the decoding target is at the left side of the viewpoint #1 of the parallax image D#1 which is the reference picture or at the right side, on the basis of the position information included in the header information obtained by the variable length decoding unit 442 (FIG. 32).

In step S411, the prediction vector generation unit 771 determines which of the value "MVC method" and the value "proximity prediction method" the prediction flag of the target block is set to.

In step S411, when the predictor flag of the target block is determined to be set to the value "MVC method", i.e., when the target block is a non-occlusion block, the processing in step S412 is subsequently performed, and the prediction vector generation unit 771 generates the prediction vector PMV of the target block in accordance with the MVC method, and the processing returns.

In step S411, when the predictor flag of the target block is determined to be set to the value "proximity prediction method", i.e., the target block is an occlusion block, the processing in step S413 is subsequently performed, and the prediction vector generation unit 771 determines which of the value "MVC method" and the value "proximity prediction method" the predictor flag of the block adjacent to the left side of the target block (decoded block) which is the occlusion block is set to.

In step S413, when the predictor flag of the block adjacent to the left side of the target block is determined to be set to the value "MVC method", i.e., the block adjacent to the left side of the target block is a non-occlusion block, and therefore, when a column (slice) of the target block in the target picture is scanned in the x direction and it is found that the occlusion portion starts from the target block, then the processing in step S414 is subsequently performed. In step S414, like step S266 of FIG. 30, the prediction vector generation unit 771 uses the width of the occlusion block (the number of pixels in the x direction of the occlusion block) BK_SIZE_X to derive (generate) the prediction vector of accuracy in unit of the width of the occlusion block serving as the prediction vector PMV of the target block in accordance with the expression PMV=(−BK_SIZE_X, 0), and the processing returns.

In step S413, when the predictor flag of the block adjacent to the left side of the target block is determined to be set to the value "proximity prediction method", and more specifically, when the block adjacent to the left side of the target block is determined to be an occlusion block, the processing in step S415 is subsequently performed. In step S415, like step S268 of FIG. 30, the prediction vector generation unit 771 uses the width of the occlusion block BK_SIZE_X and the x component of the already-derived prediction vector PMVL=(PMVLx, PMVLy) of the block adjacent to the left side of the target block (occlusion block) to derive the prediction vector of accuracy in unit of the width of the occlusion block serving as the prediction vector PMV of the target block in accordance with the expression PMV=(PMVLx−BK_SIZE_X, 0), and the processing returns.

In the same manner as FIGS. 20 and 31, FIG. 37 shows prediction vector generation processing in step S332 of FIG. 35 where the viewpoint #1 is at the left side, and the viewpoint #2 is at the right side, and in the parallax image D#2 of the viewpoint #2, a background portion adjacent to the right side of the foreground is the occlusion portion, and more specifically, the right side of the occlusion portion is the background and the left side thereof is the foreground.

In FIG. 37, the same processing is performed in steps S421 to S423 as that performed in steps S411 to S413, respectively, of FIG. 36.

Then, in step S423, when the predictor flag of the block adjacent to the left side of the target block is determined to be set to the value "MVC method", i.e., the block adjacent to the left side of the target block is a non-occlusion block, and therefore, when a column (slice) of the target block in the target picture is scanned in the x direction and it is found that the occlusion portion starts from the target block, then the processing in step S424 is subsequently performed. Like steps S276 and S277 of FIG. 31, in steps S424 and S425, the prediction vector generation unit 771 generates the prediction vector of the proximity prediction method.

More specifically, in step S424, the prediction vector generation unit 771 recognizes the number N of occlusion blocks arranged continuously in the x direction with the target block being the front on the basis of the predictor flags (blocks of which predictor flag is set to value "proximity prediction method"), and then, the processing in step S425 is performed.

In this case, when the i-th block from the first one of the occlusion blocks arranged continuously in the x direction with the target block being at the front is denoted as B#i, the first block (target block) of the occlusion blocks arranged continuously in the x direction with the target block being at the front is denoted as B#1, and the last block is denoted as B#N.

In step S425, the prediction vector generation unit 771 uses a summation N×BK_SIZE_X of each of the width BK_SIZE_X of N blocks B#1 to B#N which are occlusion blocks arranged continuously in the x direction with the target block being at the front to derive the prediction vector of accuracy in unit of the width of the occlusion block serving as the prediction vector PMV#1 of the target block B#1 in accordance with the expression PMV#1=(N×BK_SIZE_X, 0), and the processing returns.

In step S423, when the predictor flag of the block adjacent to the left side of the target block is determined to be set to the value "proximity prediction method", and more specifically, when the block adjacent to the left side of the target block is determined to be an occlusion block, the processing in step S426 is subsequently performed. In step S426, the prediction vector generation unit 771 uses the width of the occlusion block BK_SIZE_X and the already-derived prediction vector PMV# (i−1) of the block adjacent to the left side of the target block (occlusion block) to derive the prediction vector of accuracy in unit of the width of the occlusion block serving as the prediction vector PMV#i of the target block in accordance with the expression PMV#i=PMV#(i−1)−(BK_SIZE_X, 0), and the processing returns.

As described above, in the decoder 322 of FIG. 32, the parallax prediction unit 664 (FIG. 33) can generate the prediction vector with a high degree of prediction accuracy on the basis of the predictor flag in an easy manner (without using the occlusion detection processing).

Like the encoder 22 of FIG. 27, the decoder 322 of FIG. 32 generates the warped parallax image D'#1, and derives the occlusion information from the warped parallax image D'#1, and can generate the prediction vector on the basis of the occlusion information in the same manner as the prediction vector generation unit 543 of FIG. 28 (without using the predictor flag).

Figure 39:
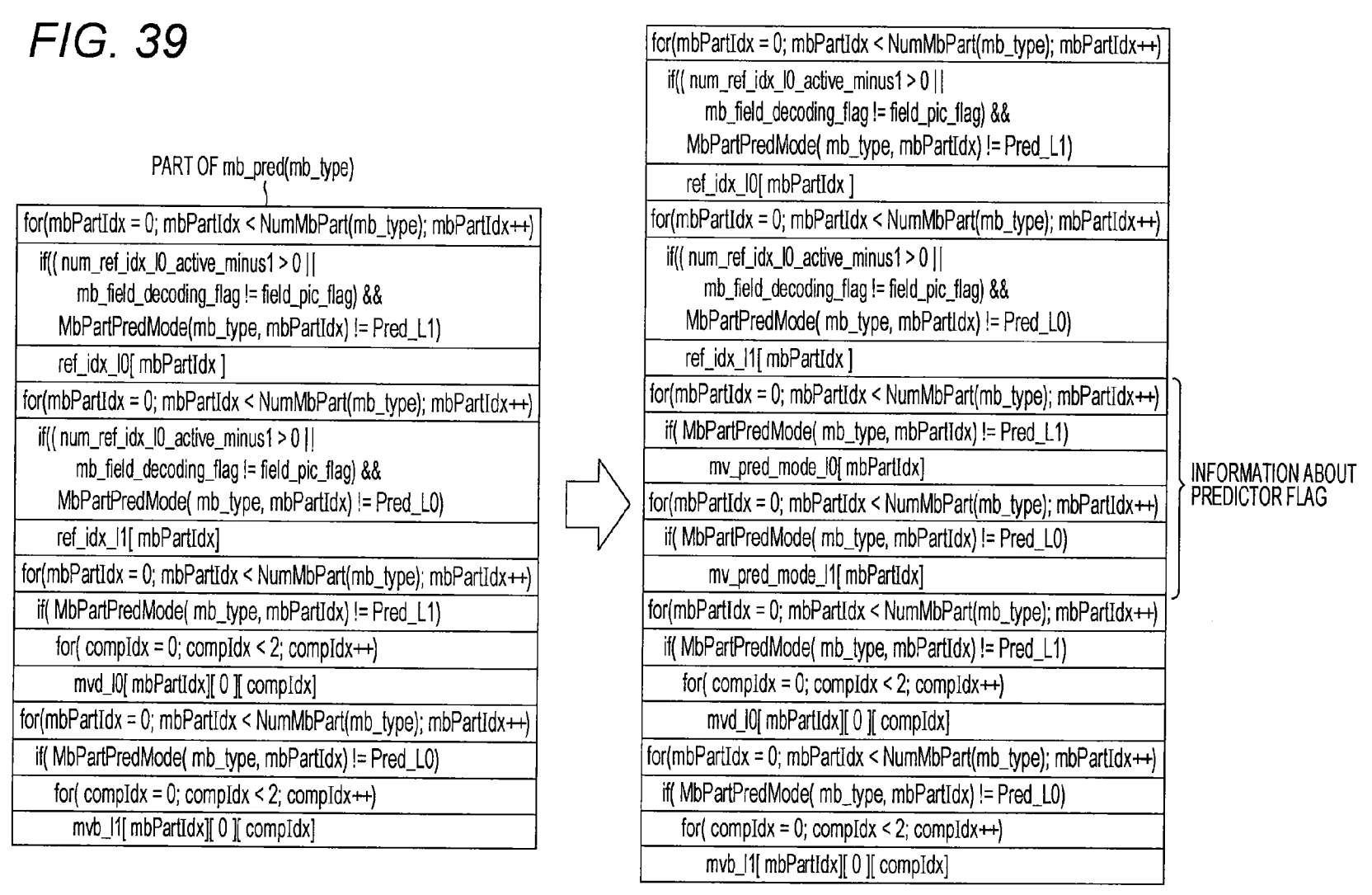
Figure 40:
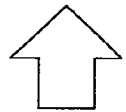
FIG. 40 is a figure illustrating an example of a predictor flag that can be included in header information.

FIGS. 38 to 40 are figures illustrating examples of predictor flags that can be included in header information.

As explained in FIG. 28, the mode selecting unit 545 puts an estimator flag to the header information, and provides it to the variable length encoding unit 216.

The variable length encoding unit 216 puts the header information into the header of the encoded data.

FIGS. 38 to 40 illustrate a predictor flag which is put into the header in a case where the encoded data are encoded data of the MVC (AVC) method.

In this case, the predictor flag may be set in such a manner that the macro block is the minimum unit.

The predictor flag may also be set in such a manner that a macro block-type (type of 8×8 pixels or more) obtained by dividing the target block into a size of a partition having 8×8 pixels or more, i.e., a macro block-type (8×8-type) obtained by dividing the target block into partitions having 8×8 pixels, a macro block-type (16×8-type) obtained by dividing the target block into partitions having 16×8 pixels, and a macro block-type (8×16-type) obtained by dividing the target block into partitions having 8×16 pixels, is adopted as the minimum unit.

Further, the predictor flag may also be set in such a manner that a partition (sub-partition) of the macro block-type (type of less than 8×8 pixels) obtained by dividing the target block into a partition of a size smaller than the partition having 8×8 pixels, i.e., sub-partitions having 8×4 pixels, 4×8 pixels, or 4×4 pixels, is adopted as the minimum unit.

FIG. 38 is a figure illustrating the predictor flag which is set in such a manner that the macro block is adopted as the minimum unit.

More specifically, FIG. 38 illustrates syntax of mb_pred (mb_type) of the MVC method.

When the predictor flag is set in such a manner that the macro block is adopted as the minimum unit, the predictor flag is included in mb_pred (mb_type).

In FIG. 38, mv_pred_mode_l0 and mv_pred_mode_l1 represent the predictor flag.

In FIG. 38, mv_pred_mode_l0 is the predictor flag used when L0 prediction is performed, and mv_pred_mode_l1 is the predictor flag used when L1 prediction is performed.

FIG. 39 is a figure illustrating the predictor flag which is set in such a manner that a partition of a type having 8×8 pixels or more is adopted as the minimum unit.

More specifically, FIG. 39 illustrates syntax of a portion of mb_pred (mb_type) of the MVC method.

When the predictor flag is set in such a manner that a partition of a type having 8×8 pixels or more is adopted as the minimum unit, the predictor flag is included in mb_pred (mb_type).

In FIG. 39, mv_pred_mode_l0[mbPartIdx] and mv_pred_mode_l1 [mbPartIdx] represent the predictor flag.

In FIG. 39, mv_pred_mode_l0[mbPartIdx] is the predictor flag used when L0 prediction is performed, and mv_pred_mode_l1[mbPartIdx] is the predictor flag used when L1 prediction is performed.

A parameter mbPartIdx of the predictor flag mv_pred_mode_l0[mbPartIdx] and mv_pred_mode_l1[mbPartIdx] is an index for distinguishing each partition of a type having 8×8 pixels or more.

FIG. 40 is a figure illustrating the predictor flag which is set in such a manner that a partition of a type having less than 8×8 pixels is adopted as the minimum unit.

More specifically, FIG. 40 illustrates syntax of a portion of sub_mb_pred (mb_type) of the MVC method.

When the predictor flag is set in such a manner that a partition of a type having less than 8×8 pixels is adopted as the minimum unit, the predictor flag is included in mb_pred (mb_type) and sub_mb_pred (mb_type).

When the predictor flag is set in such a manner that a partition of a type having less than 8×8 pixels is adopted as the minimum unit, the predictor flag included in mb_pred (mb_type) is what is shown in FIG. 39, and FIG. 40 illustrates the predictor flag included in sub_mb_pred (mb_type).

In FIG. 40, mv_pred_mode_l0[mbPartIdx][subMbPartIdx] and mv_pred_mode_l1[mbPartIdx] [subMbPartIdx] represent the predictor flag.

In FIG. 40, mv_pred_mode_l0 [mbPartIdx] [subMbPartIdx] is the predictor flag used when L0 prediction is performed, and mv_pred_mode_l1 [mbPartIdx] [subMbPartIdx] is the predictor flag used when L1 prediction is performed.

A parameter subMbPartIdx of the predictor flagmv_pred_mode_l0[mbPartIdx][subMbPartIdx] and mv_pred_mode_l1[mbPartIdx][subMbPartIdx] is an index for distinguishing each partition of a type having less than 8×8 pixels.

In this case, when the predictor flag is set in such a manner that the macro block is adopted as the minimum unit, the increase of the amount of data of the header of the encoded data (the amount of data of overhead) can be reduced to the minimum level.

On the other hand, when the predictor flag is set in such a manner that a partition (sub-partition) of a type having less than 8×8 pixels is adopted as the minimum unit, the prediction vector can be controlled for each partition of a small size, and therefore, the prediction accuracy can be improved.

When the predictor flag is set in such a manner that a partition of a type having 8×8 pixels or more is adopted as the minimum unit, the amount of data of the header of the encoded data is suppressed, and the prediction accuracy can be achieved at a level in between the case where the macro block is adopted as the minimum unit and the case where a partition of a type having less than 8×8 pixels is adopted as the minimum unit.

In the explanation above, the MVC method (median prediction method) is employed as a vector prediction method different from the proximity prediction method. Alternatively, other vector prediction methods may be employed as a vector prediction method different from the proximity prediction method.

In the explanation about the present embodiment, the present technique is applied to a case of deriving the prediction vector of the calculation parallax vector representing deviation of the target block of the parallax image D#2 with respect to the picture of the parallax image D#1 of the same time as the target picture of the parallax image D#2

(another picture different from the target picture). However, the present technique can also be applied to a case of deriving a prediction vector of a motion vector representing deviation of the target block of the parallax image D#2 with respect to the picture of the parallax image D#1 of a time different from the target picture of the parallax image D#2 (another picture different from the target picture).

More specifically, the occlusion portion occurs not only in a case where the parallax prediction of the target block of the parallax image D#2 is performed while the picture of the parallax image D#1 of the same time as the target picture of the parallax image D#2 is adopted as the reference picture (a case where there is parallax between the target picture and the reference picture) but also in a case where the time prediction of the target block of the parallax image D#2 is performed while the picture of the parallax image D#2 of a time different from the target picture of the parallax image D#2 is adopted as the reference picture (a case where there is motion between the target picture and the reference picture), and therefore, the present technique can also be applied to a case of deriving the prediction vector of the motion vector detected with time prediction.

[Explanation about Computer to which the Present Technique is Applied]

Subsequently, the above series of processings may be performed by either hardware or software. When the series of processings are performed by software, a program constituting the software is installed in a general-purpose computer and the like.

Figure 42:
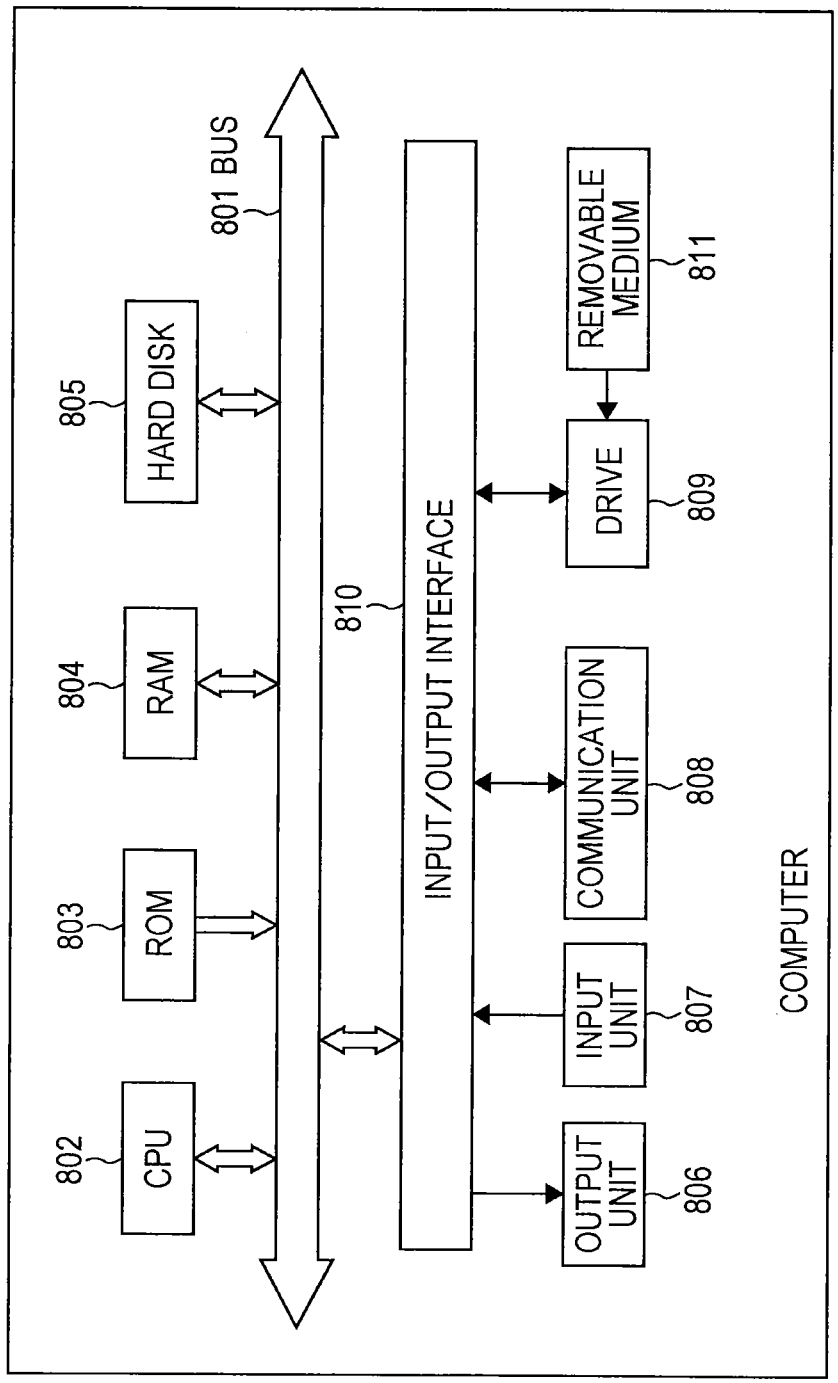
FIG. 42 is a block diagram illustrating an example of configuration of an embodiment of a computer to which the present technique is applied.

FIG. 42 is an exemplary configuration of an embodiment of a computer to which the program for executing the above series of processings is installed The program may be previously stored in a hard disk 805 and a ROM 803 serving as recording media incorporated into the computer.

Alternatively, the program may be stored (recorded) to a removable recording medium 811. This removable recording medium 811 may be provided as so-called package software. In this case, examples of the removable recording medium 811 include, for example, a flexible disk, a CD-ROM (Compact Disc Read Only Memory), a MO (Magneto Optical) disk, a DVD (Digital Versatile Disc), a magnetic disk, a semiconductor memory, and the like.

The program can be installed to the computer from the removable recording medium 811 as described above. Alternatively, the program may be downloaded to the computer via a communication network or a broadcast network, and the program can be installed to the hard disk 805 provided therein. More specifically, the program can be, for example, transferred from a download site to the computer wirelessly via a man-made satellite for digital satellite broadcasting, or may be transferred to the computer via the wire, i.e., network such as a LAN (Local Area Network) and the Internet.

The computer has a CPU (Central Processing Unit) 802. The CPU 802 is connected to an input/output interface 810 via a bus 801.

When a user operates an input unit 807 to input a command to the CPU 802 via the input/output interface 810, the CPU 802 executes the program stored in the ROM (Read Only Memory) 803 in response to the command. Alternatively, the CPU 802 loads the program stored in the hard disk 805 to a RAM (Random Access Memory) 804, and executes the program.

Thus, the CPU 802 performs the processings according to the above flowcharts or the processings performed with the configurations in the block diagrams as described above. Then, as necessary, the CPU 802 outputs the processing result thereof from an output unit 806 via the input/output interface 810, transmits the processing result thereof from the communication unit 808, or records the processing result thereof to the hard disk 805, for example.

The input unit 807 is constituted by a keyboard, a mouse, a microphone, and the like. The output unit 806 is constituted by an LCD (Liquid Crystal Display), a speaker, and the like.

In this case, in this specification, the processings performed according to the program by the computer may not be necessarily performed in time-series according to the order described in the flowcharts. In other words, the processings performed according to the program by the computer include processings executed independently or in parallel (for example, processing performed with objects or parallel processing).

The program may be processed by one computer (processor), or may be processed by a plurality of computers as distributed processing. Further, the program may be transferred to a computer located far away and may be executed.

[Example of Configuration of Television Device]

Figure 43:
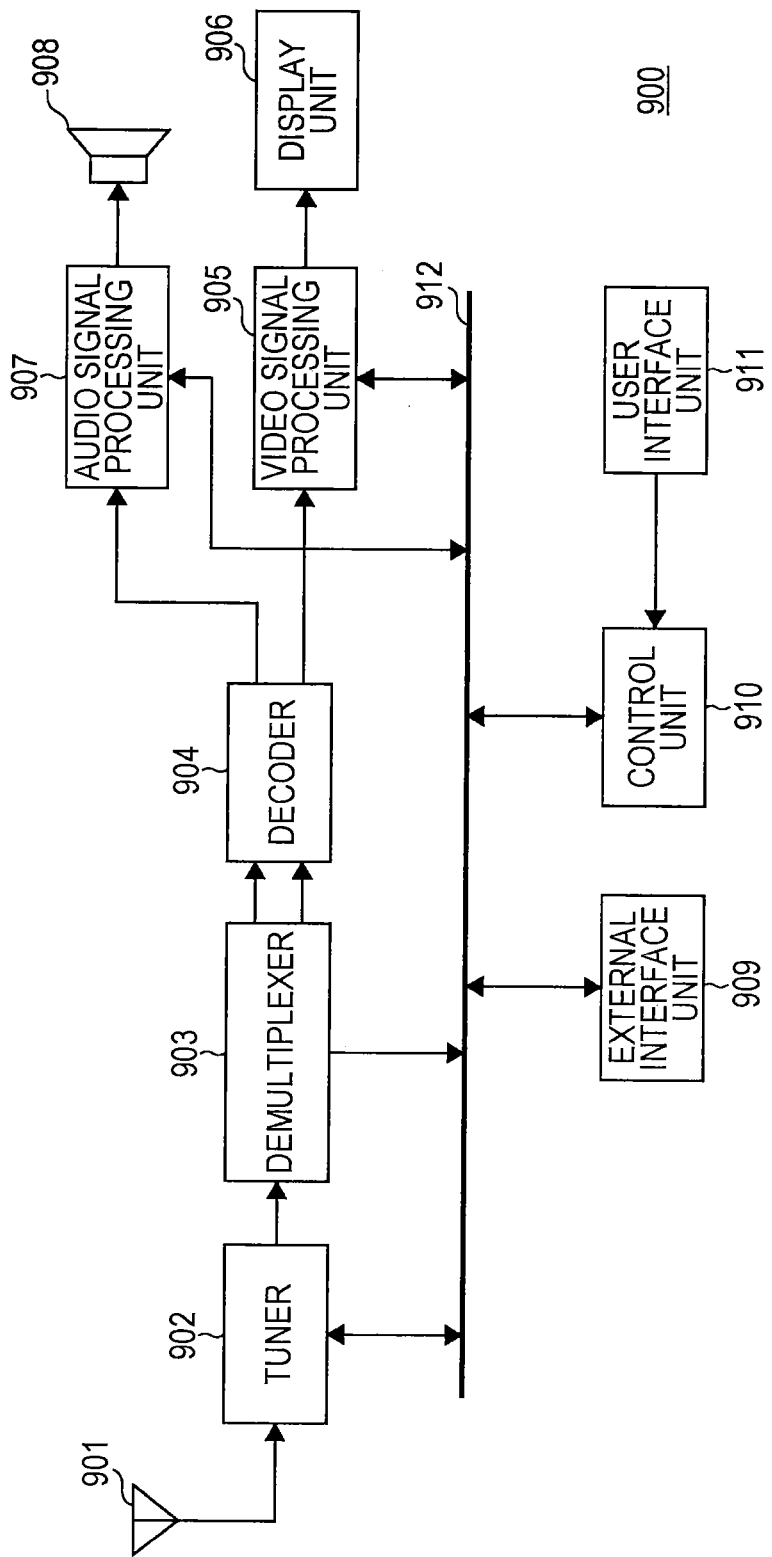
FIG. 43 is a figure illustrating an example of schematic configuration of a television device to which the present technique is applied.

FIG. 43 illustrates an example of schematic configuration of television device to which the present technique is applied. The television device 900 includes an antenna 901, a tuner 902, a demultiplexer 903, a decoder 904, a video signal processing unit 905, a display unit 906, an audio signal processing unit 907, a speaker 908, an external interface unit 909. Further, the television device 900 includes a control unit 910 and a user interface unit 911.

The tuner 902 tunes in to and decodes a desired channel from among broadcast signals received by the antenna 901, and outputs the encoded bit stream thus obtained to the demultiplexer 903

The demultiplexer 903 extracts packets of video and audio of a program, which is a viewing target, from the encoded bit stream, and outputs the data of the extracted packets to the decoder 904. The demultiplexer 903 also provides packets of data such as EPG (Electronic Program Guide) to the control unit 910. When scrambled, the demultiplexer and the like perform descrambling.

The decoder 904 performs decoding processing of packets, and outputs the video data generated by the decoding processing to the video signal processing unit 905, and the audio data to the audio signal processing unit 907.

The video signal processing unit 905 performs noise reduction and video processing according to user settings on the video data. The video signal processing unit 905 generates, e.g., video data of a program displayed on the display unit 906 and image data made by processing based on an application provided via a network. The video signal processing unit 905 generates video data for displaying a menu screen and the like for allowing selection of items, and overlays the video data on the video data of the program. The video signal processing unit 905 generates a driving signal on the basis of the video data thus generated, and drives the display unit 906.

The display unit 906 displays, e.g., video of program, by driving a display device (for example, liquid crystal display device and the like) on the basis of the driving signal provided by the video signal processing unit 905.

The audio signal processing unit 907 performs predetermined processing such as noise reduction on the audio data, and D/A conversion processing and amplification processing of the audio data having been processed, and provides the data to the speaker 908, thus outputting audio.

The external interface unit 909 is an interface for connecting an external device and a network, and exchange data such as video data and audio data.

The control unit 910 is connected to the user interface unit 911. The user interface unit 911 is constituted by, e.g., operation switches and a remote control signal reception unit, and provides an operation signal according to user operation to the control unit 910.

The control unit 910 is constituted by a CPU (Central Processing Unit), a memory, and the like. The memory stores, e.g., programs executed by the CPU, various kinds of data required when processing is performed with the CPU, EPG data, and data obtained via a network. The programs stored in the memory is read and executed by the CPU with predetermined timing such as during activation of the television device 900. The CPU executes the program, thus controlling each unit so as to cause the television device 900 to operate in accordance with user operation.

The television device 900 is provided with a bus 912 for connecting the tuner 902, the demultiplexer 903, the decoder 904, the video signal processing unit 905, the audio signal processing unit 907, the external interface unit 909, and the control unit 910.

In the television device configured as described above, the decoder 904 is provided with a function of an image processing apparatus (image processing method) of the present application. Therefore, a vector with a high degree of prediction accuracy can be derived as a prediction vector.

[Example of Configuration of Portable Telephone]

Figure 44:
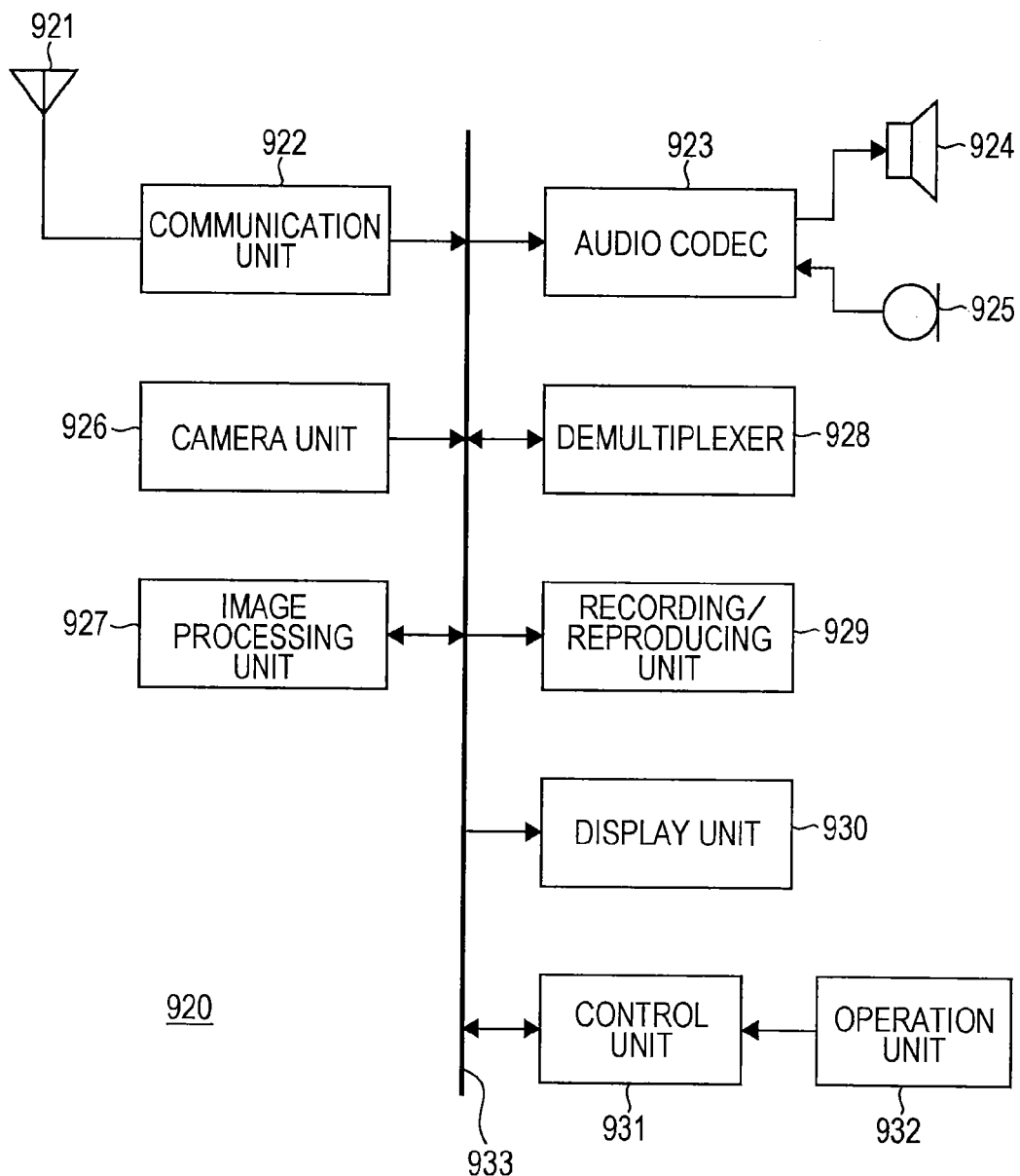
FIG. 44 is a figure illustrating an example of schematic configuration of a portable telephone to which the present technique is applied.

FIG. 44 illustrates an example of schematic configuration of portable telephone to which the present technique is applied. The portable telephone 920 includes a communication unit 922, an audio codec 923, a camera unit 926, an image processing unit 927, a demultiplexer 928, a recording/reproducing unit 929, a display unit 930, and a control unit 931. They are connected with each other via a bus 933.

The communication unit 922 is connected to the antenna 921, and the audio codec 923 is connected to the speaker 924 and the microphone 925. Further, the control unit 931 is connected to the operation unit 932.

The portable telephone 920 performs various kinds of operation such as transmission and reception of audio signal, transmission and reception of e-mail and image data, image capturing, or recording of data, in various kinds of modes such as audio phone call mode and data communication mode.

In the audio phone call mode, an analog audio signal generated by the microphone 925 is, e.g., converted into audio data and compressed by the audio codec 923, and is provided to the communication unit 922. The communication unit 922 performs, e.g., modulation processing and frequency conversion processing on the audio data, and generates a transmission signal. The communication unit 922 provides the transmission signal to the antenna 921, and transmits the transmission signal to a base station, not shown. The communication unit 922 performs, e.g., amplification, frequency conversion processing and amplification processing on the reception signal received by the antenna 921, and provides the obtained audio data to the audio codec 923. The audio codec 923 performs, e.g., data extension of the audio data and conversion into analog audio signal, and outputs the data to the speaker 924.

When mail is transmitted in the data communication mode, the control unit 931 receives character data which are input by operation with the operation unit 932, and displays the input characters on the display unit 930. The control unit 931 also generates mail data on the basis of, e.g., user instruction with the operation unit 932, and provides the mail data to the communication unit 922. The communication unit 922 performs, e.g., modulation processing and frequency conversion processing on mail data, and transmits the obtained transmission signal via the antenna 921. The communication unit 922 performs, e.g., amplification, frequency conversion processing and amplification processing on the reception signal received by the antenna 921, and restores the mail data. The mail data are provided to the display unit 930, and the contents of the mail are displayed.

The portable telephone 920 can also store the received mail data to a storage medium using the recording/reproducing unit 929. The storage medium is any given rewritable storage medium. For example, the storage medium may be a semiconductor memory such as RAM and internal flash memory, a hard disk, or a removable medium such as a magnetic disk, a magneto optical disk, an optical disk, a USB memory, or a memory card.

When image data are transmitted in the data communication mode, the image data generated by the camera unit 926 are provided to the image processing unit 927. The image processing unit 927 performs encoding processing of the image data and generates encoded data.

The demultiplexer 928 multiplexes the encoded data generated by the image processing unit 927 and the audio data provided from the audio codec 923 in accordance with predetermined method, and provides the data to the communication unit 922. The communication unit 922 performs, e.g., modulation processing and frequency conversion processing on the multiplexed data, and transmits the obtained transmission signal via the antenna 921. The communication unit 922 performs, e.g., amplification, frequency conversion processing and demodulation processing on the reception signal received by the antenna 921, and restores the multiplexed data. The multiplexed data are provided to the demultiplexer 928. The demultiplexer 928 separates the multiplexed data, and provides the encoded data to the image processing unit 927, and the audio data to the audio codec 923. The image processing unit 927 performs decoding processing of the encoded data and generates image data. The image data are provided to the display unit 930, and the received image is displayed. The audio codec 923 converts the audio data into analog audio signal, and provides the analog audio signal to the speaker 924 so as to output the received audio.

In the portable telephone configured as described above, the image processing unit 927 is provided with a function of an image processing apparatus (image processing method) of the present application. Therefore, a vector with a high degree of prediction accuracy can be derived as a prediction vector.

[Example of Configuration of Recording/Reproducing Device]

Figure 45:
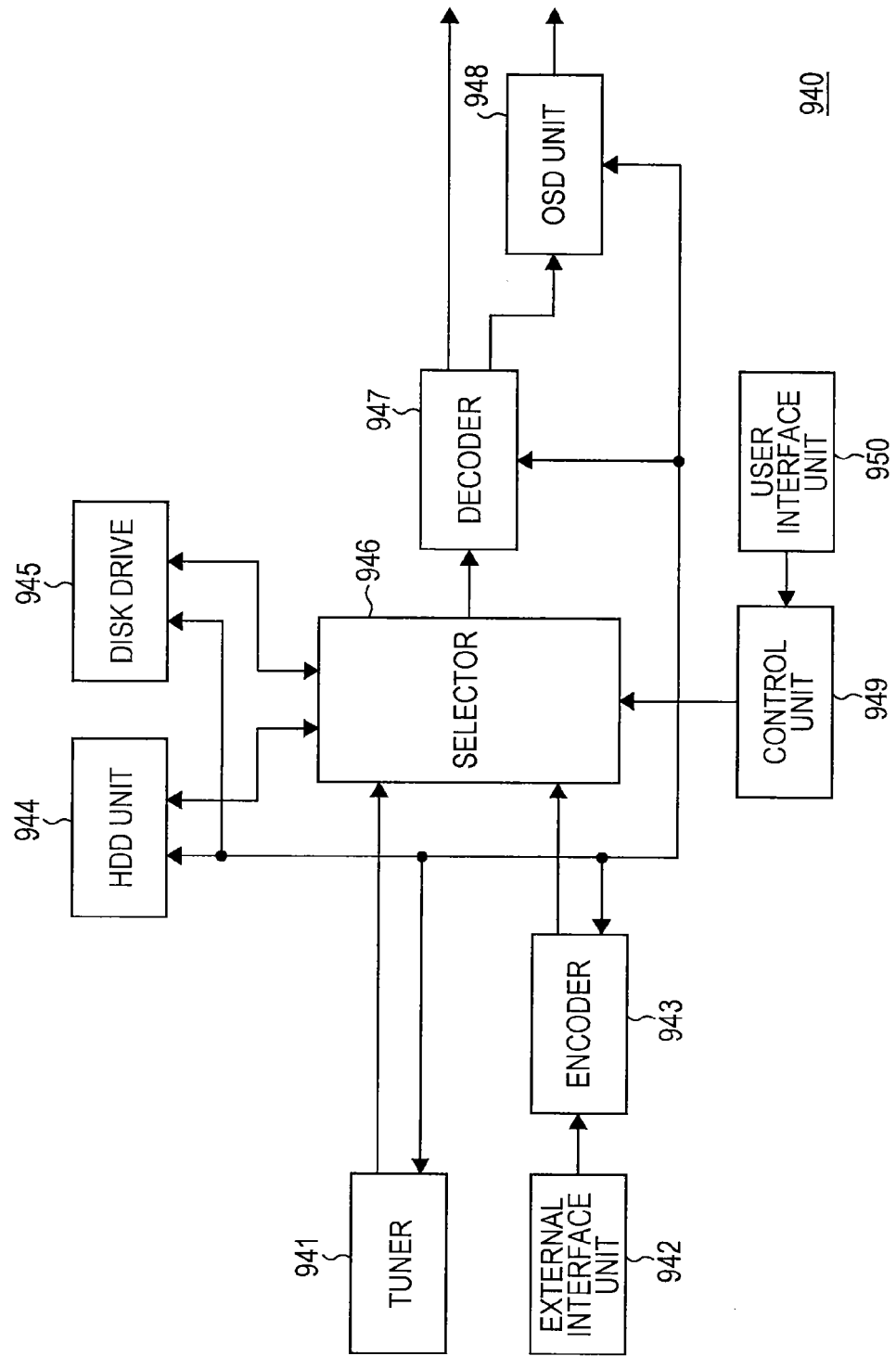
FIG. 45 is a figure illustrating an example of schematic configuration of a recording/reproducing device to which the present technique is applied.

FIG. 45 illustrates an example of schematic configuration of recording/reproducing device to which the present technique is applied. For example, a recording/reproducing device 940 records audio data and video data of received broadcasting program to a recording medium, and provides a user with the recorded data with timing according to user's instruction. For example, the recording/reproducing device 940 can obtain the audio data and the video data from another device, and can record them to the recording medium. Further, the recording/reproducing device 940 decodes and outputs the audio data and the video data recorded in the recording medium, thus allowing image display and audio output with the monitor device and the like.

The recording/reproducing device 940 includes a tuner 941, an external interface unit 942, an encoder 943, an HDD (Hard Disk Drive) unit 944, a disk drive 945, a selector 946, a decoder 947, an OSD (On-Screen Display) unit 948, a control unit 949, and a user interface unit 950.

The tuner 941 tunes in to a desired channel from broadcasting signals received by an antenna, not shown. The tuner 941 outputs, to the selector 946, an encoded bit stream obtained by demodulating the reception signal of the desired channel.

The external interface unit 942 may be constituted by, for example, any one of an IEEE1394 interface, a network interface unit, a USB interface, a flash memory interface, and the like. The external interface unit 942 is an interface for connecting to an external device, a network, a memory card, and the like, and receives data such as the video data, the audio data, and the like thus recorded.

The encoder 943 performs encoding according to a predetermined method when the video data and the audio data provided from the external interface unit 942 are not encoded, and outputs the encoded bit stream to the selector 946.

The HDD unit 944 records the content data such as video and audio, other data of various kinds of programs, and the like to an internal hard disk, and reads them from the hard disk during play back and the like.

The disk drive 945 records and reproduces the signal to/from an optical disk loaded. For example, the optical disk is a DVD disk (DVD-Video, DVD-RAM, DVD-R, DVD-RW, DVD+R, DVD+RW and the like), a Blu-ray disk, and the like.

During recording of video and audio, the selector 946 selects an encoded bit stream from any one of the tuner 941 and the encoder 943, and provides it to any one of the HDD unit 944 and the disk drive 945. During reproduction of video and audio, the selector 946 provides the decoder 947 with the encoded bit stream which is output from the HDD unit 944 or the disk drive 945.

The decoder 947 performs decoding processing of the encoded bit stream. The decoder 947 performs decoding processing, thereby providing the generated video data to the OSD unit 948. The decoder 947 performs decoding processing, thereby outputting the generated audio data.

The OSD unit 948 generates video data for displaying menu screen and the like such as item selection, and overlays and outputs them on the video data which are output from the decoder 947.

The control unit 949 is connected to the user interface unit 950. The user interface unit 950 is constituted by, e.g., operation switches and a remote control signal reception unit, and provides an operation signal according to user operation to the control unit 949.

The control unit 949 is constituted by a CPU, a memory, and the like. The memory stores, e.g., programs executed by the CPU, various kinds of data required when processing is performed with the CPU. The programs stored in the memory are read and executed by the CPU with predetermined timing such as during activation of the recording/reproducing device 940. The CPU executes the program, thus controlling each unit so as to cause the recording/reproducing device 940 to operate in accordance with user operation.

In the recording/reproducing device configured as described above, the decoder 947 is provided with a function of an image processing apparatus (image processing method) of the present application. Therefore, a vector with a high degree of prediction accuracy can be derived as a prediction vector.

[Example of Configuration of Image-Capturing Device]

Figure 46:
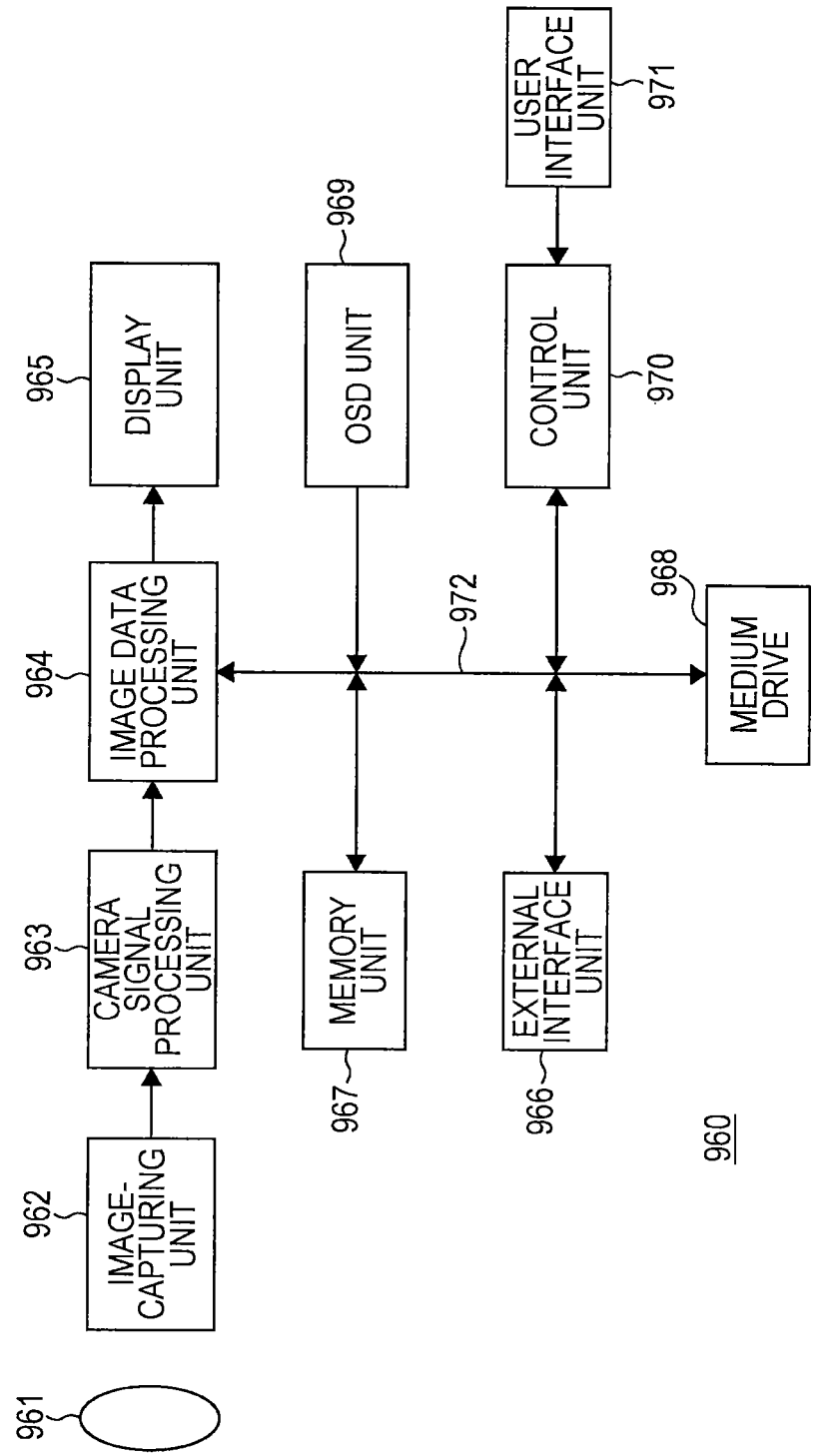
FIG. 46 is a figure illustrating an example of schematic configuration of an image-capturing device to which the present technique is applied.

FIG. 46 illustrates an example of schematic configuration of image-capturing device to which the present technique is applied. An image-capturing device 960 captures an image of a subject, displays the image of the subject on the display unit, and records the image data to a recording medium.

The image-capturing device 960 includes an optical block 961, an image-capturing unit 962, a camera signal processing unit 963, an image data processing unit 964, a display unit 965, an external interface unit 966, a memory unit 967, a medium drive 968, an OSD unit 969, and a control unit 970. The control unit 970 is connected to a user interface unit 971. Further, the image data processing unit 964, the external interface unit 966, the memory unit 967, the medium drive 968, the OSD unit 969, the control unit 970, and the like are connected via a bus 972.

The optical block 961 includes, e.g., a focus lens and a diaphragm mechanism. The optical block 961 causes an optical image of a subject to be formed on an image-capturing surface of the image-capturing unit 962. The image-capturing unit 962 includes a CCD or a CMOS image sensor, and generates an electric signal according to an optical image by photoelectric conversion, and provides the electric signal to the camera signal processing unit 963.

The signal processing unit 963 performs various kinds of camera signal processing such as knee correction, gamma correction, and color correction on the electric signal provided by the image-capturing unit 962. The camera signal processing unit 963 provides the image data processing unit 964 with image data having been subjected to the camera signal processing.

The image data processing unit 964 performs encoding processing on the image data provided from the camera signal processing unit 963. The image data processing unit 964 provides the external interface unit 966 and the medium drive 968 with the encoded data generated by performing the encoding processing. The image data processing unit 964 performs decoding processing on the encoded data provided by the external interface unit 966 and the medium drive 968. The image data processing unit 964 provides the display unit 965 with the image data generated by performing the decoding processing. The image data processing unit 964 performs processing for providing the display unit 965 with the image data provided from the camera signal processing unit 963, and overlays the display data obtained from the OSD unit 969 on the image data and provides the data to the display unit 965.

The OSD unit 969 generates display data such as menu screen and icons including symbols, characters, or figures, and outputs the display data to the image data processing unit 964.

The external interface unit 966 is constituted by, for example, a USB input/output terminal, and when image is printed, it is connected to a printer. The external interface unit 966 is also connected to a drive as necessary, and removable medium such as a magnetic disk, an optical disk, or the like is loaded as necessary, and a computer program read therefrom is installed as necessary. Further, the external interface unit 966 includes a network interface connected to a predetermined network such as a LAN or the Internet. For example, the control unit 970 reads the encoded data from the memory unit 967 in accordance with a command from the user interface unit 971, and can provide the data to another device connected via the network from the external interface unit 966. The control unit 970 obtains, via external interface unit 966, the encoded data and the image data provided from another device via the network, and can provided the data to the image data processing unit 964, for example.

The recording medium driven by the medium drive 968 may be any given removable medium which can be read and written, such as a magnetic disk, an optical magnetic disk, an optical disk, or a semiconductor memory. The recording medium may be of any type as a removable medium, and may be a tape device, or a disk, or a memory card. It is to be understood that it may be a non-contact IC card and the like.

The medium drive 968 and the recording medium may be integrated, and like, for example, an internal hard disk drive and an SSD (Solid State Drive), the medium drive 968 and the recording medium may be configured by a non-movable storage medium.

The control unit 970 is constituted by a CPU, a memory, and the like. The memory stores, e.g., programs executed by the CPU, various kinds of data required when processing is performed with the CPU. The programs stored in the memory is read and executed by the CPU with predetermined timing such as during activation of the image-capturing device 960. The CPU executes the program, thus controlling each unit so as to cause the image-capturing device 960 to operate in accordance with user operation.

In the image-capturing device configured as described above, the image data processing unit 964 is provided with a function of an image processing apparatus (image processing method) of the present application. Therefore, a vector with a high degree of prediction accuracy can be derived as a prediction vector.

More specifically, the embodiments of the present technique is not limited to the embodiments explained above, and may be changed in various manners as long as it is within the gist of the present technique.

More specifically, the present technique is not limited to encoding and decoding using the MVC. More specifically, the present technique can be applied when a parallax information image is encoded and decoded using a prediction vector.

REFERENCE SIGNS LIST

11, 12, 21, 22 encoder, 31 DPB, 32 multiplexing unit, 41, 42 camera, 43 multi-viewpoint image information generation unit, 111 A/D conversion unit, 112 screen sorting buffer, 113 calculation unit, 114 orthogonal transformation unit, 115 quantization unit, 116 variable length encoding unit, 117 accumulation buffer, 118 inverse-quantization unit, 119 inverse-orthogonal transformation unit, 120 calculation unit, 121 deblocking filter, 122 intra-screen prediction unit, 123 inter-prediction unit, 124 prediction image selecting unit, 211 A/D conversion unit, 212 screen sorting buffer, 213 calculation unit, 214 orthogonal transformation unit, 215 quantization unit, 216 variable length encoding unit, 217 accumulation buffer, 218 inverse-quantization unit, 219 inverse-orthogonal transformation unit, 220 calculation unit, 221 deblocking filter, 222 intra-screen prediction unit, 224 prediction image selecting unit, 231 warping unit, 232 warped picture buffer, 233 occlusion detection unit, 234 parallax prediction unit, 241 parallax detection unit, 242 parallax compensation unit, 243 prediction vector generation unit, 244 cost function calculation unit, 245 mode selecting unit, 301 separation unit, 311, 312, 321, 322 decoder, 331 DPB, 341 accumulation buffer, 342 variable length decoding unit, 343 inverse-quantization unit, 344 inverse-orthogonal transformation unit, 345 calculation unit, 346 deblocking filter, 347 screen sorting unit, 348 D/A conversion unit, 349 intra-screen prediction unit, 350 inter-prediction unit, 351 prediction image selecting unit, 441 accumulation buffer, 442 variable length decoding unit, 443 inverse-quantization unit, 444 inverse-orthogonal transformation unit, 445 calculation unit, 446 deblocking filter, 447 screen sorting unit, 448 D/A conversion unit, 449 intra-screen prediction unit, 451 prediction image selecting unit, 461 warping unit, 462 warped picture buffer, 463 occlusion detection unit, 464 parallax prediction unit, 471 prediction vector generation unit, 472 parallax compensation unit, 534 parallax prediction unit, 541 parallax detection unit, 542 parallax compensation unit, 543 prediction vector generation unit, 544 cost function calculation unit, 545 mode selecting unit, 664 parallax prediction unit, 771 prediction vector generation unit, 801 bus, 802 CPU, 803 ROM, 804 RAM, 805 hard disk, 806 output unit, 807 input unit, 808 communication unit, 809 drive, 810 input/output interface, 811 removable recording medium

The invention claimed is:

1. An image processing apparatus comprising:
one or more processors and a memory configured to generate a prediction vector of a deviation vector representing deviation of a target block,
wherein the target block is processing target in a depth image having depth information about parallax as a pixel value for each pixel of a color, with respect to another picture different from a picture of the target block, in accordance with a vector prediction method,
wherein the vector prediction method is based on whether the target block is an occlusion block including an occlusion portion that does not include any corresponding point in the other picture; and
generate a picture of a warped depth image by converting a picture of the depth image of a first viewpoint into an image obtained with a second viewpoint.

2. The image processing apparatus according to claim 1, wherein the one or more processors are configured to generate the prediction vector of a parallax vector which is the deviation vector representing deviation of the target block, in a depth image of the second viewpoint having depth information about parallax as a pixel value for each pixel of a color image of the second viewpoint which is different from a first viewpoint, with respect to a picture of the depth image of the first viewpoint, in accordance with a vector prediction method
wherein the vector prediction method is based on whether the target block is an occlusion block including an occlusion portion that does not include any corresponding point in the picture of the depth image of the first viewpoint.

3. The image processing apparatus according to claim 2, wherein the one or more processors are configured to: use the picture of the warped depth image to detect the occlusion portion of the picture of the target block.

4. The image processing apparatus according to claim 1, wherein when the target block is the occlusion block, the one or more processors are configured to generate the prediction vector of the target block in accordance with a proximity prediction method for generating, as the prediction vector of the target block, a vector from the target block to a proximity portion adjacent to an outside of an occlusion corresponding portion at the same position as the occlusion portion in the picture of the depth image of the first viewpoint.

5. The image processing apparatus according to claim 4, wherein the one or more processors are configured to scan each block which is the processing target in the picture of the target block in a horizontal direction, thereby detecting a start pixel where the occlusion portion starts and an end pixel where it ends, based on the proximity prediction method, the one or more processors are configured to generate, as the prediction vector of the target block, a vector from the target block to the proximity portion adjacent to an outside of a border of the occlusion corresponding portion, wherein the occlusion corresponding portion is derived by subtracting a number of pixels between the start pixel and the end pixel of the occlusion block from the prediction vector of the occlusion block adjacent to a left side of the target block.

6. The image processing apparatus according to claim 5, wherein the one or more processors are configured to generate, as the prediction vector of the target block, a vector from the target block to the proximity portion adjacent to an outside of a border of the occlusion corresponding portion, wherein the occlusion corresponding portion is derived by subtracting the number of pixels between the start pixel and the end pixel of the target block from the prediction vector of the occlusion block adjacent to a left side of the target block.

7. The image processing apparatus according to claim 4, wherein in accordance with the proximity prediction method, the one or more processors are configured to generate, as the prediction vector of the target block, a vector from the target block to the proximity portion adjacent to an outside of the occlusion corresponding portion, which is derived by subtracting a number of pixels of the occlusion block in the horizontal direction from the prediction vector of the occlusion block adjacent to a left side of the target block.

8. The image processing apparatus according to claim 7, wherein the one or more processors are configured to output a predictor flag representing a vector prediction method of the prediction vector of the target block.

9. The image processing apparatus according to claim 4, wherein the one or more processors are configured to:

obtain a predictor flag representing a vector prediction method of the prediction vector of the target block, and generate the prediction vector of the target block in accordance with a vector prediction method resented by the predictor flag.

10. The image processing apparatus according to claim 9, wherein when the predictor flag represents the proximity prediction method, the one or more processors are configured to generate, as the prediction vector of the target block, a vector from the tartlet block to the proximity portion adjacent to an outside of the occlusion corresponding partial, wherein the occlusion corresponding portion is delved by subtracting a number of pixels of the occlusion block in a horizontal direction from the prediction vector of the occlusion block adjacent to a left side of the target block.

11. An image processing method comprising:

generating a prediction vector of a deviation vector representing deviation of a target block, wherein the target block is a processing target in a depth image having depth information about parallax as a pixel value for each pixel of a color image, with respect to another picture different from a picture of the target block, in accordance with a vector prediction method, wherein the vector prediction method is based on whether the target block is an occlusion block including an occlusion portion that does not include any corresponding point in the other picture; and generating a picture of a warped depth image by converting a picture of the depth image of a first viewpoint into an image obtained with a second viewpoint.

12. A non-transitory computer readable storage medium, having stored thereon, a set of computer-executable instructions that causes a computer to perform steps comprising:

generating a prediction vector of a deviation vector representing deviation of a target block, wherein the target block is a processing target in a depth image having depth information about parallax as a pixel value for each pixel of a color image, with respect to another picture different from a picture of the target block, in accordance with a vector prediction method, wherein the vector prediction method is based on whether the target block is an occlusion block including an occlusion portion that does not include any corresponding point in the other picture; and generating a picture of a warped depth image by converting a picture of the depth image of a first viewpoint into an image obtained with a second viewpoint.

13. An image processing apparatus comprising:

one or more processors and a memory configured to:

generate a prediction vector of a deviation vector representing deviation of a target block, wherein the target block is processing target in a depth image having depth information about parallax as a pixel value for each pixel of a color image, with respect to another picture different from a picture of the target block, in accordance with a vector prediction method, wherein the vector prediction method is based on whether the target block is an occlusion block including an occlusion portion that does not include any corresponding point in the other picture;

generate the prediction vector of a parallax vector which is the deviation vector representing deviation of the target block, in a depth image of a second viewpoint having depth information about parallax as a pixel value for each pixel of a color image of the second viewpoint which is different from a first viewpoint, with respect to a picture of the depth image of the first viewpoint, in accordance with a vector prediction method, wherein the vector prediction method is based on whether the target block is an occlusion block including an occlusion portion that does not include any corresponding point in the picture of the depth image of the first viewpoint;

warp a picture of the depth image of the first viewpoint;

generate a picture of a warped depth image obtained by converting the picture of the depth image of the first viewpoint into an image obtained with the second viewpoint; and use the picture of the warped depth image to detect the occlusion portion of the picture of the target block.

* * * * *